(12) United States Patent
Moreno et al.

(10) Patent No.: US 12,240,713 B2
(45) Date of Patent: Mar. 4, 2025

(54) ROBOTIC PALLETIZATION SYSTEM WITH VARIABLE CONVEYOR HEIGHT

(71) Applicant: Dexterity, Inc., Redwood City, CA (US)

(72) Inventors: Robert Moreno, Sunnyvale, CA (US); Salvador Perez, Menlo Park, CA (US)

(73) Assignee: Dexterity, Inc., Redwood City, CA (US)

(*) Notice: Subject to any disclaimer, the term of this patent is extended or adjusted under 35 U.S.C. 154(b) by 892 days.

(21) Appl. No.: 17/343,609

(22) Filed: Jun. 9, 2021

(65) Prior Publication Data

US 2022/0297958 A1 Sep. 22, 2022

Related U.S. Application Data

(60) Provisional application No. 63/162,871, filed on Mar. 18, 2021.

(51) Int. Cl.
*B65G 61/00* (2006.01)
*B25J 9/00* (2006.01)
*B25J 9/16* (2006.01)
*B25J 13/08* (2006.01)

(52) U.S. Cl.
CPC ............ *B65G 61/00* (2013.01); *B25J 9/0093* (2013.01); *B25J 9/0096* (2013.01); *B25J 9/1664* (2013.01); *B25J 9/1689* (2013.01); *B25J 13/08* (2013.01)

(58) Field of Classification Search
CPC ....... B65G 61/00; B25J 9/0093; B25J 9/0096; B25J 9/1664; B25J 13/08; G05B 2219/40006
See application file for complete search history.

(56) References Cited

U.S. PATENT DOCUMENTS

| | | | | |
|---|---|---|---|---|
| 5,175,692 A | * | 12/1992 | Mazouz | B65G 61/00 901/7 |
| 5,501,571 A | * | 3/1996 | Van Durrett | B65G 61/00 414/21 |
| 6,055,462 A | * | 4/2000 | Sato | B25J 9/1687 700/217 |
| 6,579,053 B1 | | 6/2003 | Grams | |
| 9,996,805 B1 | | 6/2018 | Lisso | |
| 10,647,528 B1 | * | 5/2020 | Diankov | B65G 57/22 |
| 10,696,494 B1 | * | 6/2020 | Diankov | B65G 57/00 |
| 2012/0297733 A1 | | 11/2012 | Pierson | |
| 2017/0277197 A1 | | 9/2017 | Liao | |
| 2018/0022557 A1 | * | 1/2018 | Tanaka | B65G 57/245 53/500 |
| 2020/0269429 A1 | * | 8/2020 | Chavez | B25J 19/023 |

(Continued)

FOREIGN PATENT DOCUMENTS

CN 112009923 12/2020

*Primary Examiner* — Kyle O Logan
(74) *Attorney, Agent, or Firm* — Van Pelt, Yi & James LLP

(57) ABSTRACT

A robotic palletization/depalletization system is disclosed. In various embodiments, data associated with a plurality of items to be stacked on or in a destination location is received, and a plan to stack the items on or in the destination location is generated based at least in part on the received data. The generating the plan includes determining a source location from which to pick the item based at least in part on (i) an attribute of the source location, and (ii) a state of a platform or receptacle on which one or more items are to be stacked.

33 Claims, 21 Drawing Sheets

(56) References Cited

U.S. PATENT DOCUMENTS

2020/0377315 A1    12/2020  Diankov
2021/0139256 A1*   5/2021   Fu ..................... G05B 19/4189
2021/0252710 A1*   8/2021   Bikumala .............. B25J 9/1661

* cited by examiner

ROBOTIC PALLETIZATION SYSTEM WITH VARIABLE CONVEYOR HEIGHT

CROSS REFERENCE TO OTHER APPLICATIONS

This application claims priority to U.S. Provisional Patent Application No. 63/162,871 entitled ROBOTIC PALLETIZATION SYSTEM WITH VARIABLE CONVEYOR HEIGHT filed Mar. 18, 2021 which is incorporated herein by reference for all purposes.

BACKGROUND OF THE INVENTION

Shipping and distribution centers, warehouses, shipping docks, air freight terminals, big box stores, and other activities that ship and receive non-homogeneous sets of items use strategies such as packing and unpacking dissimilar items in boxes, crates, containers, conveyor belts, and on pallets, etc. Packing dissimilar items in boxes, crates, on pallets, etc. enables the resulting sets of items to be handled by heavy lifting equipment, such as forklifts, cranes, etc., and enables items to be packed more efficiently for storage (e.g., in a warehouse) and/or shipment (e.g., in truck, cargo hold, etc.).

In some contexts, items may be so dissimilar in size, weight, density, bulkiness, rigidity, strength of packaging, etc. that any given item or set of items may or may not have attributes that would enable those items to support the size, weight, distribution of weight, etc., of a given other item that might be required to be packed (e.g., in a box, container, pallet, etc. When assembling a pallet or other set of dissimilar items, items must be selected and stacked carefully to ensure the palletized stack does not collapse, lean, or otherwise become unstable (e.g., so as not to be able to be handled by equipment such as a forklift, etc.) and to avoid item damage.

Currently, pallets typically are stacked and/or unpacked by hand. Human workers select items to be stacked, e.g., based on a shipping invoice or manifest, etc., and use human judgment and intuition to select larger and heavier items to place on the bottom, for example. However, in some cases, items simply arrive via a conveyor or other mechanism and/or are selected from bins in an order listed, etc., resulting in an unstable palletized or otherwise packed set.

Use of robotics is made more challenging in many environments due to the variety of items, variations the order, number, and mix of items to be packed, on a given pallet for example, and a variety of types and location of container and/or feed mechanism from which items must be picked up to be placed on the pallet or other container.

BRIEF DESCRIPTION OF THE DRAWINGS

Various embodiments of the invention are disclosed in the following detailed description and the accompanying drawings.

DETAILED DESCRIPTION

Figure 1:
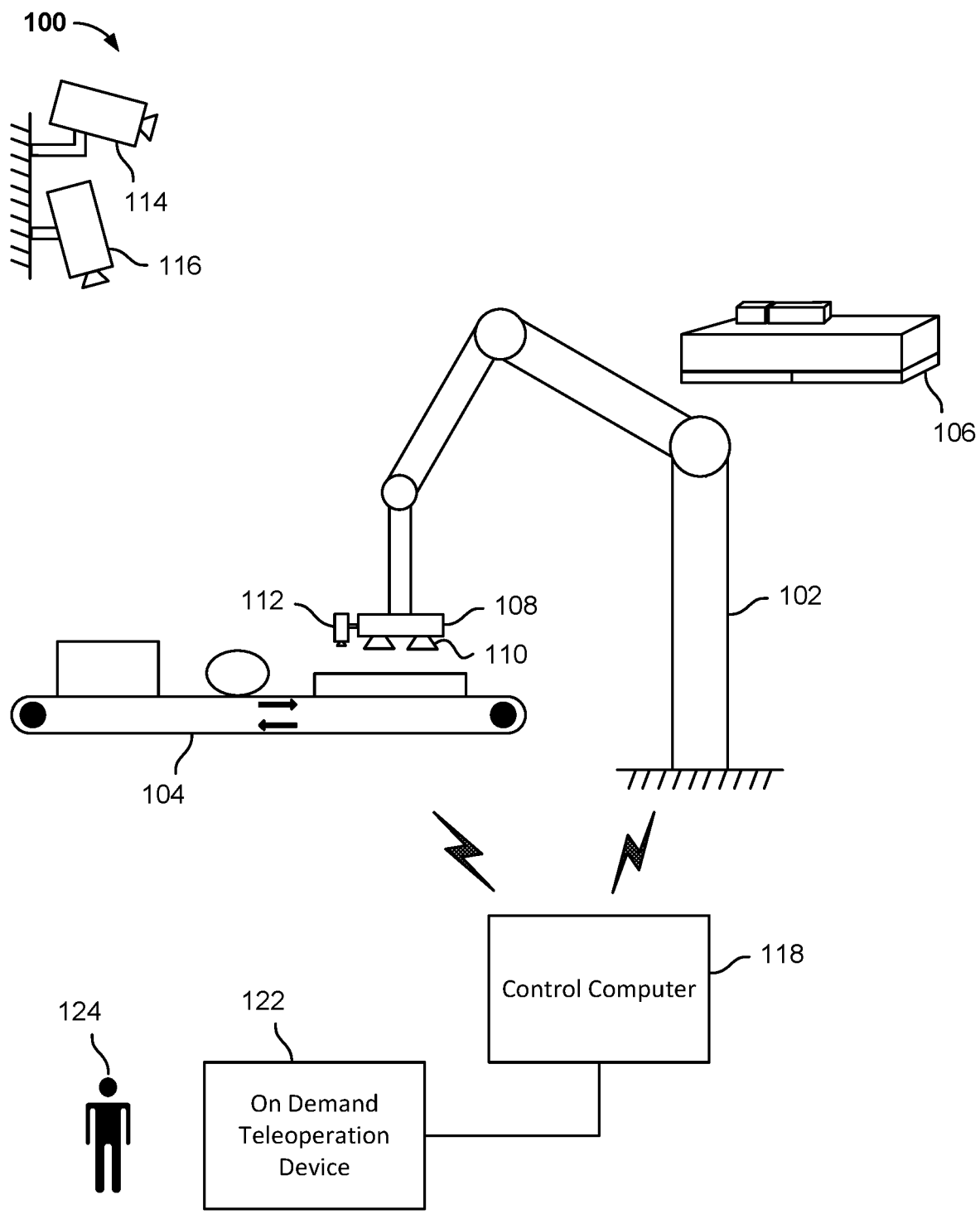
FIG. 1 is a diagram illustrating an embodiment of a robotic system to palletize and/or depalletize heterogeneous items.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task.

As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, "pallet" includes a platform, receptacle, or other container on, or in, which one or more items may be stacked or placed. Further, as used herein, the pallet may be used in connection with packaging and distributing a set of one or more items. As an example, the term pallet includes the typical flat transport structure that supports items and that is movable via a forklift, a pallet jack, a crane, etc. A pallet, as used herein, may be constructed of various metals including, wood, metals, metal alloys, polymers, etc.

As used herein, palletization of an item or a set of items includes picking an item from a source location, such as a conveyance structure, and placing the item on a pallet such as on a stack of items on the pallet.

As used herein, depalletization includes picking an item from a pallet, such as from a stack of items on the pallet, moving the item, and placing the item at a destination location such as a conveyance structure.

As used herein, singulation of an item includes picking an item from a source pile/flow and placing the item on a conveyance structure (e.g., a segmented conveyor or similar conveyance). Optionally, singulation may include sortation of the various items on the conveyance structure such as via singly placing the items from the source pile/flow into a slot or tray on the conveyor.

As used herein, kitting includes the picking of one or more items/objects from corresponding locations and placing the one or more items in a predetermined location in a manner that a set of the one or more items correspond to a kit.

Various embodiments are disclosed to pick and place items between a source location and a destination location based at least in part on an attribute or state of the source location and/or and attribute or state of the destination location. Attributes of a source location and/or destination location may include a height of the location, a relative distance between an item to be moved and the location (e.g., the destination location), etc. The item may be moved in connection with a palletization process, a depalletization process, a singulation process, and/or a kitting process (e.g., an assembly of a set of items), etc.

According to various embodiments, an item is moved based at least in part on a cost function associated with moving the item from a source location to a destination location. The item may be moved in connection with a palletization process, a depalletization process, a singulation process, and/or a kitting process (e.g., an assembly of a set of items), etc. In some embodiments, one or more of a path/trajectory, source location, and/or destination location associated with picking and placing an item is selected based at least in part on a cost function corresponding to moving the item from a source location to a destination location. In some embodiments, an order in which a set of items are moved from corresponding source locations to destination locations is based at least in part on corresponding values for one or more cost functions associated with one or more items in the set of items. For example, an order in which the set of items are to be moved is selected based at least in part on a composite cost function of moving the set of items (e.g., an aggregated resulting value for moving the various items in the set of items). The order for moving the set of items may be optimized based at least in part on optimizing the composite cost function (e.g., such as reducing a total cost of moving the set of items).

The overall cost (e.g., the aggregated resulting value for moving the various items in the set of items) may be different according to an order in which the items are moved from the source location to the destination location because a height of the stack of items changes as the set of items are palletized/depalletized. As an example, if a robotic system comprises a plurality of conveyors corresponding to possible destination locations (e.g., to carry items away from a pallet in connection with a depalletization process) and at least a subset of the conveyors have different heights, then the cost function with respect to moving an item to a conveyor having a relatively greater height will have a different result than the cost function with respect to moving the item to a conveyor having a relatively lesser height. In such an example, if the stack of items on the pallet has a height that is closer to the conveyor having the relatively greater height, then the cost function will have a result such that moving the item to the conveyor having the relatively greater height may be associated with a lesser cost (e.g., a result of the cost function) than moving the same item to the conveyor having a relatively smaller height. In some embodiments, moving an item down a predetermined distance may be associated with a lesser cost than moving an item up the same predetermined distance (e.g., the robotic arm may have to exert more work to move an item up than to move the item down, the robotic arm may be able to more quickly move the item down than up).

In some embodiments, items are picked and placed to/from a pallet such as in connection with a palletization/de-palletization process. In connection with palletizing a set of items, the system may determine to pick items from a source location having a height relatively closer to the height of the pallet (e.g., as compared to other possible source locations), or height of the stack of items on the pallet, and moving the item and placing the item on the pallet. A determination of a source location may be made on an item by item basis (e.g., so that as the stack of items on the pallet grows higher, a source location having a closer relative height is selected as the source location). In connection with depalletizing a set of items, the system may determine to move items from a source location (e.g., the pallet or stack of items on the pallet) to a destination location having a height relatively close to the height of the pallet (e.g., as compared to other possible destination locations such as other conveyors) and moving the item and placing the item at the selected destination location. A determination of a source location may be made on an item by item basis (e.g., so that as the stack of items on the pallet grows higher, a source location having a closer relative height is selected as the source location).

In some embodiments, the height of the conveyor or other area corresponding to a source location/destination location is adjustable. As an example, in connection with palletizing an item, the source location (e.g., the conveyor) can be adjusted based at least in part on the destination location (e.g., a current height of the stack of items on the pallet), the item, and/or the plan for palletizing the item(s). As an example, in connection with depalletizing an item, a destination location (e.g., the conveyor) may be adjusted based at least in part on the source location (e.g., a height of the stack from which the item is picked), the item, and/or the plan for depalletizing the item(s). As an example, a motor may be controlled to raise the conveyor such by as causing one or more pinions to traverse a gear rack. As another example, the height of the conveyor may be adjusted using an actuator and mechanical locating pins.

Techniques are disclosed to programmatically use a robotic system comprising one or more robots (e.g., robotic arm with suction, gripper, and/or other end effector at operative end) to palletize/depalletize and/or to otherwise pack and/or unpack arbitrary sets of non-homogeneous items (e.g., dissimilar size, shape, weight, weight distribution, rigidity, fragility, type, packaging, etc.).

In various embodiments, 3D cameras, force sensors, and other sensors and/or sensor arrays are used to detect and determine attributes of items to be picked and/or placed. Items the type of which is determined (e.g., with sufficient confidence, as indicated by a programmatically determined confidence score, for example) may be grasped and placed using strategies derived from an item type-specific model. Items that cannot be identified are picked and placed using strategies not specific to a given item type. For example, a model that uses size, shape, and weight information may be used. The sensors and/or sensor arrays may be disposed in or around a workspace of a robotic arm.

In various embodiments, a library of item types, respective attributes, and grasp strategies is used to determine and implement a strategy to pick and place each item. The library is dynamic in some embodiments. For example, the library may be augmented to add newly-encountered items and/or additional attributes learned about an item, such as grasp strategies that worked or did not work in a given context. In some embodiments, human intervention may be invoked if the robotic system gets stuck. The robotic system may be configured to watch (e.g., using sensors) and learn (e.g., updating a library and/or model) based on how a human teleoperator intervenes to use the robotic arm, for example, to pick and place an item via teleoperation. In some embodiments, teleoperation may include higher-level forms of feedback, such as a human indicating a particular point in a 2D RGB image at which the robot should grasp an object.

In some embodiments, a robotic system as disclosed herein may engage in a process to gather and store (e.g., add to library) attributes and/or strategies to identify and pick/place an item of unknown or newly-discovered type. For example, the system may hold the item at various angles and/or locations to enable 3D cameras and/or other sensors to generate sensor data to augment and/or create a library entry that characterizes the item type and stores a model of how to identify and pick/place items of that type.

In various embodiments, a high level plan to pick and place items on or in a pallet is made. Strategies are applied, e.g., based on sensor information, to implement the plan by picking and placing individual items according to the plan. Deviations from the plan and/or re-planning may be triggered, e.g., the robotic system gets stuck, the stack of items on the pallet is detected (e.g., by computer vision, force sensors, etc.) to have become unstable), etc. A partial plan may be formed based on known information (e.g., next N items visible on a conveyor, next N items on an invoice or manifest, etc.) and adjustments made as additional information is received (e.g., next items visible, etc.). In some cases, the system is configured to stage (e.g., set aside, within reach) items determined less likely to be suitable to be stacked in a layer or container the system is currently building, such as a lower (or higher) layer in a pallet or container, etc. Once more information is known about next items to be picked/placed, a strategy that takes into account the staged (buffered) items and next items is generated and implemented.

Various embodiments include the simultaneous (e.g., concurrent or contemporaneous) palletization or depalletization of a set of one or more items. One or more robotic arms may be controlled to concurrently stack (or de-stack) a set of items on a plurality of pallets. For example, a plurality of pallets may be disposed within range of a robotic arm, and the robotic arm may contemporaneously stack one or more items on at least a subset of the plurality of pallets (e.g., a set of two or more pallets). A pallet on which an item is to be placed (e.g., stacked) may be selected based at least in part on one or more of the item (e.g., an attribute of the item, a type of item, etc.), a characteristic of the pallet, an identifier of the pallet, a state of a stack of one or more items on the pallet, a manifest or order (e.g., an order in association with which the item is being packed and shipped), etc. A mix of items may be stacked on one or more pallets of the plurality of pallets.

In various embodiments, a robotic system determines a high level plan to pick an item from a conveyance structure (hereinafter "conveyor") of one or more conveyors, and to place the item on a pallet of one or more pallets disposed within range of a robotic arm. The robotic system determines the pallet on which to place the item. For example, the robotic system determines the pallet on which to place the item based at least in part on an order and/or manifest associated with the pallet. As another example, in the case of a plurality of pallets being delivered to a same address (e.g., a same customer), or being associated with a same manifest or order, the robotic system may determine the pallet on which to place the item based at least in part on a state of the pallet and/or a state of the plurality of pallets. The robotic system may determine a state of a stack on one or more of the plurality of pallets, and determine the pallet on which to place the item based at least in part on a determination of a stack for which the item has a best fit. The determination that the stack for which the item has a best fit may be based at least in part on a stability of the stack, a model of the stack and/or a model of the stack comprising the item (e.g., after the item is placed on the stack), an expected one or more items that remain to be stacked (e.g., based at least in part on an order and/or manifest), etc. One or more attributes or characteristics pertaining to the item may be used in connection with determining the pallet on which to place the item (e.g., a size, shape, type of packaging, type of item, etc. may be used in connection with modelling the stack and/or determining where to place the item on a stack).

In some embodiments, the robotic system determines that place an item in a buffer or predefined staging area. The robotic system may determine that a fit of the item on a stack on one or more pallets associated with the manifest and/or order to which the item corresponds is not currently ideal (e.g., that a threshold fit or threshold stability would not be achieved if the item were to be placed on the stack). Alternatively, or in addition, the robotic system may determine that the item would fit better on the stack after one or more expected items are placed on the corresponding pallet.

For example, the robotic system may determine that an expected fit of a current item or expected stability of the stack would be better (e.g., higher than the threshold fit or the threshold stability) if one or more expected items were first placed on the corresponding pallet. As an example, the one or more expected items may be determined based at least in part on one or more items on the conveyor. As another example, the one or more expected items may be determined based at least in part on a manifest and/or order with which the current item is associated. The one or more expected items may be determined based at least in part on a threshold number of subsequent items on the conveyor or to be stacked on the one or more pallets (e.g., to be delivered to the robotic arm for stacking), and/or manifest and/or order with which the current item is associated. The buffer or predefined staging area may correspond to one of the predefined zones disposed within range of the robotic arm. In some embodiments, in response to a determination that the buffer or predefined staging area is full (e.g., a number of items in the buffer/staging area exceeds a threshold number, or that the current item does not fit in the buffer/staging area), the robotic system may determine whether to place the current item or an item currently in the buffer/staging area. The robotic system may determine whether placing an item from the buffer/staging area to a corresponding pallet (e.g., and thereby freeing up space in the buffer/staging area for the current item) would result in a better fit (e.g., a more stable stack) than placing the current item on a pallet. In response to determining that placing an item from the buffer/staging area to a corresponding pallet is expected to result in a better fit, the robotic system controls the robotic arm to pick the item from the buffer/staging area and place the item on a pallet corresponding to a manifest and/or order to which the item belongs. The robotic arm then places the current item in the buffer and/or staging area until the robotic system determines that placing the item on a corresponding stack is ideal (e.g., that a threshold fit or threshold stability would not be achieved if the item were to be placed on the stack).

In some embodiments, a plurality of pallets are arranged around a robotic arm (e.g., within range of the robotic arm so that the robotic arm may stack an item each of the plurality of pallets). Each pallet may be located within a predefined zone within proximity of the robotic arm. The predefined zones may be configured radially around a robotic arm. Markings on the ground may denote a predefined zone. The robotic system may comprise one or more sensors or sensor arrays that obtain information pertaining to one or more of a plurality of predefined zones. The one or more sensors or sensor arrays may obtain information pertaining to a pallet disposed within a predefined zone (e.g., an identifier associated with the pallet, a state of the pallet, etc.) and/or a stack of items on the pallet. For example, the one or more sensors or sensor arrays may obtain information from which a stack of one or more items on the pallet in the predefined zone may be modeled. The robotic system may use the information obtained by the one or more sensors or sensor arrays to determine an orientation of a pallet in a corresponding predefined zone, to determine whether an inserted pallet is properly oriented, or otherwise determine to calibrate the robotic system with respect to the pallet inserted into corresponding predefined zone. As an example, in response to determining that the robotic system is to be calibrated with the respect to the pallet, the robotic system may provide a notification to a terminal that the pallet is to be reoriented (e.g., a notification that requests/alerts a human operator to reorient the pallet). As another example, in response to determining that the robotic system is to be calibrated with the respect to the pallet, the robotic system may determine an offset of a current orientation of the pallet (e.g., with respect to a proper orientation of the pallet), and determine a plan or strategy for placing items on the pallet based at least in part on the offset of the current orientation.

The interaction between robotic systems (e.g., robotic arms) and human operators invokes safety concerns. Various embodiments ensure safe and intuitive interactions between human operators and robotic systems (e.g., such as while the robotic systems operate at least semi-autonomously). In the case of a robotic system that simultaneously (e.g., concurrently or contemporaneously) stacks items on various pallets arranged in predefined zones around a robotic arm, the robotic system controls the robotic arm to pause or stop the stacking of items in or around human operators and/or pallets that are being removed from a corresponding predefined zone. The one or more sensors and/or sensor arrays operatively connected to the robotic system may obtain information from which the robotic system determines that a human operator is within a predefined zone, within a threshold range of a predefined zone, or other defined area. In response to determining a location of a human operator, the robotic system controls the robotic arm to pause or stop stacking items within a predefined area or range of the location of the human operator. In some examples, the robotic system pauses the robotic arm entirely (e.g., so that the robotic arm does not stack items on any pallets) while the human operator is within a threshold area or range of a predefined zone and/or the robotic arm. In other examples, the robotic system controls the robotic arm to pause or stop stacking items on pallets within predefined zones that are adjacent to a predefined zone in which a human operator is present. In other examples, the robotic system controls the robotic arm to pause or stop stacking items on pallets within predefined zones that are within a threshold distance of a predefined zone in which a human operator is present.

According to various embodiments, the robotic system comprises a control computer that operatively controls a robotic arm to palletize/de-palletize one or more items. A human operator may provide the control computer with instructions via a user interface (e.g., a user interface at a terminal connected to the control computer or directly to the control computer). The user interface may include one or more selectable elements with corresponding functions that are invoked in response to user selection thereof. For example, the user interface may include a button to activate stacking of one or more items on a pallet disposed in a corresponding predefined zone. In response to a pallet being inserted into the predefined zone, the user may input selection of the button to activate stacking on the pallet. As another example, the user interface may include a button to pause stacking of items on the pallet in the corresponding zone. The user may pause stacking of the items on the pallet if a human operator or other robot is within (or within a threshold range of), or will be within, the corresponding predefined zone. In some instances, the user may pause stacking of items on the pallet if the human operator or other robot is within (or will be within) an adjacent predefined zone (or otherwise within proximity of the predefined zone for which items are being, or are to be, stacked.

The user interface may display information pertaining to a current state or status of one or more pallets in corresponding predefined zones (e.g., the state/status of a stacking of items on the pallets). For example, the information pertaining to the current state or status of the one or more pallets may be based at least in part on feedback from the control computer. The feedback from the control computer may be generated based at least in part on information obtained from one or more sensors or sensors arrays within the workspace of the robotic arm (e.g., a plurality of predefined zones). The information pertaining to a current state or status of the one or more pallets may indicate a remaining number of items to be stacked on a pallet in a corresponding predefined zone, a number of items that have been stacked on a pallet, etc.

FIG. 1 is a diagram illustrating an embodiment of a robotic system to palletize and/or depalletize heterogeneous items.

In the example shown, system 100 includes a robotic arm 102. In this example the robotic arm 102 is stationary, but in various alternative embodiments robotic arm 102 may be a fully or partly mobile, e.g., mounted on a rail, fully mobile on a motorized chassis, etc. As shown, robotic arm 102 is used to pick arbitrary and/or dissimilar items from a conveyor belt (or other source) 104 and stack them on a pallet (e.g., platform or other receptacle) 106. The pallet (e.g., platform or other receptacle) 106 may comprise a pallet, a receptacle, or base with wheels at the four corners and at least partially closed on three of four sides, sometimes referred to as a three-sided "roll pallet", "roll cage", and/or "roll" or "cage" "trolley". In other embodiments, a roll or non-wheeled pallet with more, fewer, and/or no sides may be used. In some embodiments, other robots not shown in FIG. 1 may be used to push receptacle 106 into position to be loaded/unloaded and/or into a truck or other destination to be transported, etc.

In some embodiments, a plurality of pallets 106 may be disposed around robotic arm 102 (e.g., within a threshold proximity or otherwise within range of the robotic arm). The robotic arm 102 may simultaneously (e.g., concurrently and/or contemporaneously) stack one or more items on the plurality of pallets. Each of the plurality of pallets may be associated with a manifest and/or order. For example, each of the pallets may be associated with a preset destination (e.g., customer, address, etc.). In some instances, a subset of the plurality of pallets may be associated with a same manifest and/or order. However, each of the plurality of pallets may be associated with different manifests and/or orders. Robotic arm 102 may place a plurality of items respectively corresponding to a same order on a plurality of pallets. Robotic system 100 may determine an arrangement (e.g., a stacking of items) on the plurality of pallets (e.g., how the plurality of items for an order are to be divided among the plurality of pallets, how the items on any one pallet are to be stacked, etc.). System 100 may store one or more items (e.g., item(s) for an order) in a buffer or staging area while one or more other items are stacked on a pallet. As an example, the one or more items may be stored in the buffer or staging area until such time that the system 100 determines that the respective placement of the one or more items on the pallet (e.g., on the stack) satisfies (e.g., exceeds) a threshold fit or threshold stability. The threshold fit or threshold stability may be a predefined value or a value that is empirically determined based at least in part on historical information. A machine learning algorithm may be implemented in connection with determining whether placement of an item on a stack would is expected to satisfy (e.g., exceeds) a threshold fit or threshold stability, and/or in connection with determining the threshold fit or threshold stability (e.g., the thresholds against which a simulation or model are measured to assess whether to place the item on the stack).

In the example shown, robotic arm 102 is equipped with a suction-type end effector 108. End effector 108 has a plurality of suction cups 110. Robotic arm 102 is used to position the suction cups 110 of end effector 108 over an item to be picked up, as shown, and a vacuum source provides suction to grasp the item, lift it from conveyor 104, and place it at a destination location on pallet 106.

In various embodiments, one or more of 3D or other camera 112 mounted on end effector 108 and cameras 114, 116 mounted in a space in which robotic system 100 is deployed are used to generate image data used to identify items on conveyor 104 and/or determine a plan to grasp, pick/place, and stack the items on pallet 106 (or place the item in the buffer or staging area, as applicable). In various embodiments, additional sensors not shown, e.g., weight or force sensors embodied in and/or adjacent to conveyor 104 and/or robotic arm 102, force sensors in the x-y plane and/or z-direction (vertical direction) of suction cups 110, etc. may be used to identify, determine attributes of, grasp, pick up, move through a determined trajectory, and/or place in a destination location on or in receptacle 106 items on conveyor 104 and/or other sources and/or staging areas in which items may be located and/or relocated, e.g., by system 100.

In the example shown, camera 112 is mounted on the side of the body of end effector 108, but in some embodiments camera 112 and/or additional cameras may be mounted in other locations, such as on the underside of the body of end effector 108, e.g., pointed downward from a position between suction cups 110, or on segments or other structures of robotic arm 102, or other locations. In various embodiments, cameras such as 112, 114, and 116 may be used to read text, logos, photos, drawings, images, markings, barcodes, QR codes, or other encoded and/or graphical information or content visible on and/or comprising items on conveyor 104.

Referring further to FIG. 1, in the example shown system 100 includes a control computer 118 configured to communicate, in this example via wireless communication (but in one or both of wired and wireless communication in various embodiments) with elements such as robotic arm 102, conveyor 104, effector 108, and sensors, such as camera 112, 114, and 116 and/or weight, force, and/or other sensors not shown in FIG. 1. In various embodiments, control computer 118 is configured to use input from sensors, such as camera 112, 114, and 116 and/or weight, force, and/or other sensors not shown in FIG. 1, to view, identify, and determine one or more attributes of items to be loaded into and/or unloaded from receptacle 106. In various embodiments, control computer 118 uses item model data in a library stored on and/or accessible to control computer 118 to identify an item and/or its attributes, e.g., based on image and/or other sensor data. Control computer 118 uses a model corresponding to an item to determine and implement a plan to stack the item, along with other items, in/on a destination, such as receptacle 106. In various embodiments, the item attributes and/or model are used to determine a strategy to grasp, move, and place an item in a destination location, e.g., a determined location at which the item is determined to be placed as part of a planning/replanning process to stack items in/on the receptacle 106.

In the example shown, control computer 118 is connected to an "on demand" teleoperation device 122. In some embodiments, if control computer 118 cannot proceed in a fully automated mode, for example, a strategy to grasp, move, and place an item cannot be determined and/or fails in a manner such that control computer 118 does not have a strategy to complete picking and placing the item in a fully automated mode, then control computer 118 prompts a human user 124 to intervene, e.g., by using teleoperation device 122 to operate the robotic arm 102 and/or end effector 108 to grasp, move, and place the item.

A user interface pertaining to operation of system 100 may be provided by control computer 118 and/or teleoperation device 122. The user interface may provide a current status of system 100, including information pertaining to a current state of the pallet (or stack of items associated therewith), a current order or manifest being palletized or de-palletized, a performance of system 100 (e.g., a number of items palletized/de-palletized by time), etc. A user may select one or more elements on the user interface, or otherwise provide an input to the user interface, to activate or pause system 100 and/or a particular robotic arm in system 100.

According to various embodiments, system 100 implements a machine learning process to model a state of a pallet such as to generate a model of a stack on the pallet. The machine learning process may include an adaptive and/or dynamic process for modeling the state of the pallet. The machine learning process may define and/or update/refine a process by which system 100 generates a model of the state of the pallet. The model may be generated based at least in part on input from (e.g., information obtained from) one or more sensors in system 100 such as one or more sensors or sensor arrays within workspace of robot 102. The model may be generated based at least in part on a geometry of the stack, a vision response (e.g. information obtained by one or more sensors in the workspace), and the machine learning processes, etc. System 100 may use the model in connection with determining an efficient (e.g., maximizing/optimizing an efficiency) manner for palletizing/de-palletizing one or more items, and the manner for palletizing/de-palletizing may be bounded by a minimum threshold stability value. The process for palletizing/de-palletizing the one or more items may be configurable by a user administrator. For example, one or more metrics by which the process for palletizing/de-palletizing is maximized may be configurable (e.g., set by the user/administrator).

In the context of palletizing one or more items, system 100 may generate the model of the state of the pallet in connection with determining whether to place an item on the pallet (e.g., on the stack), and selecting a plan for placing the item on the pallet, including a destination location at which the item is to be placed, a trajectory along which the item is to be moved from a source location (e.g., a current destination such as a conveyor) to the destination location. System 100 may also use the model in connection with determining a strategy for releasing the item, or otherwise placing the item on the pallet (e.g., applying a force to the item to snug the item on the stack). The modelling of the state of the pallet may include simulating placement of the item at different destination locations on the pallet (e.g., on the stack) and determining corresponding different expected fits and/or expected stability (e.g., a stability metric) that is expected to result from placement of the item at the different locations. System 100 may select a destination location for which the expected fit and/or expected stability satisfies (e.g., exceeds) a corresponding threshold value. Additionally, or alternatively, system 100 may select a destination location that optimizes the expected fit (e.g., of the item on the stack) and/or expected stability (e.g., of the stack).

Conversely, in the context of de-palletizing one or more items from a pallet (e.g., a stack on the pallet), system 100 may generate the model of the state of the pallet in connection with determining whether to remove an item on the pallet (e.g., on the stack), and selecting a plan for removing the item from the pallet. The model of the state of the pallet may be used in connection with determining an order in which items are removed from the pallet. For example, system 100 may use the model to determine whether removal of an item is expected to cause stability of the state of the pallet (e.g., the stack) to drop below a threshold stability. System 100 may simulate removal of one or more items from the pallet and select an order from removing items from the pallet that optimizes the stability of the state of the pallet (e.g., the stack). System 100 may use the model to determine a next item to remove from the pallet. For example, system 100 may select an item as a next item to remove from the pallet based at least in part on a determination that an expected stability of the stack during and/or after removal of the item exceeds a threshold stability. The model and/or the machine learning process may be used in connection with determining strategies for picking an item from the stack. For example, after an item is selected to be the next item to remove from the stack, system 100 may determine the strategy for picking the item. The strategy for picking the item may be based at least in part on the state of the pallet (e.g., a determined stability of the stack), an attribute of the item (e.g., a size, shape, weight or expected weight, center of gravity, type of packaging, etc.), a location of the item (e.g., relative to one or more other items in the stack), an attribute of another item on the stack (e.g., an attribute of an adjacent item, etc.), etc.

According to various embodiments, a machine learning process is implemented in connection with improving grasping strategies (e.g., strategies for grasping an item). System 100 may obtain attribute information pertaining to one or more items to be palletized/de-palletized. The attribute information may comprise one or more of an orientation of the item, a material (e.g., a packaging type), a size, a weight (or expected weight), or a center of gravity, etc. System 100 may also obtain a source location (e.g., information pertaining to the input conveyor from which the item is to be picked), and may obtain information pertaining to a pallet on which the item is to be placed (or set of pallets from which the destination pallet is to be determined such as a set of pallets corresponding to the order for which the item is being stacked). In connection with determining a plan for picking and placing the item, system 100 may use the information pertaining to the item (e.g., the attribute information, destination location, etc.) to determine a strategy for picking the item. The picking strategy may include an indication of a picking location (e.g., a location on the item at which the robotic arm 102 is to engage the item such as via the end effector). The picking strategy may include a force to be applied to pick the item and/or a holding force by which the robotic arm 102 is to grasp the item while moving the item from a source location to the destination location. System 100 may use machine learning processes to improve the picking strategies based at least in part on an association between information pertaining to the item (e.g., the attribute information, destination location, etc.) and performance of picking the item (e.g., historical information associated with past iterations of picking and placing the item or similar items such as items sharing one or more similar attributes).

Figure 2A:
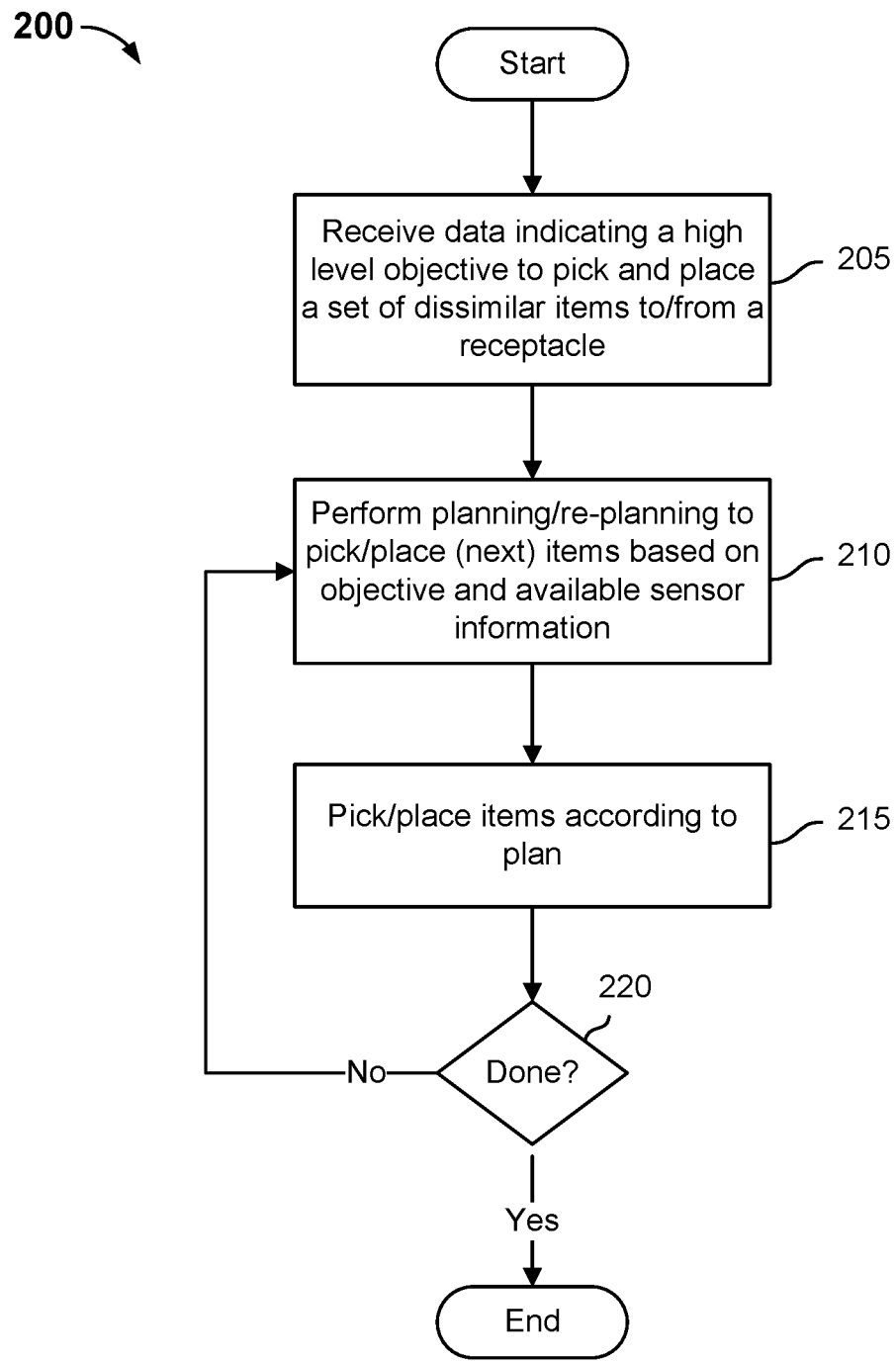
FIG. 2A is a flow chart illustrating an embodiment of a process to palletize and/or depalletize an item.

FIG. 2A is a flow chart illustrating an embodiment of a process to palletize and/or depalletize an item. In various embodiments, the process 200 of FIG. 2A is performed by a control computer comprising a robotic system to palletize and/or depalletize heterogeneous items, such as control computer 118 of FIG. 1. The robotic system may comprise one or more robotic arms. One or more pallets may be disposed around each of the robotic arms. For example, a plurality of predefined zones may be set within proximity or within a threshold range of a robotic arm, and at least pallet may be placed in a predefined zone. As another example, a plurality of predefined zones may be set radially around a robotic arm, and a plurality of pallets may be respectively located in a corresponding predefined zone. A system may comprise one or more conveyors that carry items to/from a workspace for a robotic arm (e.g., at least part of the one or more conveyors may be within reach/range of the robotic arm).

In the example shown, at 205 data indicating a high level objective to pick and place a set of dissimilar items (i.e., the set includes two or more different types of item) to/from one or more platforms or receptacles, such as a pallet, is received. For example, a control computer such as control computer 118 of FIG. 1 may receive an input to load items arriving on conveyor 104 onto pallet 106. Conversely, as another example, a control computer such as control computer 118 of FIG. 1 may receive an input to unload items from pallet 106 onto conveyor 104. The input to load/unload items correspond to a particular pallet or a particular robotic arm. For example, in the case of a plurality of pallets corresponding to the robotic arm (e.g., located within the predefined zones associated with the robotic arm), the user may selectively instruct the robotic arm to load/unload items on a pallet-by-pallet basis (e.g., for each pallet individually). As another example, in the case of a plurality of pallets corresponding to the robotic arm, the user may selectively instruct the robotic arm to load/unload a subset of the pallets, or all the pallets, corresponding to the robotic arm.

According to various embodiments, an input indicating explicitly the items expected and/or desired to be loaded, such as an invoice or manifest, may be received. For example, in response to receiving an order or an instruction to fulfill an order, a manifest or listing of items corresponding to the order may be generated (hereinafter referred to as the "manifest"). In connection with fulfillment of the order, the robotic system may be instructed to palletize the items corresponding to the manifest. Palletizing the items for the manifest may include stacking items on one or more pallets. In the case of a plurality of pallets disposed within predefined zones corresponding to the robotic arm, the robotic arm may simultaneously (e.g., concurrently and/or contemporaneously) stack items corresponding the manifest on a plurality of pallets.

A pallet may have an identifier thereon and the robotic system may associate the identifier of the pallet with a manifest. For example, the robotic system may store (or have access to) a data storage that stores mappings of pallet identifiers to manifests. As another example, the predefined zone may be temporarily associated with a manifest (e.g., while the robot is palletizing/depalletizing items from one or more pallets inserted the predefined zone at various times). The association between the predefined zone and the manifest may be stored in a mapping of predefined zones to manifests. The robotic system may use the association between a manifest and a pallet identifier or predefined zone in which the pallet is located in connection with placing an item on a pallet (or in the case of de-palletizing, in connection with placing the item on the conveyor, etc.). The simultaneous (e.g., concurrent or contemporaneous) stacking of items on a plurality of pallets corresponding to the same manifest provides greater flexibility in planning the manner by which items are to be stacked on a pallet. For example, the robotic system can determine the pallet on which the item fits best (e.g., results in a most efficiently packed stack and/or results in a better stack stability metric).

At 210, planning (or re-planning) is performed to generate a plan to pick/place items based on the high level objective received at 205 and available sensor information. For example, in the example shown in FIG. 1, 3D or other image data generated by one or more of cameras 112, 114, and 116 may be used, along with sensor data from sensors not shown in FIG. 1 (e.g., weight sensors) to identify and determine a plan to pick, place, and stack on receptacle 106 items arriving via conveyor 104.

In some embodiments, the system may make a plan based at least in part on a manifest (e.g., invoice or other list corresponding to an order, etc.). A plan to stack items may be generated based on item size, weight, density, weight distribution, rigidity, capacity of the item and/or its box or other packaging to support weight stacked on top of the item, etc. The control computer in some embodiments controls the order in which items arrive at the loading location, such as via conveyor 104 (or via one or more conveyors). In some embodiments, items may arrive in an order not known a priori and/or the list of items may not be known. In some such embodiments, cameras (e.g., 112, 114, 116) and/or other sensors are used to identify items and/or their attributes, generate/update a plan to stack items on a pallet (e.g., pallet 106), and/or to determine strategies to grasp, pick up, move, and place each item in its corresponding place according to the stacking plan determined at 210.

According to various embodiments, the robotic system determines the plan to pick/place the item in order to pack or stack the items in a manner that the pallets are stable and packed densely. As an example, one or more thresholds pertaining to the manner by which items are packed or stacked on a pallet may be used in connection with determining the plan to pick/place the item. The one or more thresholds may be set by a user (e.g., an administrator). In some embodiments, a threshold may be set based on a machine learning process such as a machine learning process that improves planning process such as based at least in part on historical information (e.g., historical information pertaining to the stacking of items on a pallet, or of the individual placement/attributes of an item). The one or more thresholds may include (i) a packing efficiency threshold pertaining to a measure of packing density of a pallet, (ii) a stability threshold pertaining to a measure of a stability of the stack of items on the pallet, (iii) a fit threshold pertaining to a measure of the manner by which an item fits on the pallet (e.g., on an existing stack, etc.). The robotic system may use the thresholds as respective minimum values that must be obtained (or expected to be obtained) by the expected placement of the item at a particular destination location.

In some embodiments, a model of items on a pallet may be generated. For example, the model may be generated for the stack of items on a pallet. The model may be updated as a new item is added to the pallet (e.g., placed on the pallet). Alternatively, or additionally, the model may be updated at predefined time intervals that may be configurable by a user/administrator. The model of items with respect to a particular pallet may be modeled each time an item is determined to be picked/placed by a robotic arm, and/or each time the robotic system determines that the item is associated with a manifest corresponding to one or more pallets. However, in some embodiments, the model of items with respect to a pallet may be cached and obtained in response to a determination that an item associated with a manifest corresponding to the item. The robotic system may obtain the cached model and update the model in response to a determination that one or more other items have been placed on the pallet since the model was generated. In some embodiments, the robotic system updates and caches the model after the robotic arm places an item on the pallet to avoid the model having to be computed/updated at a time that a next item is to be placed on the pallet.

In response to determining that an items is to be picked and placed on a pallet, the robotic system may determine a set of pallets on which the item may be placed based at least in part on a determination of a manifest with which the item is associated. In response to determining the manifest corresponding to the item, the robotic system may perform a lookup in a mapping of manifests to pallets to determine one or more pallets on which the item may be placed to allow the item to be included in the fulfillment of the manifest. In some cases, all of the one or more pallets are within range of a particular robotic arm (e.g., are within the predefined zones corresponding to the robotic arm). In other cases, a subset of the one or more pallets are within range of a particular robotic arm (e.g., a subset of the one or more pallets may not yet be placed in a zone for any robotic arm, and/or a subset of the one or more pallets may be placed in a predefined zone corresponding to a different robotic arm). Accordingly, the robotic system may further determine the one or more pallets on which the item may be placed by the robotic arm based on the mapping of manifests to pallets, and/or a mapping of pallets to robotic arms and/or predefined zones.

In response to determining that the item may be placed on one or more pallets corresponding to a robotic arm, the robotic system may determine the manner by which the item is to be placed on the one or more pallets. A pallet may correspond to a robotic arm if the pallet is currently in a predefined zone for the robotic arm. As an example, if the item may be placed on one of a plurality of pallets corresponding to a robotic arm, the robotic system may select one of the plurality of pallets on which to place the item. Selection of the pallet on which to place the item may include determining a pallet or stack on which the item is best fit (e.g., relative to the placing of the item on other pallets/stacks). In some embodiments, the robotic system uses the corresponding models of items with respect to the pallets in connection with determining the pallet or stack on which to place the item. For example, the robotic system may simulate/model the placing of the item on one or more of the pallets on which the item may be placed, and determine one or more expected characteristics associated with the pallet or items on the pallet if the item were placed on the pallet. The one or more characteristics associated may comprise one or more of a metric pertaining to a stability of the items on the pallet (e.g., a stability of the stack of item), a metric pertaining to a density of the items on the pallet, a fit of the item relative to other items on the pallet, etc.

In some embodiments, the robotic system simulates placing the item a different locations on a particular pallet to determine a location at which the item best fits based at least in part on at least a subset of the aforementioned one or more characteristics. The robotic system may simulate placing the item at a plurality of locations with respect to a particular pallet, and may perform such a simulation with respect to a plurality of the pallets on which the item may be placed (e.g., a plurality of pallets associated with the manifest to which the item belongs). The robotic system may determine the destination location of the item based at least in part on the one or more simulations of placing the item. For example, the robotic system may determine the destination location based at least in part on the expected one or more characteristics associated with placing an item at the various locations according to the one or more simulations. A composite score associated with placing an item at a particular location may be determined based at least in part on the one or more characteristics (e.g., density of the stack, stability of the stack, fit of the item relative to other items, etc.). In some embodiments, the one or more characteristics have corresponding weightings used in determining a composite score associated with placing the item at a particular location.

The robotic system may determine the destination location as corresponding to location having the highest corresponding composite score among the different simulations/models for placing the item on the pallet. In some embodiments, the destination location is determined based at least in part on the simulations and a cost function. For example, a set of destination locations for which the composite score satisfies (e.g., exceeds) a threshold value may be determined, and the robotic system may select, from among the set of destination locations, the destination location having the most efficient result (e.g., lowest cost) with respect the cost function as the destination location at which the item is to be placed. In some embodiments, the set of destination locations from which the destination location is selected is determined based at least in part on (i) each of the destination locations having characteristics that satisfy minimum characteristic values (e.g., characteristic values for fit, stability, efficiency, etc.), and (ii) each of the destination locations having a composite score that satisfies the threshold composite score value.

The stability of the items on a pallet may be impacted by one or more attributes associated with an item. The attributes may include a shape of an item, a center of gravity of an item (or an expected center of gravity of the item), a type of packing (e.g., a cardboard box, a polybag, etc.), a weight of the item, an indication that the item is fragile, etc. As an example, an item that is relatively light or an irregular shaped item may cause a stack of items to be relatively unstable if the item is placed at a lower part of the stack. In the case of an item that is a pillow, the stability of a stack of items may be improved by placing the pillow at the top or near the top of the stack compared to placement of the pillow at the bottom or near the bottom/middle of the stack. The robotic system may obtain one or more attributes associated with an item. For example, the robotic system may obtain the one or more attributes when the item is provided on the conveyor (e.g., as the item is brought within proximity of the robotic arm), or when the item is determined to be the next item to be picked up from the conveyor. In some embodiments, the obtaining the one or more attributes comprises obtaining (e.g., scanning) one or more identifiers on the item, such as a bar code, a QR code, a near field communication label/tag, etc. Attributes may be pre-stored in association with the item, the type of item, etc. For example, in response to obtaining an identifier associated with the item, the robotic system may perform a look up against a mapping of items (or identifiers of items) to attributes. In some embodiments, an attribute is obtained by one or more upstream sensors or computers and stored in association with the item. The robotic system may retrieve from a data structure the attributes associated with an item that were obtained by the one or more upstream sensors. A sensor or sensor array may be used in connection with determining a size of the item. The sensor or sensor array may be dispose on or around the conveyor, or within the workspace of the robotic arm. Additionally, or alternatively, the robotic system may determine one or more attributes associated with the item in response to picking up the item. For example, a weight of the item may be determined in response to picking up the item via one or more sensors such as a force sensor, or a current sensor, or other sensor that measures an amount of work expended to lift the item, etc. As another example, the robotic arm may move the item within a threshold range/area of one or more sensors that may obtain an identifier associated with the item (e.g., a barcode on the item), and the identifier may be used to obtain a pre-stored attribute.

The one or more attributes associated with an item may be used to determine the plan for picking/placing the item. For example, the robotic system may determine a trajectory along which the item is to be moved from a source location (e.g., a location on the conveyor) to the destination location (e.g., the location on the pallet on which the item is to be placed). As another example, the one or more attributes associated with the item may be used in connection with determining the destination location as simulating the placing of the item at different locations on the pallet, or at different locations on different pallets for the corresponding manifest.

In some embodiments, the robotic system determines the plan for picking/placing the item based on an efficiency or cost function associated moving the item from the source location to the destination location. As an example, the robotic system may determine the plan based on an optimization of the efficiency or cost function. As another example, the robotic system may determine the plan such that a minimum efficiency threshold and/or a minimum value threshold of a cost function is satisfied by the corresponding moving of the item from the source location to the destination location. One or more values pertaining to an efficiency of a plan may include an expected time for the robotic arm to move the item, a difference in height between the source location and the destination location, a distance (e.g., a Euclidian distance, etc.) between the source location and the destination location, etc. In some embodiments, a cost function comprises one or more variables pertaining to the picking/placing of the item at the destination location, an expected stability of the stack of items on the pallet (e.g., after the item is placed at the destination location), a measure of fit of the item at the destination location, a number of pallets to be used to palletize all items corresponding to a particular manifest, etc. The cost function may include one or more weightings for the one or more variables included in the cost function. The variables included in determining the cost of moving an item may include one or more of (i) an amount of time the robotic arm is expected to take to move the item from the source location to the destination location, (ii) an amount of work that the robotic arm is expected to exert to move the item, (iii) a distance that the item is to be moved, (iv) a path or trajectory along which the item is to be moved, etc., (v) downstream conveyance availability, (vi) one or more characteristics of the item to be moved or an item(s) at the destination location, including item size, item weight, item packaging type, item rigidity, flatness and/or surface uniformity of a destination location surface, a characteristic of item(s) at the destination location (size, weight, packaging types, rigidity, etc.), etc.. Various other variables may be included in determining the cost associated with moving the item. The order of moving a set of items may be determined based on an aggregated cost of moving the set of items (e.g., the individual cost of moving an item in the set of items may be determined, and an aggregated cost of moving the set of items may be determined based on the individual costs). In some embodiments, the variables included in determining a cost of moving an item (e.g., a variable in the cost function) may have different weightings. For example, the time and/or work associated with lifting an item may be greater than the time and/or work associated with lowering an item. Accordingly, even if the distance between lifting an item to a certain location is the same as lowering the item to a different location, the cost associated with moving the item to the different locations may be different.

According to various embodiments, the system determines a plan for moving an item or a set of item based at least in part on an optimization of a cost of moving the item or the set of items subject to one or more conditions. The one or more conditions may include conditions or rules that the system with which the system complies in moving items. Examples of conditions may include one or more (i) a collision between the item and another item/object is avoided during moving, (ii) the item is moved within a predefined area (e.g., to avoid the robotic arm operating in an area reserved for humans or for another robot), (iii) a stability threshold of a stack of items at source location and/or destination location such as based on the moving of the item, (iv) a speed at which the robotic arm moves, (v) a time that the robotic arm is expected to take to move the item, (vi) a likelihood that the item is moved successfully, (vii) a stability of force between the end effector of the robotic arm and the item (e.g., a stability of the grip on the item), etc. Various other conditions may be used in connection with bounding the system for moving.

In some embodiments, a pallet may be deemed to correspond to a robotic arm if the pallet is currently in a predefined zone for the robotic arm and/or planned to be inserted into a predefined zone at a future time when a predefined zone is available. In such as case, the robotic system may determine that the item is to be placed on such a to-be inserted pallet, and the robotic system may determine the plan for picking and placing the item to comprise picking the item from the conveyor and placing the item in a buffer or staging area until such time that the corresponding pallet is inserted into the predefined zone and the item is determined to be placed on such pallet.

In some embodiments, in response to determining that no suitable locations on one or more pallets corresponding manifest to which the item belongs currently exist, the robotic system may determine to pick and place the item in a buffer or a staging area. The buffer or staging area may be a preset area within the workspace in which items are at least temporarily stored until the robotic system determines that an ideal location on one of the one or more pallets exists (e.g., a location for which criteria pertaining to stability, fit, and/or efficiency, etc. are satisfied). The robotic system may determine that placing one or more upstream items (e.g., items to be delivered via the conveyor within a threshold time and/or threshold number of items) on the pallet before the current item would result in a better stack (e.g., better fit, stability, efficiency, etc.). In response to such a determination, the robotic structure may control the robotic arm to pick and place the one or more upstream items before picking and placing the current item. As an example, the current item may be moved temporarily to the buffer/staging area while, or until such time that, the robotic arm stacks the one or more upstream items.

According to various embodiments, a set of paths or trajectories for picking and placing an item is determined, and the path or trajectory along which the item is to be moved is selected from the set of paths or trajectories. The path or trajectory may be selected based on various properties associated with the corresponding paths or trajectories within the set. Examples of the properties associated with the corresponding paths or trajectories that may be used in connection with selecting the path or trajectory include a speed with which the item is to be moved, a destination location at which the item is to be picked, a probability of success that the item is to picked and placed at the destination location according to the particular path or trajectory, an indication of whether another item or object within the workspace intersects with the particular path or trajectory, an indication that a region or area in the workspace is restricted intersects with the particular path or trajectory, etc. In some embodiments, the probability of success that the item is to be picked and placed at the destination location according to the particular path or trajectory is determined for at least a subset of the set of paths or trajectories, and the path or trajectory is selected based on the corresponding probability of success relative to the probability of success corresponding to other paths or trajectories. As an example, the path or trajectory is selected in response to determining that the probability of success corresponding to the path or trajectory exceeds a threshold probability, or exceeds a threshold number or percentage of other paths or trajectories within the subset.

According to various embodiments, an item to be palletized/depalletized, a source location from which an item is to be obtained, and/or a destination location may be determined based at least in part on a cost (e.g., a result of a cost function) with moving the item. The cost may be a determined based at least in part on a predefined cost function, which may include one or more variables pertaining to the picking and placing the item. The system may determine an item to be palletized/depalletized, a source location from which an item is to be obtained, and/or a destination location in a manner that optimizes a cost of moving the item and/or that moving an item satisfies one or more cost value thresholds.

In some embodiments, a system includes plurality of inputs source locations (e.g., a plurality of conveyors that bring items to the robotic arm for palletizing), and a cost associated with moving an item from a first conveyor having a first height is different from a cost associated with moving a same item from a second conveyor having a second height, the second height being different from the first height. The cost of moving the item may take into account a distance that the item moves (e.g., that the robotic arm is to move the item) from the source location to the destination location. For example, a length of the path or trajectory over which the item is to move may be determined and the cost of moving the item may be determined based at least in part on the length of the path or trajectory. As another example, a distance from the source location of the item to a destination location may be determined, and the cost of moving the item may be determined based at least in part on the distance. The distance may be computed as the Euclidian distance between source location of the item to a destination location.

An order of moving a set of items may be determined in a manner that minimize/optimize a cost of moving the set of items (or a subset of two or more of the set of items). Similarly, a manner by which the set of items are palletized (e.g., an arrangement of items in the stack) may be determined in manner that minimize/optimize a cost of moving the set of items (e.g., minimizes/optimizes the cost of stacking the items). For example, a model or simulation of moving a plurality of items may be determined, and an aggregate cost of moving the plurality of items may be determined based at least in part on variables associated with the cost of moving items. The optimization of moving the set of items may be conditioned on one or more conditions being satisfied. In some embodiments, the order of moving the set of items is determined based on a determination that the order of moving the items satisfies one or more cost value thresholds (e.g., ensuring that a minimum cost of moving the set of items, or an item within the set is satisfied). Various attributes of items within the set of items may affect the order in which items are moved and/or the cost associated with moving the set of items in the order. For example, a cost of moving a set of items in which an item has a relatively large height may be optimized if such item is moved in a manner that minimizes/reduces the distance in the height direction that a robotic arm is to move the item. In the case of palletizing a set of items in which an item has a relatively large height, the cost of moving the set of items may be improved if the item having a relatively large height is moved from the conveyor to the pallet as the stack of items on the item is relatively low (e.g., to reduce the amount by which the robot has to raise the item to place on the stack/pallet). Accordingly, in the case of the palletizing the set of items, the item having a relatively large height may be moved before the height of the stack reaches a threshold height after which the robotic arm may be required to lift the item onto the stack (e.g., rather than lower the item onto the stack).

At 250, items are picked (e.g., grasped from conveyor 104, in the example shown in FIG. 1), moved through a (predetermined/planned) trajectory to a location near where the item is to be placed, and placed at the destination location according to the plan determined and/or updated at 230.

In various embodiments, a packing plan may include planned use of stackable trays, crates, boxes, bins, or other containers to group smaller and/or irregularly-shaped items and pack as a more readily stacked unit. In some embodiments, in a depalletizing operation a robotic system as disclosed herein is configured to recognize such containers, open them if needed, and empty them by removing individual items. Once emptied, the container is moved to a staging location, from which in various embodiments other robots and/or human workers may retrieve and move them out of the way.

In the example shown, (re-)planning and plan implementation (210, 215) continue until the high level objective (205) is completed (220), at which the process 200 ends. In various embodiments, re-planning (210) may be triggered by conditions such as arrival of an items that is not expected and/or cannot be identified, a sensor reading indicating an attribute has a value other than what was expected based on item identification and/or associated item model information, etc. Other examples of unexpected conditions include, without limitation, determining that an expected item is missing, reevaluating item identification and determining an item is other than as originally identified, detecting an item weight or other attribute inconsistent with the item as identified, dropping or needing to re-grasp the item, determining that a later-arriving item is too heavy to be stacked on one or more other items as contemplated by the original and/or current plan, and detecting instability in the set of items as stacked on the receptacle.

Figure 2B:
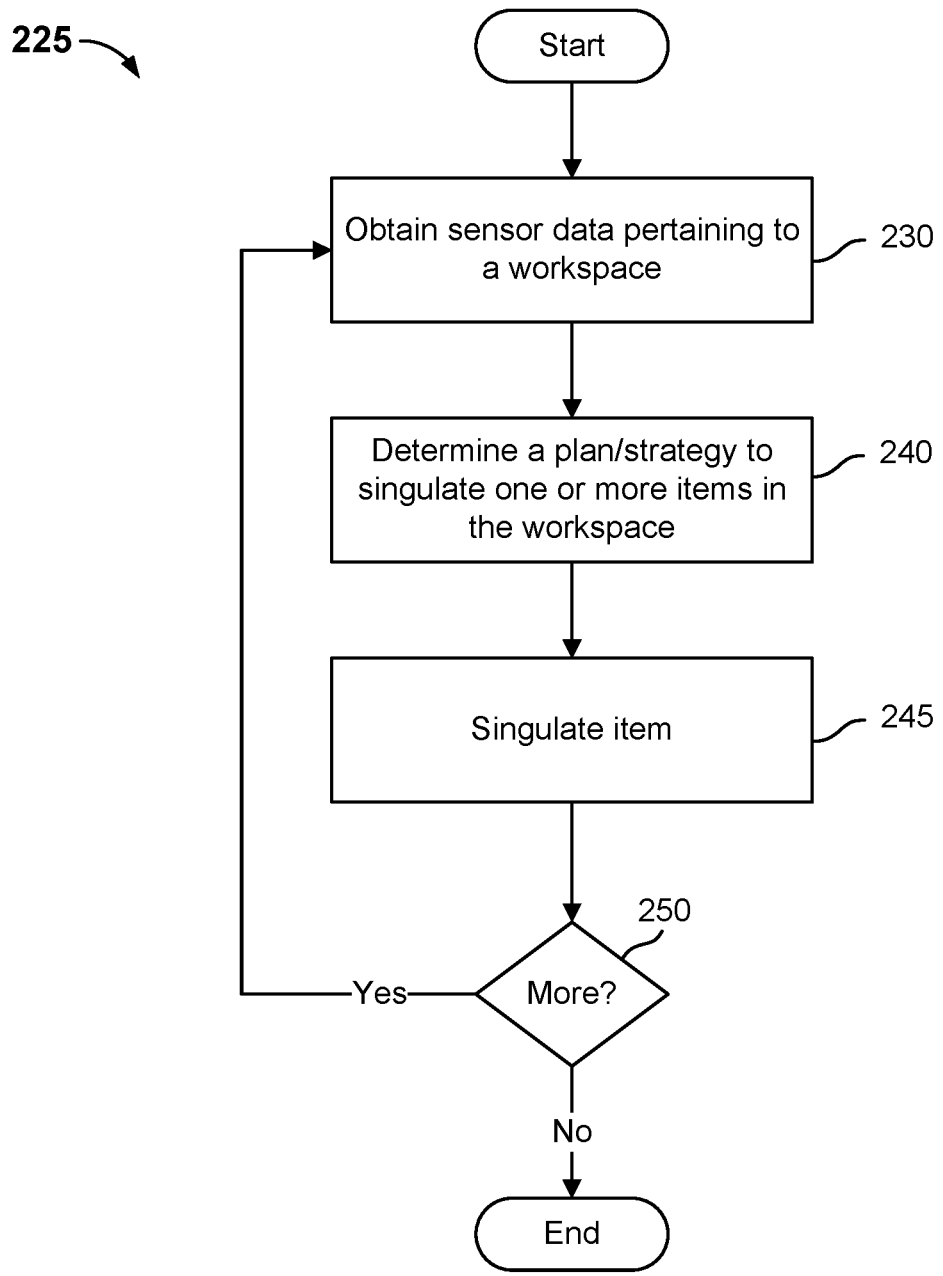
FIG. 2B is a flow chart illustrating an embodiment of a process to singulate an item.

FIG. 2B is a flow chart illustrating an embodiment of a process to singulate an item. In some embodiments, process 225 is implemented by a robot system operating to singulate one or more items within a workspace. The robot system includes one or more processors which operate, including by performing the process 225, to cause a robotic structure (e.g., a robotic arm) to pick and place items for sorting.

At 230, sensor data pertaining to the workspace is obtained. In some embodiments, a robotic system obtains the sensor data pertaining to the workspace from one or more sensors operating within the system. As an example, the sensor data is obtained based at least in part on outputs from image sensors (e.g., 2D or 3D cameras), an infrared sensor array, a laser array, a scale, a gyroscope, a current sensor, a voltage sensor, a power sensor, a force sensor, a pressure sensor, and the like.

According to various embodiments, the obtained sensor data pertaining to the workspace comprises information from which a model of the workspace may be generated. For example, one or more characteristics associated with the workspace is determined based at least in part on the sensor data. The sensor data can be used in connection with determining at least one characteristic of one or more items within the workspace such as items in the source pile/flow of the chute, or an item grasped by the robotic arm. In some embodiments, the sensor data is used in connection with determining one or more characteristics of the conveyor such as determining the slots on the conveyor that are empty or unreserved, determining a speed of the conveyor, and/or determining the characteristics of at least one slot or of at least one item already on the conveyor.

At 240, a plan or strategy to singulate one or more items in the workspace is determined. In some embodiments, a robotic system determines the plan or strategy to pick at least one item from a source pile/flow in the workspace and to singly place the at least one item in a slot on the conveyor. The plan or strategy to singulate the one or more items is determined in various embodiments on a robot by robot basis such that if the robotic system includes a plurality of robots, each robot operates independent of the other robot (s).

According to various embodiments, the plan or strategy to singulate the one or more items in the workspace is determined based at least in part on the sensor data. For example, the plan or strategy to singulate the one or more items includes selecting an item within the source pile/flow that is to be singulated. The selected item can be identified from among other items or objects within the workspace based at least in part on the sensor data (e.g., the boundaries of the item and other items or objects within the workspace can be determined). As an example, one or more characteristics pertaining to the selected item is determined based at least in part on the sensor data. The one or more characteristics pertaining to the selected item can include a dimension of the item, a packaging of the item, one or more identifiers or labels on the item (e.g., an indicator that the item is fragile, a shipping label on the item, etc.), an estimated weight of the item, and the like, or any combination thereof. As another example, the plan to singulate the one or more items includes determining a location on the conveyance structure (e.g., a slot on the conveyor) at which the robotic structure (e.g., the robotic arm) is to singly place the item. The location on the conveyor at which the item is to be placed can be determined based at least in part on a timestamp, a speed of the conveyor, and one or more characteristics of a slot in the conveyor (e.g., an indication of whether the slot is occupied or reserved), and the like, or any combination thereof. As another example, the plan or strategy to singulate the one or more items includes determining a path or trajectory of the item along which the robotic arm is to move the item during singulation. The path or trajectory of the item along which the item is to be moved can be determined based at least in part on a location of one or more other objects within the workspace such as a frame of the chute, other items in the source pile/flow, items on the conveyor, other robots operating within the workspace, a reserved airspace for operation of other robots, sensors within the workspace, etc. For example, the path or trajectory of the item is determined to move a part of the item comprising an identifier (e.g., a shipping label) to an area at which a scanner is able to scan the identifier, or the path or trajectory of the item is determined to maximize a likelihood that the identifier on the item is read by one or more scanners along the path or trajectory.

According to various embodiments, the plan or strategy to singulate the one or more items is determined based at least in part on a cost associated with moving the one or more items. The system may determine the plan or strategy for moving an item based at least in part a cost of moving the item such as by determining a plan or strategy that minimizes a cost of moving the item. To minimize the cost of moving the item may include optimizing the cost subject to one or more predetermined conditions or constraints. In some embodiments, the system determines the plan or strategy for moving the item in a manner that moving the item according to the plan or strategy is expected to cost less than a cost value threshold. The costs associated with moving the item may be based at least in part on an attribute associated with the item (e.g., a size of the item), a location in the workspace from which the item is to be picked (e.g., a location on the chute), a destination location on the conveyor at which the item is to be placed, etc. In some embodiments, the presence of one or more other items or objects in the workspace (e.g., an item already on the conveyor) may impact a cost of moving an item according to a path/trajectory, etc.

At 245, the item is singulated. In some embodiments, the item is singulated in response to the plan or strategy for singulating the item being determined. For example, a robotic arm is operated to pick one or more items from the workspace and place each item singly in a corresponding location in a singulation conveyor. The singulation of the item comprises picking the item from the workspace (e.g., from the source pile/flow) and singly placing the item on the conveyor. The robot system singulates the item based at least in part on the plan or strategy for singulating the item.

At 250, a determination is made as to whether further items are to be singulated. If there are more items, a further iteration of steps 230, 240, 245, and 250 is performed, and successive iterations are performed until it is determined at 250 that there are no more items in the chute (or other receptacle or source) to be picked and placed.

Figure 2C:
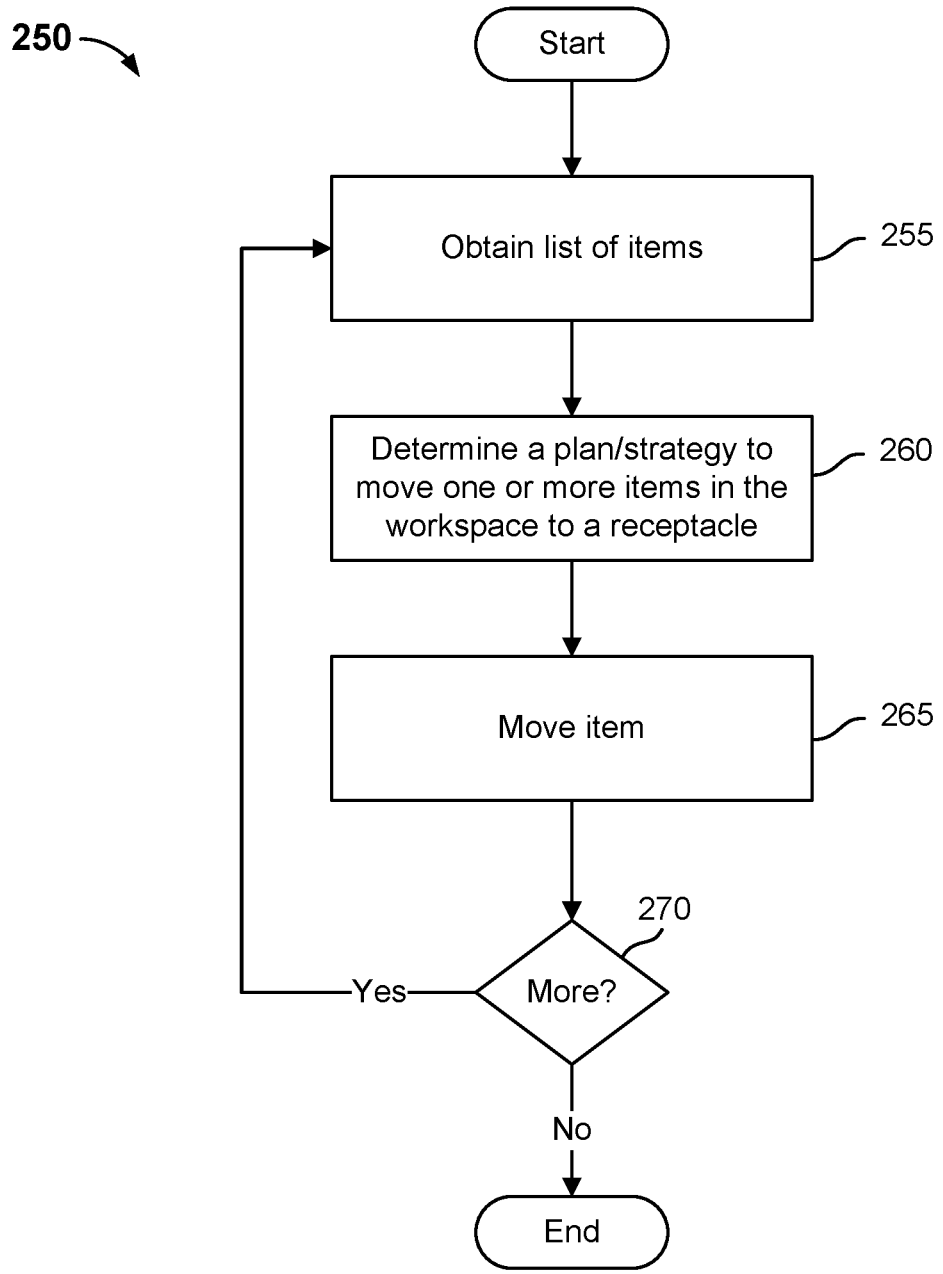
FIG. 2C is a flow chart illustrating an embodiment of a process to assemble a kit of items.

FIG. 2C is a flow chart illustrating an embodiment of a process to assemble a kit of items. In some embodiments, process 255 is implemented by a robot system operating to kit one or more items within a workspace. The robot system includes one or more processors which operate, including by performing the process 250, to cause a robotic structure (e.g., a robotic arm) to pick and place items for assembling a set of items into a kit.

At 230, a list of items is obtained. In some embodiments, a robotic system obtains a list of items to assembly into one or more kits. The list of items may be obtained from an invoice or manifest such as an invoice or manifest corresponding to an order, or otherwise obtained from an order or information indicating that a set of items is to be provided to another location. The list of items may be obtained from a data structure such as a data structure shared with a warehouse system or with another robotic system.

At 240, a plan or strategy to move one or more items in the workspace is determined. In some embodiments, a robotic system determines the plan or strategy to pick at least one item from a shelf (e.g., a shelf of a shelf machine) in the workspace and to place the at least one item in a receptacle such as a box, tray, tote, bag, or other receptacle. The receptacle may be on a conveyor. The plan or strategy to singulate the one or more items may be determined in various embodiments on a robot by robot basis such that if the robotic system includes a plurality of robots, each robot operates independent of the other robot(s).

The plan or strategy to move the one or more items may be determined based at least in part on sensor data pertaining to the workspace. In some embodiments, a robotic system obtains the sensor data pertaining to the workspace from one or more sensors operating within the system. As an example, the sensor data is obtained based at least in part on outputs from image sensors (e.g., 2D or 3D cameras), an infrared sensor array, a laser array, a scale, a gyroscope, a current sensor, a voltage sensor, a power sensor, a force sensor, a pressure sensor, and the like.

According to various embodiments, the obtained sensor data pertaining to the workspace comprises information from which a model of the workspace may be generated. For example, one or more characteristics associated with the workspace is determined based at least in part on the sensor data. The sensor data can be used in connection with determining at least one characteristic of one or more items within the workspace such as items on a shelf or on a shelf system, or an item grasped by the robotic arm. In some embodiments, the sensor data is used in connection with determining one or more characteristics of the conveyor such as determining the slots or receptacles on the conveyor that are empty or unreserved, determining a speed of the conveyor, and/or determining the characteristics of at least one slot or of at least one item already on the conveyor.

According to various embodiments, the plan or strategy to move the one or more items in the workspace is determined based at least in part on the sensor data. For example, the plan or strategy to move the one or more items includes selecting an item within that is to be moved. The selected item can be identified from among other items or objects within the workspace (e.g., other items on shelves) based at least in part on the list of items and/or sensor data (e.g., the boundaries of the item and other items or objects within the workspace can be determined). As an example, one or more characteristics pertaining to the selected item is determined based at least in part on the sensor data. The one or more characteristics pertaining to the selected item can include a dimension of the item, a packaging of the item, one or more identifiers or labels on the item (e.g., an indicator that the item is fragile, a shipping label on the item, etc.), an estimated weight of the item, and the like, or any combination thereof. As another example, the plan to move the one or more items includes determining a location on the conveyor (e.g., a slot or receptacle on the conveyor) at which the robotic structure (e.g., the robotic arm) is to place the item. The location on the conveyor at which the item is to be placed can be determined based at least in part on a timestamp, a speed of the conveyor, and one or more characteristics of a slot or receptacle in the conveyor (e.g., an indication of whether the slot is occupied or reserved, an identifier associated with the slot or receptacle such as in the case that an identifier on a receptacle is mapped to a manifest, etc.), and the like, or any combination thereof. As another example, the plan or strategy to move the one or more items includes determining a path or trajectory of the item along which the robotic arm is to move the item. The path or trajectory of the item along which the item is to be moved can be determined based at least in part on a location of one or more other objects within the workspace such as a frame of the chute, other items in on a shelf or shelf system, items on the conveyor, other robots operating within the workspace, a reserved airspace for operation of other robots, sensors within the workspace, etc. For example, the path or trajectory of the item is determined to move a part of the item comprising an identifier (e.g., a shipping label) to an area at which a scanner is able to scan the identifier, or the path or trajectory of the item is determined to maximize a likelihood that the identifier on the item is read by one or more scanners along the path or trajectory.

According to various embodiments, the plan or strategy to move the one or more items is determined based at least in part on a cost associated with moving the one or more items. The system may determine the plan or strategy for moving an item based at least in part a cost of moving the item such as by determining a plan or strategy that minimizes a cost of moving the item. To minimize the cost of moving the item may include optimizing the cost subject to one or more predetermined conditions or constraints. In some embodiments, the system determines the plan or strategy for moving the item in a manner that moving the item according to the plan or strategy is expected to cost less than a cost value threshold. The costs associated with moving the item may be based at least in part on an attribute associated with the item (e.g., a size of the item), a location in the workspace from which the item is to be picked (e.g., a location on the shelf or shelf system), a destination location on the conveyor at which the item is to be placed, a particular receptacle in which to place the item (e.g., different receptacles may be located on different conveyors), etc. In some embodiments, the presence of one or more other items or objects in the workspace (e.g., an item or receptacle already on the conveyor, an item already in the receptacle to which the current item is to be moved, etc.) may impact a cost of moving an item according to a path/trajectory, etc.

At 245, the item is moved. In some embodiments, the item is picked and placed in response to the plan or strategy for singulating the item being determined. For example, a robotic arm is operated to pick one or more items from the workspace and place each item in a corresponding location in a receptacle. The singulation of the item comprises picking the item from the workspace (e.g., from the corresponding shelf) and placing the item on the conveyor or otherwise in the applicable receptacle. The robot system picks and places the item based at least in part on the plan or strategy for moving the item.

At 250, a determination is made as to whether further items are to be singulated. If there are more items, a further iteration of steps 310, 320, and 330 is performed, and successive iterations are performed until it is determined at 340 that there are no more items in the chute (or other receptacle or source) to be picked and placed.

Figure 3:
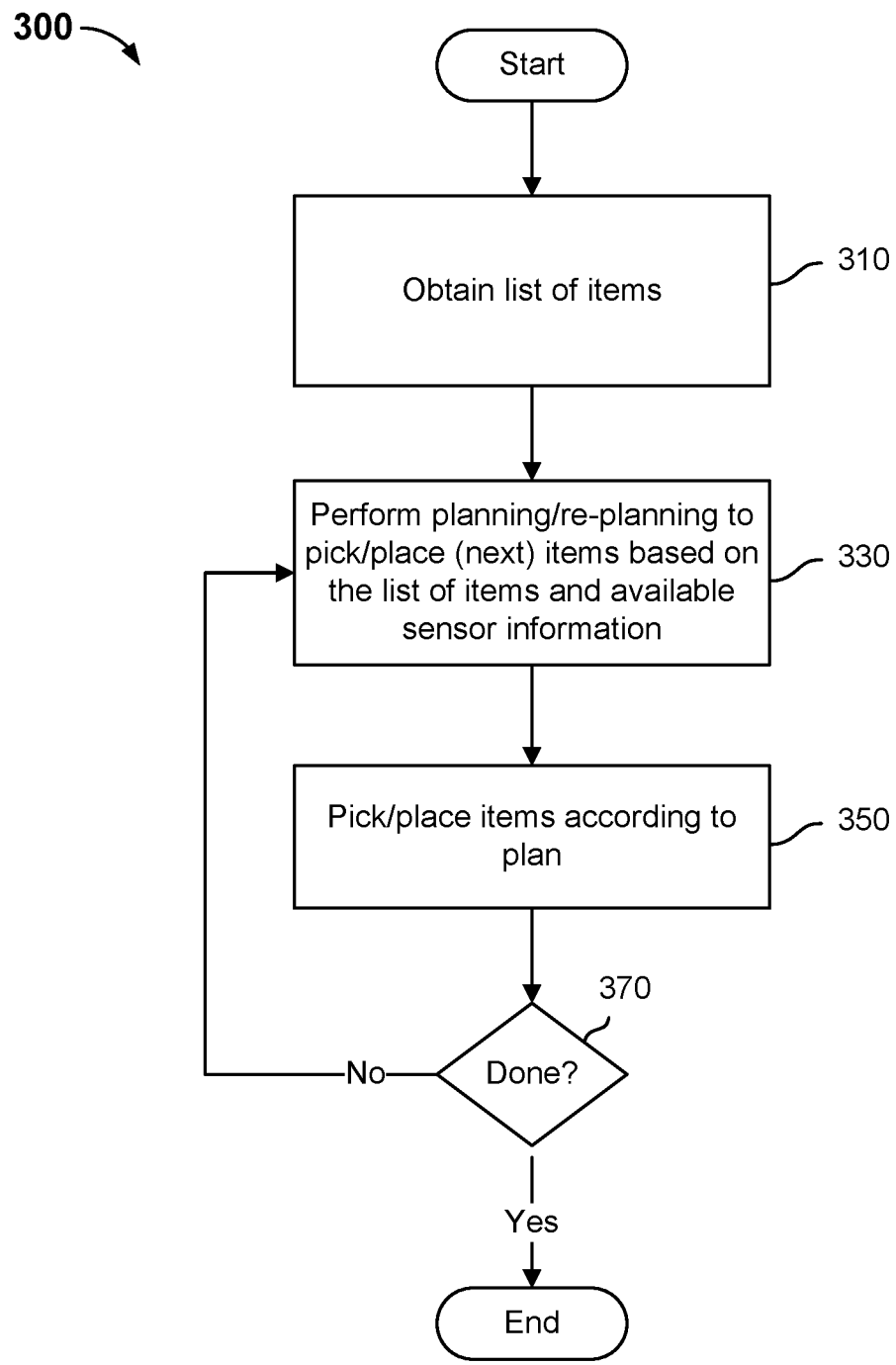
FIG. 3 is a flow chart illustrating an embodiment of a process to select and provide items for palletization.

FIG. 3 is a flow chart illustrating an embodiment of a process to select and provide items for palletization.

At 310, a list of items is obtained. The list of items may correspond to a set of items that are to be collectively palletized on one or more pallets. According to various embodiments, a set of items to be palletized is determined based at least in part on an indication that a manifest or order is to be fulfilled. For example, in response to receiving an order, a list of items for the order may be generated. As another example, a list of items corresponding to a plurality of orders to be sent to the same recipient may be generated.

The items may be located on a shelf or other location within a warehouse. In order to palletize the items, the items are moved to a robotic system that palletizes the items. For example, the items may be placed on one or more conveyors that move the items to within range of one or more robotic arms that palletize the items onto one or more pallets. In response to obtaining the list of items, at least of the items is associated with a particular robotic arm, a predefined zone corresponding to the particular robotic arm, and/or a particular pallet (e.g., a pallet identifier, a pallet located into a predefined zone), etc.

At 330, planning (or re-planning) is performed to generate a plan to pick/place items based on the list of items and available sensor information. The plan may include a one or more strategies for retrieving one or more items on the list of items and placing such items on the corresponding one or more conveyors to carry the items to a robotic arm. According to various embodiments, an order in which the items on the list of items are to be provided to the applicable robotic arm for palletizing is determined based at least in part on the list of items.

The order in which the items are placed on the conveyor may be at least loosely based on the items and an expected stack of the items on one or more pallets. For example, the system determining the order in which to place the items on the conveyor may generate a model of an expected stack(s) of the items, and determine the order based on the model (e.g., so as to first deliver items that form the base/bottom of the stack and progressively deliver items higher up the stack). In the case that the items on the list of items is to be palletized on a plurality of pallets, items that are expected to form the base/bottom of the respective stacks (or otherwise be relatively near the bottom of the stacks) may be placed on the conveyor before items that are expected to be substantially in the middle or top of the stacks. Various items that are to be palletized on the plurality of pallets may be interspersed among each other and the robotic system may sort the items upon arrival at the robotic arm (e.g., the robotic arm may pick and place the items onto an applicable pallet based at least on the item such as the identifier of the item or an attribute of the item). Accordingly, the items corresponding to the base/bottom portion of the corresponding stacks may be interspersed among each other and various items for each pallet/stack may be placed on the conveyor as the corresponding stack is built.

In some embodiments, the order and/or manner by which a set of items are moved (e.g., palletized and/or depalletized) is based at least in part on a cost associated with moving the set of items or a cost associated with moving at least one of the set of items. The system may determine the order and/or manner by which at least one of the set of items is to be moved based on a minimization/optimization of the cost of moving the set of items or the at least one of the set of items. The minimization/optimization of the cost may be determining a minimal/optimal cost associated with moving the item/set of items subject to one or more conditions (e.g., restricted airspace, stability threshold, time to move the items, etc.). In some embodiments, the minimization/optimization of the cost of moving the item/set of items includes determining an order and/or manner by which to move the item(s) such that a cost satisfies one or more cost value thresholds. The order by which a set of items are moved may be determined based on an aggregate cost of moving the items in the set of items (or a subset of the items in the set of items). The determining the manner by which an item is to be moved may include determining the plan or strategy for picking and placing the item, such as a determination of a path or trajectory along which the item is to be moved. The manner by which the item is to be moved may be based at least in part on a cost of moving the item. For example, a manner by which to move the item may be determined based at least in part on one or more cost value thresholds, or based at least in part on selecting a manner that minimizes/optimizes the moving of the item. The system may determine a set of different manners by which the item may be moved (e.g., different paths/trajectories, different destination locations on the pallet/stack, etc.), and a best one of the set of different manners may be selected.

The system may generate a model of one or more expected stacks for the items belonging to the list of items. The model may be generated based at least in part on one or more thresholds such as a fit threshold value or stability threshold value, other packing metric (e.g., density), etc. For example, the system can generate a model of a stack for which an expected stability value satisfies (e.g., exceeds) the stability threshold value. The model may be generated using a machine learning process. The machine learning process may be iteratively updated based on historical information such as previous stacks of items (e.g., attributes of items in previous stacks, performance metrics pertaining to the previous stacks such as stability, density, fit, etc.). In some embodiments, the model of the stack(s) for palletizing the items on the list of items is generated based at least in part on one or more attributes of the items.

Various attributes of an item may be obtained before or during the determining of the plan. Attributes may include a size of an item, a shape of an item, a type of packaging of an item, an identifier of an item, a center of gravity of an item, an indication of whether the item is fragile, an indication of a top or bottom of the item, etc. As an example, one or more attributes pertaining to at least a subset of the items may be obtained based at least in part on the list of items. The one or more attributes may be obtained based at least in part on information obtained by one or more sensors, and/or by performing a lookup in a mapping of attributes to items (e.g., item types, item identifiers such as serial numbers, model numbers, etc.).

At 350, items are picked and moved through a (predetermined/planned) trajectory to a location near where the item is to be placed on the corresponding conveyor, and placed at the destination location according to the plan determined and/or updated at 330.

In the example shown, (re-)planning and plan implementation (330, 350) continue until the high level objective of providing the items on the list of items is completed (370), at which the process 300 ends. In various embodiments, re-planning (330) may be triggered by conditions such as arrival of an items that is not expected and/or cannot be identified, a sensor reading indicating an attribute has a value other than what was expected based on item identification and/or associated item model information, etc. Other examples of unexpected conditions include, without limitation, determining that an expected item is missing, reevaluating item identification and determining an item is other than as originally identified, detecting an item weight or other attribute inconsistent with the item as identified, dropping or needing to re-grasp the item, determining that a later-arriving item is too heavy to be stacked on one or more other items as contemplated by the original and/or current plan, and detecting instability in the set of items as stacked on the receptacle.

Figure 4A:
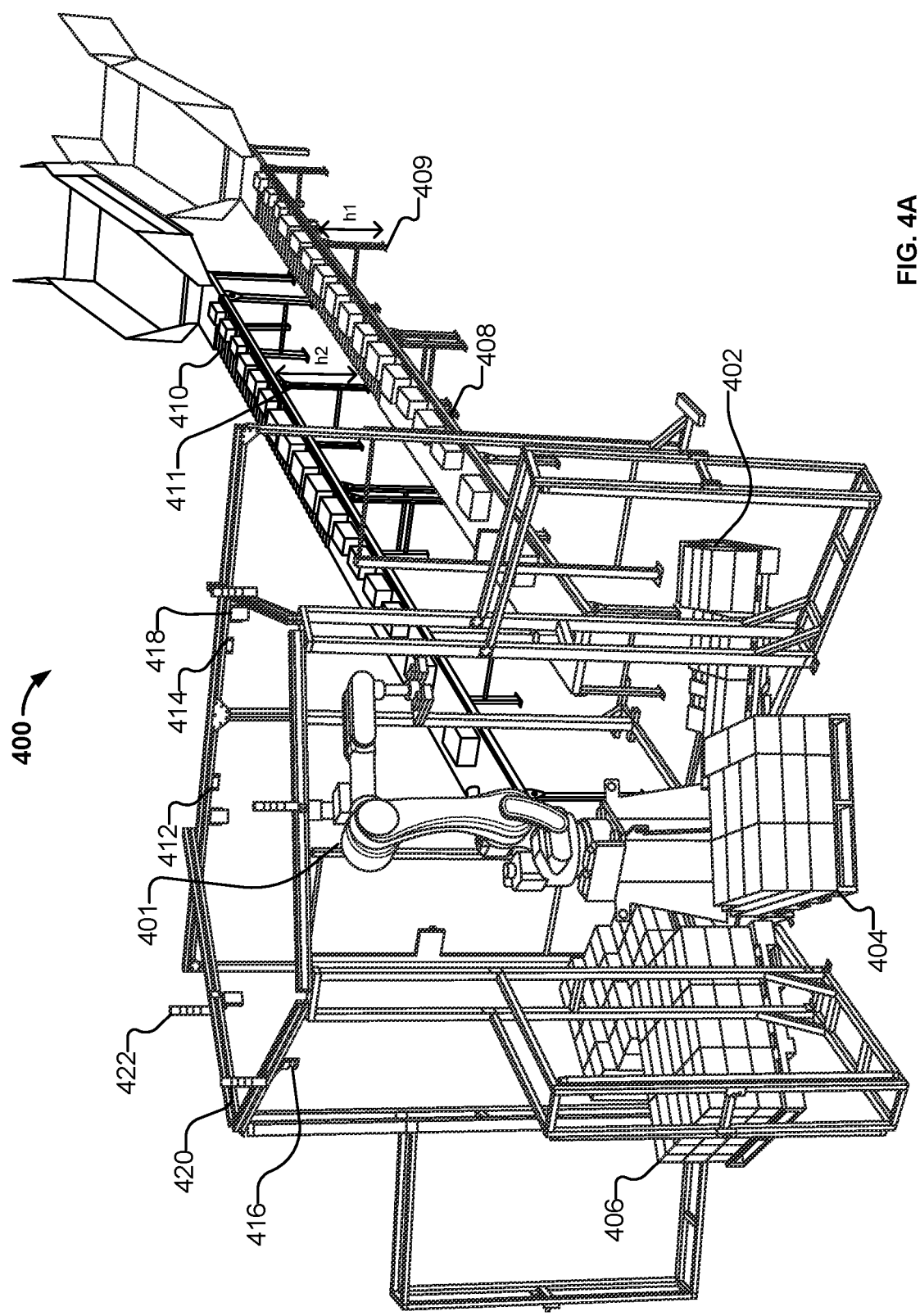
FIG. 4A is a diagram illustrating an embodiment of a robotic system to palletize and/or depalletize heterogeneous items.

FIG. 4A is a diagram illustrating an embodiment of a robotic system to palletize and/or depalletize heterogeneous items. In the example shown, system 400 includes a robotic arm 401. In this example the robotic arm 401 is stationary, but in various alternative embodiments robotic arm 401 may be a fully or partly mobile, e.g., mounted on a rail, fully mobile on a motorized chassis, etc. In other implementations system 400 may include a plurality of robotic arms with a workspace. As shown, robotic arm 401 is used to pick arbitrary and/or dissimilar items from one or more conveyor belts (or other source) 408 and 410, and the items on a pallet (e.g., platform or other receptacle) such as pallet 402, pallet 404, and/or pallet 406. In some embodiments, other robots not shown in FIG. 4A may be used to push/pull pallet 402, pallet 404, and/or pallet 406 into position to be loaded/unloaded and/or into a truck or other destination to be transported, etc.

As illustrated in FIG. 4A, system 400 may comprise one or more predefined zones. For example, pallet 402, pallet 404, and/or pallet 406 are shown as located within the predefined zones. The predefined zones may be denoted by marking or labelling on the ground or otherwise structurally such as via the frame shown in system 400. In some embodiments, the predefined zones may be located radially around robotic arm 401. In some cases, a single pallet is inserted into a predefined zone. In other case, one or pallets are inserted into a predefined zone. Each of the predefined zones may be located within range of robotic arm 401 (e.g., such that robotic arm 401 can place items on a corresponding pallet, or de-palletize items from the corresponding pallet, etc.). In some embodiments, one of the predefined zones or pallets located within a predefined zone is used as a buffer or staging area in which items are temporarily stored (e.g., such as temporary storage until the item is to be placed on a pallet in a predefined zone).

One or more items may be provided (e.g., carried) to the workspace of robotic arm 401 such as via conveyor 408 and/or conveyor 410. System 400 may control a speed of conveyor 408 and/or conveyor 410. For example, system 400 may control the speed of conveyor 408 independently of the speed of conveyor 410, or system 400 may control the speeds of conveyor 408 and/or conveyor 410. In some embodiments, system 400 may pause conveyor 408 and/or conveyor 410 (e.g., to allow sufficient time for robotic arm 401 to pick and place the items. In some embodiments, conveyor 408 and/or conveyor 410 carry items for one or more manifests (e.g., orders). For example, conveyor 408 and conveyor 410 may carry items for a same manifest and/or different manifests. Similarly, one or more of the pallets / predefined zones may be associated with a particular manifest. For example, pallet 402 and pallet 404 may be associated with a same manifest. As another example, pallet 402 and pallet 406 may be associated with different manifests.

System 400 may control robotic arm 401 to pick an item from a conveyor such as conveyor 408 or conveyor 410, and place the item on a pallet such as pallet 402, pallet 404, or pallet 420. Robotic arm 405 may pick the item and move the item to a corresponding destination location (e.g., a location on a pallet or stack on a pallet) based at least in part on a plan associated with the item. In some embodiments, system 400 determines the plan associated with the item such as while the item is on the conveyor, and system 400 may update the plan upon picking up the item (e.g., based on an obtained attribute of the item such as weight, or in response to information obtained by a sensor in the workspace such as an indication of an expected collision with another item or human, etc.). System 400 may obtain an identifier associated with the item such as a barcode, QR code, or other identifier or information on the item. For example, system 400 may scan/obtain the identifier as the item is carried on the conveyor. In response to obtaining the identifier, system 400 may use the identifier in connection with determining the pallet on which the item is to be placed such as by performing a look up against a mapping of item identifier to manifests, and/or a mapping of manifests to pallets. In response to determining one or more pallets corresponding to the manifest/order to which the item belongs, system 400 may select a pallet on which to place the item based at least in part on a model or simulation of the stack of items on the pallet and/or on a placing of the item on the pallet. System 400 may also determine a specific location at which the item is to be placed on the selected pallet (e.g., the destination location). In addition, a plan for moving the item to the destination location may be determined, including a planned path or trajectory along which the item may be moved. In some embodiments, the plan is updated as the robotic arm 401 is moving the item such as in connection with performing an active measure to change or adapt to a detected state or condition associated with the one or more items/objects in the workspace (e.g., to avoid an expected collision event, to account for a measured weight of the item being greater than an expected weight, to reduce shear forces on the item as the item moved, etc.).

According to various embodiments, system 400 comprises one or more sensors and/or sensor arrays. For example, system 400 may include one or more sensors within proximity of conveyor 408 and/or conveyor 410 such as sensor 412, sensor 414, and/or sensor 418. Sensor 418 may be a scanner that scans items (e.g., obtains information of items) as the items pass thereunder on conveyor 408. The one or more sensors may obtain information associated with an item on the conveyor such as an identifier or information on label on the item, or an attribute of the item such as a dimensions of the item. In some embodiments, system 400 includes one or more sensors and/or sensor arrays that obtain information pertaining to a predefined zone and/or a pallet in the zone. For example, system 400 may include a sensor 416 that obtains information associated with pallet 406 or the predefined zone within which pallet 406 is located. Sensors may include one or more 2D cameras, 3D (e.g., RGBD) cameras, infrared, and other sensors to generate a three-dimensional view of a workspace (or part of a workspace such as a pallet and stack of items on the pallet). The information pertaining to a pallet may be used in connection with determining a state of the pallet and/or a stack of items on the pallet. As an example, system 400 may generate a model of a stack of items on a pallet based at least in part on the information pertaining to the pallet. System 400 may in turn use the model in connection with determining a plan for placing an item a pallet. As another example, system 400 may determine that a stack of items is complete based at least in part on the information pertaining to the pallet.

System 400 may communicate a state of a pallet and/or operation of the robotic arm 401 within a predefined zone. The state of the pallet and/or operation of the robotic arm may be communicated to a user or other human operator. For example, system 400 may include a communication interface (not shown) via which information pertaining to the state of system 400 (e.g., a state of a pallet, a predetermined zone, a robotic arm, etc.) to a terminal such as on demand teleoperation device 122 and/or a terminal used by a human operator. As another example, system 400 may include a status indicator within proximity of a predefined zone, such as status indicator 420 and/or status indicator 422.

Status indicator 420 may be used in connection with communicating a state of a pallet and/or operation of the robotic arm 401 within the corresponding predefined zone. For example, if system 400 is active with respect to the predefined zone in which pallet 406 is located, the status indicator can so indicate such as via turning on a green-colored light or otherwise communicating information or an indication of the active status via status indicator 420. System 400 may be determined to be in an active with respect to a predefined zone in response to determining that robotic arm 401 is actively palletizing one or more items on the pallet within the predefined zone. As another example, if system 400 is inactive with respect to the predefined zone in which pallet 406 is located, the status indicator can so indicate such as via turning on a red-colored light or otherwise communicating information or an indication of the active status via status indicator 420. System 400 may be determined to be inactive in response to a determination that robotic arm 401 is not actively palletizing one or more items on the pallet within the predefined zone, for example in response to a user pausing that predefined zone (or cell), or in response to a determination that a palletization of items on pallet 406 is complete. A human operator or user may use the status indicator as an indication as to whether entering the corresponding predefined zone is safe. For example, a user working to remove completed pallets, or inserting empty pallets, to/from the corresponding predefined zone may refer to the corresponding status indicator and ensure to enter the predefined zone when the status indicator indicates that operation within the predefined zone is inactive.

According to various embodiments, system 400 may use information obtained by one or more sensors within the workspace to determine an abnormal state pertaining to the pallet and/or items stacked on the pallet. For example, system 400 may determine that a pallet is misaligned relative to robotic arm 401 and/or the corresponding predefined zone based at least in part on the information obtained by the sensor(s). As another example, system 400 may determine that a stack is unstable, that items on a pallet are experiencing a turbulent flow, etc. based at least in part on the information obtained by the sensor(s). In response to detecting the abnormal state, system may communicate an indication of the abnormal state such as an on-demand teleoperation device or other terminal used by an operator. In some embodiments, in response to detecting the abnormal state, system 400 may automatically set the pallet and/or corresponding zone to an inactive state. In addition to, or as an alternative to, notifying an operator of the abnormal state, system 400 may perform an active measure. The active measure may include controlling the robotic arm 401 to at least partially correct the abnormal state (e.g., restack fallen items, realign the pallet, etc.). In some implementations, in response to detecting that an inserted pallet is misaligned (e.g., incorrectly inserted to the predefined zone), system 400 may calibrate the process for modelling a stack and/or for placing items on the pallet to correct for the misalignment. For example, system 400 may generate and use an offset corresponding to the misalignment when determining and implementing a plan for placing an item on the pallet. In some embodiments, system 400 performs the active measure to partially correct the abnormal state in response to determining that an extent of the abnormality is less than a threshold value. Examples of determining that an extent of the abnormality is less than a threshold value include (i) a determination that the misalignment of the pallet is less than a threshold misalignment value, (ii) a determination that a number of dislodged, misplaced, or fallen items is less than a threshold number, (iii) a determination that a size of a dislodged, misplaced, or fallen item satisfies a size threshold, etc.

A human operator may communicate with system 400 via a network such as a wired network and/or a wireless network. For example, system 400 may comprise a communication interface via which system 400 is connected to one or more networks. In some embodiments, a terminal connected via network to system 400 provides a user interface via which human operator can provide instructions to system 400, and/or via which the human operator may obtain information pertaining to a state of system 400 (e.g., a state of robotic arm, a state of a particular pallet, a state of a palletization process for a particular manifest, etc.). The human operator may provide an instruction to system 400 via an input to the user interface. For example, a human operator may use the user interface to pause the robotic arm, pause a palletization process with respect to a particular manifest, pause a palletization process for a particular pallet, toggle a status of a pallet/predefined zone between active/inactive, etc.

In some embodiments, the system palletizes/depalletizes items based at least in part on a cost function (e.g., a cost associated with moving the items). In the example illustrated in FIG. 4A, conveyor 408 and conveyor 410 have different heights — conveyor 410 is relatively higher than conveyor 408. For example, the leg 409 to conveyor 408 has a height of h1, and the leg 411 to conveyor 410 has a height h2, and height h2 is larger than height h1. Similarly, in the example illustrated in FIG. 4A, the state of the stack of items on pallet 402, pallet 404, and pallet 406 is different — a height of the stacks (e.g., the height at which the top item on the stack rests) is different. As such, in the case of a palletization process, depending on the source location of the item (e.g., conveyor 408 or conveyor 410), and the destination location (e.g., pallet 402, pallet 404, or pallet 406), the distance the item is to be moved may be different. Similarly, a length of a determined path or trajectory for moving an item may be different depending on the source location and/or the destination location. In the case of depalletizing an item from a pallet to a conveyor, the cost of moving an item from the top half of the stack (e.g., a full pallet newly inserted into the system or a predefined max pallet height) to a relatively higher conveyor (e.g., conveyor 410) may be less than moving the item to the relatively lower conveyor (e.g., conveyor 408); and the cost of moving an item from the bottom half of the stack (e.g., relative to a full pallet newly inserted into the system or a predefined max pallet height) to a relatively lower conveyor may be less than moving the item to a relatively higher conveyor.

According to various embodiments, the system determines the source location and/or the destination location based at least in part on a distance between the source location and the destination location. For example, the system may determine a Euclidean distance between a source location and a destination location. In some embodiments, the system determines a set of Euclidean distances corresponding to various permutations or combinations of source locations and destination locations, and the system determines one or more of the source location and the destination location based at least in part on the distance. In some embodiments, the distance between the source location and the destination location is a variable in a cost function, and the source location and/or the destination location is determined based at least in part on a cost of moving the item from the corresponding source location to the corresponding destination location.

According to various embodiments, the source location from which the item is to be picked may be determined based at least in part an attribute of the source location (e.g., a height of the conveyor, a height of the stack, etc.). The attribute of the source location may be used in connection with determining a cost of moving the item from the source location to destination location. For example, the attribute of the source location may impact an amount of work for the robotic arm to move the item from the source location to the destination location, a distance between the item at the source location and the destination location, a length of the path/trajectory along which the item is to travel from the source location to the destination location. In some embodiments, the source location is determined before the item is provided to the robotic arm 401 (e.g., before the item is within range of the robotic arm 401). In an example of palletizing items, the conveyor on which the item is provided to the robotic arm 401 or robotic system 400 may be controlled upstream (e.g., by picking and placing the item on a particular conveyor, by using a gating structure to direct the item, or otherwise moving the item to the determined source location). For example, a system may include a network of conveyors, an item may be placed on a conveyor upstream, and the system may include a gate structure with which the item is selectively directed to various downstream conveyors based at least in part on the determination of the source location. As another example, a system may implement a downstream conveyor selection to determine the conveyor on which the item is placed based on one or more characteristics of the item (e.g., size, packaging type, rigidity, weight, etc.). As another example, the item may be picked from an original source location (e.g., a shelf, a receptacle, etc.) and place the item on conveyor 408. In the foregoing examples, the determination of at least part of the plan for palletizing the items is determined before the item arrives at robotic arm 401 (e.g., before the item is within range of robotic arm 401, and/or before the item is scanned by the sensors such as sensor 412, sensor 414, and/or 418). For example, a control computer may at least loosely determine an order by which the items are to be palletized. The control computer may determine an attribute pertaining to the manner by which the item is to be palletized such as an attribute of the order in which the item is to be palletized, and the control computer may select the conveyor on which the item is to be provided to robotic arm 401 (e.g., determine the source location) based at least in part on the attribute. Examples of the attribute include (i) an indication that the item is to be palletized at a bottom half of the pallet, (ii) an indication that the item is to be palletized at a top half of the pallet, (iii) an indication that the item is to be placed on the stack of items below one or more threshold heights, (iv) an indication that the item is to be placed on the stack of items above one or more threshold height, etc. Various other attributes may be implemented. In some embodiments, the plan for palletizing the item(s) is updated when the item is within range of the robotic arm 401 and/or scanned by sensors that obtain information for items being input to system 400 (e.g., items being input to range of robotic arm 401), such as sensor 412, sensor 414, and/or sensor 418.

In the example of system 400 in FIG. 4A, if the item is determined to be moved to pallet 402, then the system may determine that the cost of moving the item from conveyor 408 is lower than if the item were to be moved from conveyor 410. Accordingly, the system may control for the item to be routed to conveyor 408 (e.g., by controlling a gating structure, by picking and placing the item from an original source location onto conveyor 408, etc.). The system may use a then-current state of the stack of items on the pallet in connection with determining the source location. In some embodiments, in response to obtaining a list of items to be palletized, the system generates a simulation or model for stacking the set of items corresponding to the list of items. The simulation or model may be used in connection with determining the source location and/or controlling the moving of the item to the source location for picking and placing by robotic arm 401.

In various embodiments, elements of system 400 may be added, removed, swapped out, etc. In such an instance, a control computer initializes and registers the new element, performs operational tests, and begins/resumes kitting operations, incorporating the newly added element, for example.

Figure 4B:
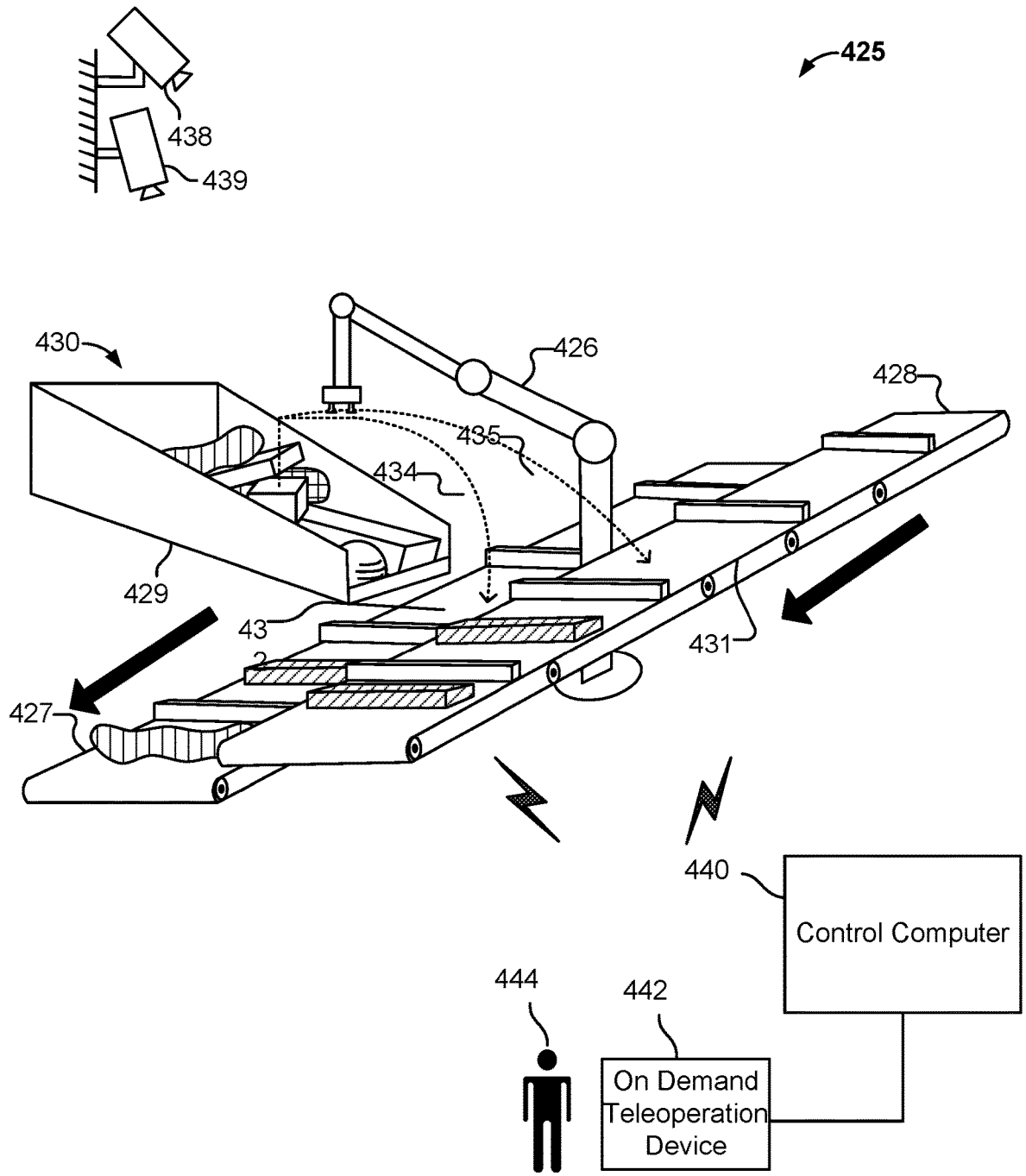
FIG. 4B is a diagram illustrating an embodiment of a robotic system to singulate items.

FIG. 4B is a diagram illustrating an embodiment of a robotic system to singulate items. In the example illustrated in FIG. 4B, system 425 includes a robotic arm 426 equipped with end effector. While in the example shown the end effector is a suction-based end effector, in various embodiments, one or more other types of end effectors may be used in a singulation system as disclosed herein, including without limitation a pinch-based end effector or other types of actuated grippers. Robotic arm 426 and the end effector are configured to be used to retrieve parcels or other items that arrive via chute or bin 429 and place each item in a corresponding location on a segmented conveyor such as segmented conveyor 427 and/or segmented conveyor 428. In this example, items are fed into chute 429 from an intake end 430. For example, one or more human and/or robotic workers may feed items into intake end 430 of chute 429, either directly or via a conveyor or other electro-mechanical structure configured to feed items into chute 429.

In the example shown in FIG. 4B, the segmented conveyors may be disposed at different heights. For example, segmented conveyor 428 is illustrated as having a larger height than segmented conveyor 427. In some embodiments, the height of a conveyor is adjustable. For example, the system (or a human operator) can control to adjust the conveyor so that the surface thereof is presented at a different height.

In the example shown, one or more of robotic arm 426, the end effector, and conveyor (e.g., conveyor 427 and/or conveyor 428) are operated in coordination by control computer 440. In some implementations, control computer 440 is configured to control a plurality of robotic arms operating at one or more workstations. System 425 may include one or more sensors from which an environment of the workspace is modeled. In the example shown in FIG. 4B, system 425 includes image sensors, including in this example 3D cameras 438 and 439. In various embodiments, other types of sensors may be used (individually or in combination) in a singulation system as disclosed herein, including a camera, an infrared sensor array, a laser array, a scale, a gyroscope, a current sensor, a voltage sensor, a power sensor, a force sensor, a pressure sensor, a weight sensor, and the like. In various embodiments, control computer 440 includes a workspace environment state system such as a vision system used to discern individual items, debris on the workspace, and each item's orientation based on sensor data such as image data provided by image sensors, including in this example 3D cameras 438 and 439.

According to various embodiments, in connection with singulating an item, system 425 determines a path/trajectory for singulating the item. The path/trajectory for singulating the item may be selected based at least in part on an attribute of the destination location (e.g., an attribute of the conveyor to which the item is to be moved). The attribute may include a height of the destination location, a relative height of the destination location (relative to chute 429, etc.), a distance to the destination location, etc. In some embodiments, the path/trajectory for singulating the item is based at least in part on a cost associated with moving the item along the path/trajectory. System 425 may select a path/trajectory that minimizes a cost of singulating the item. For example, system 425 may select the path/trajectory that minimizes/optimizes the distance between the source location (e.g., the item on chute 429 or the chute 429 itself) and the destination location (e.g., a tray or slot on the corresponding conveyor). The cost of singulating the item (or specifically the distance between the source location and the destination location) may be minimized/optimized subject to one or more predetermined conditions. The one or more predetermined conditions may include a restricted airspace, a slot/tray being occupied, a maximum time threshold for singulating the item, another item or object, or attribute of such, in the workspace such as an item in a neighboring slot on the conveyor, etc.

In some embodiments, system 425 determines a set of possible destination locations and/or set of possible paths/trajectories for singulating an item. System 425 may determine corresponding expected costs of singulating an item for the set of possible destination locations and/or set of possible paths/trajectories. For example, system 425 may determine the expected costs based on a cost function. In response to determining the set corresponding expected costs, system 425 may determine a path/trajectory that satisfies one or more conditions such as having a cost less than a cost value threshold. System 425 may select the path/trajectory corresponding to a minimized/optimized expected cost.

As illustrated in FIG. 4B, path/trajectory 434 starts from a location from which the item is to be picked, the path/trajectory along which the item is moved to conveyor 427, and a location and time at which the item is to be released to coincide in space and time with a slot, tray, or other destination selected as the location at which the item is to be placed on the destination conveyance structure, i.e., slot/tray 432 of conveyor 427 in this example. Similarly, path/trajectory 465 starts from a location from which the item is to be picked, the path/trajectory along which the item is moved to conveyor 428, and a location and time at which the item is to be released to coincide in space and time with a slot, tray, or other destination selected as the location at which the item is to be placed on the destination conveyance structure, i.e., slot/tray 431 of conveyor 428 in this example. System 425 may determine whether path/trajectory 434 or path/trajectory 435 corresponds to a lesser cost for singulating the item, and select such path/trajectory having the lesser cost.

In some embodiments, system 425 determines a slot/tray to which the item is to be singulated, or set of slots/trays in which the item may be singulated. Accordingly, the path/trajectory 434 and/or path/trajectory 435 is determined taking into account a location of the slot/tray (or the set of slots/trays) and the movement of the conveyor. For example, system 425 determines the path/trajectory 434 to attain an intersection between the item to be singulated and the selected slot/tray 432 at a particular time. In various embodiments, system 425 reserves the slot/tray in which the item is to be singulated (e.g., corresponding to the selected path/trajectory). In some embodiments, system 425 reserves the se of slot/tray in which the item may be singulated while system 425 determines the path/trajectory along which the item is to be singulated (e.g., based on the cost function, an attribute of the destination location, etc.). Reserving the slot/tray is used to ensure that the slot/tray is unoccupied at the time the item is to be placed therein. For example, system 425 updates the distributed data structure to indicate that slot/tray (or set of slots/trays) is occupied (or will be occupied). The path/trajectory may include a final, pre-release phase or stage in which the robotic arm 426 is operated to track and match a speed and direction of motion of conveyor, to maintain the item in position over the destination location until the item is released.

Referring further to FIG. 4B, in the example shown, system 425 further includes an on-demand teleoperation device 442 usable by a human worker 444 to operate one or more of robotic arm 426, the end effector, and conveyor 427 and/or conveyor 428 by teleoperation. In some embodiments, control computer 440 is configured to attempt to grasp and place items in a fully automated mode. However, if after attempting to operate in fully automated mode control computer 440 determines it has no (further) strategies available to grasp one or more items, in various embodiments, control computer 440 sends an alert to obtain assistance from a human operator via teleoperation, e.g., by human operator 444 using teleoperation device 442. In various embodiments, control computer 440 uses image data from cameras such as cameras 438 and 439 to provide a visual display of the scene to human operator 444 to facilitate teleoperation.

Figure 4C:
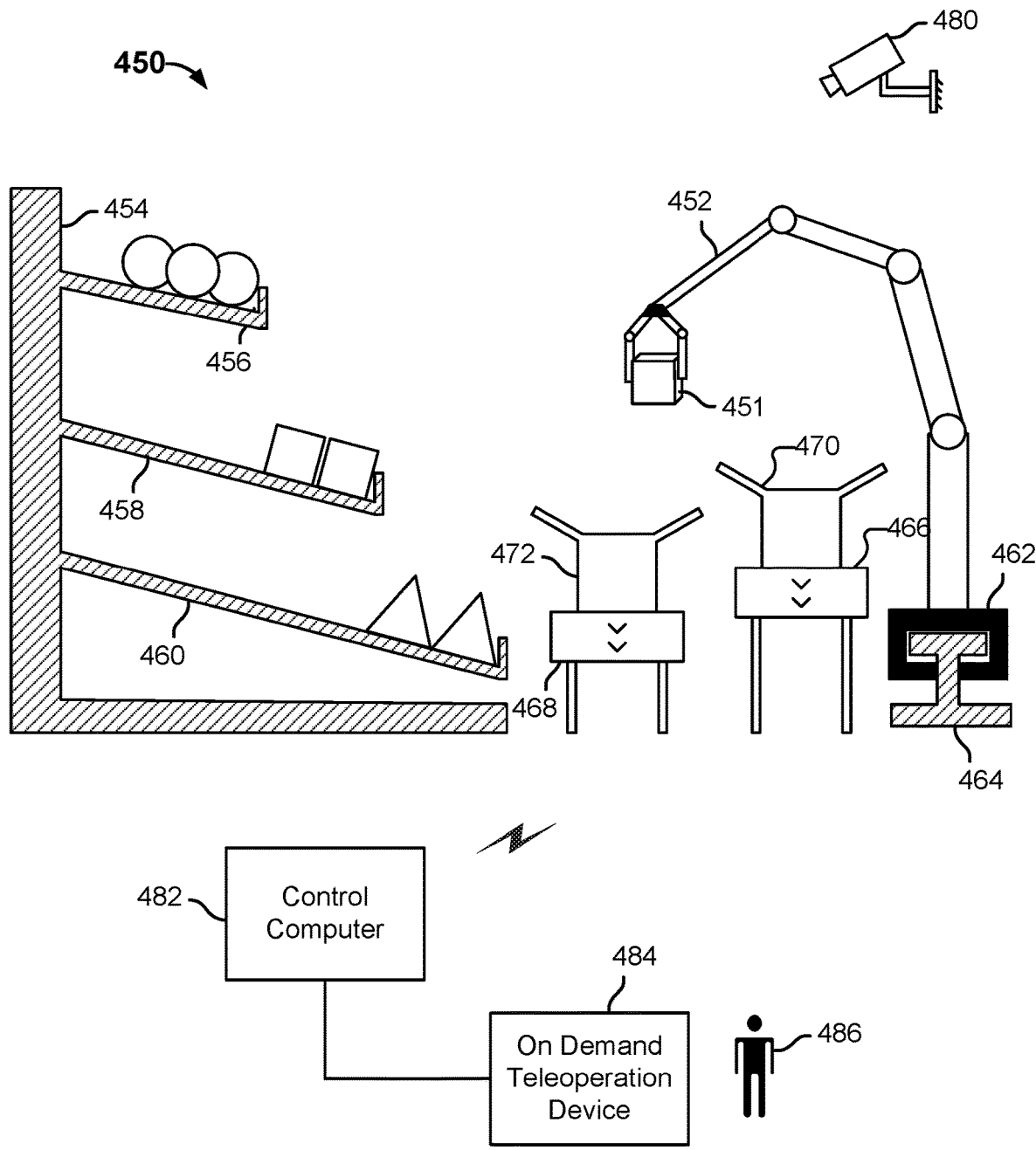
FIG. 4C is a diagram illustrating an embodiment of a robotic system to assemble kits of items.

FIG. 4C is a diagram illustrating an embodiment of a robotic system to assemble kits of items. In the example shown, kitting system 450 includes a kitting shelf system 454 and a robotic arm 452. In some embodiments, a kitting system includes a plurality of kitting shelf systems and/or a plurality of robotic arms 454. The robotic arm may operate autonomously to pick an item (or an object from within an item) from a kitting shelf system and place the item (or object) to a predetermined location. In some embodiments, a robotic arm picks and places one or more items to a predetermined location based at least in part on a plan such as a plan for kitting the one or more items (e.g., to assemble a kit based on an order etc.).

Kitting shelf system 454 includes one or more shelves 456, 458, and 460. In some embodiments, the one or more shelves 456, 458, and 460 respectively include one or more items disposed thereon. Different shelves within kitting shelf system 454 may include different items (e.g., a different type of item, items having one or more different identifiers such as serial numbers, model numbers, lot numbers, or the like).

In some embodiments, robotic arm 454 is movable with respect to kitting shelf system 454 and/or with respect to a conveyor or other location at which a receptacle is disposed. In the example shown in FIG. 4C, robotic arm 454 is mounted on carriage 462, which is configured to ride along a rail or other linear guide 464 disposed alongside and substantially parallel to the conveyor (e.g., conveyor 466 and/or conveyor 468), on a side opposite the kitting shelf system 454. In some implementations, the rail or other linear guide is disposed between the kitting shelf system 454 and the conveyor (or at least one conveyor). In various embodiments, a motor, belt, chain, or other source of motive force is applied via a controller (not shown in FIG. 4C) to move the carriage 462 and attached robotic arm 454 along the rail or guide 464 to facilitate the automated retrieval of items from one or more kitting shelf systems, and the placement of items (e.g., object 451) in a receptacle (e.g., a box, a tray, etc.), such as receptacle 470 or receptacle 472, as the receptacle is moved along the corresponding conveyor.

Control of robotic arm may be coordinated based at least in part on one or more items to be picked and placed in the receptacle, a location of the receptacle, and/or a path of receptacle (e.g., based on a determined movement of the corresponding conveyor).

In some embodiments, kitting system 450 includes a plurality of conveyors such as conveyor 466 and conveyor 468. Receptacles may be respectively carried by each of the plurality of conveyors. In the example shown in FIG. 4C, conveyor 466 and conveyor 468 have different heights. A set of items to be kitted may be kitted in a receptacle on conveyor 466 or conveyor 468 based at least in part on an attribute of the destination location (e.g., the conveyor). For example, kitting system 450 may determine to kit the set of items in a particular receptacle based at least in part on a height of the conveyor on which the receptacle is located. As the robotic arm moves an item, the robotic arm generally lifts the item such that the bottom of the item clears the top of the receptacle. Accordingly, if the item is relatively large, the robotic arm have to lift the item more than the robotic arm would have to lift a relatively smaller item. Kitting system 450 may select a destination location (e.g., receptacle) at which to kit the set of items based on a cost of moving one or more of the set of items to be kit. As another example, a relatively large number of the set of items may be located on or near the bottom shelf of the kitting shelf system 454 and moving the set of items to a receptacle on a relatively higher conveyor may be more work than moving the set of items to a relatively lower conveyor. Conversely, as another example, a relatively large number of the set of items may be located on or near the top shelf of the kitting shelf system 454 and moving the set of items to a receptacle on a relatively lower conveyor may be more work than moving the set of items to a relatively higher conveyor.

In some embodiments, kitting system 450 determines the destination location based on an aggregated cost of moving the set of items (e.g., a summation of the respective costs for moving the individual items in the set of items). The destination location may be determined to be a receptacle corresponding to an optimized/minimized cost for moving an item or a set of items. The cost may be determined using a predefined cost function. The determination of the destination location based on an optimized/minimized cost may be subject to one or more conditions such as restricted airspace, collision avoidance, maximum time for kitting the set of items, etc. Various other conditions may be used in determining the destination location and/or determining a plan to kit a set of items.

In some embodiments, kitting system 450 determines the destination location based on distance by which the set of items (e.g., a summation of the respective distances for moving the individual items in the set of items) are to be moved. The destination location may be determined to be a receptacle corresponding to a shortest distance for moving an item or a set of items. The determination of the destination location based on a shortest distance may be subject to one or more conditions such as restricted airspace, collision avoidance, maximum time for kitting the set of items, etc. Various other conditions may be used in determining the destination location and/or determining a plan to kit a set of items.

In some embodiments, kitting system 450 includes control computer 482. In the example shown, operation of kitting shelf system 454, conveyor 466, conveyor 468, and robotic arm 452, and/or carriage 462 are operated in a coordinated manner under the control of control computer 482. In the example shown, control computer 482 is in communication (e.g., wireless communication) with controllers, not shown in FIG. 4C, each configured to control operation of a corresponding element comprising kitting system 450, e.g., kitting shelf system 454; robotic arm 452, conveyor 466, conveyor 468, carriage 462, and/or receptacle source (not shown). Although wireless connections are shown in FIG. 4C, in various embodiments wired connections or a combination of wired and wireless connections may be used.

In the example shown in FIG. 4C, robotic arm 452 has an end effector corresponding to a two-digit gripper. In various embodiments, robotic arm 452 includes one or more other and/or different types of end effectors/retrieval tool, including without limitation a gripper having three or more digits; a gripper having digits with different attributes than as shown, e.g., cushioned digits, smaller digits, larger digits, etc.; and/or a retrieval tool that is not a gripper, such as one configured to pick up items using suction, friction, electrostatic force, magnetic force, etc. In some embodiments, the gripper of robotic arm 452 may be interchanged with one or more different end effectors, depending on one or more attributes of an item to be retrieved, e.g., weight, fragility, compressibility, rigidity, size, shape, etc. In some embodiments, the gripper of robotic arm 452 may be used to retrieve and use different end effectors (e.g., gripper-held tools) to pick and place items, depending on one or more attributes of the item to be retrieved, for example. One or more attributes of the items may be determined based at least in part on information obtained from one or more sensors such as camera 480.

In various embodiments, control computer 482 is configured, e.g., by software running on control computer 482, to receive data associated with an invoice, order, part list, pick list, or other list of items to be retrieved and packed together; determine a strategy/plan to fulfill the retrieve and pack the required items; and operate elements of kitting system 450, e.g., kitting shelf system 454; conveyor 466 and conveyor 468; and robotic arm 452 and/or carriage 462, in coordination to fulfill the requirement(s). In some embodiments, kitting system 450 includes a plurality of kitting shelf systems and/or a plurality of robotic arms, and one or more control computers are controlled to coordinate/operate elements of kitting system 450.

For example, in some embodiments, control computer 482 is configured to receive a list of items to be packed. Control computer 482 determines which items are associated with which of kitting shelf systems (or which items are associated with a particular shelf of a kitting shelf system such as kitting shelf system 454) and makes a plan to retrieve and pack the items. In some embodiments, computer 482 controls a box assembly machine (not shown) or a receptacle source module, and deposit a receptacle on conveyor 466 or conveyor 468 and controls the conveyor 466 or conveyor 468 to advance the receptacle to a position to be loaded with a first one or more items. The control computer 482 controls the carriage 462 and/or robotic arm 452 as needed to position the robotic arm 110 to retrieve the first one or more items from the associated a kitting shelf system (or a shelf 456, 458, and/or 460 of kitting shelf system 454). Control computer 482 may control kitting shelf system 454, e.g., to ensure the require item(s) in the required quantities are present in the pickup zone (e.g., a presentation face) at the end of kitting shelf system 454 (or a shelf 456, 458, and 460 of kitting shelf system 454) nearest to the conveyor 468 and robotic arm 452. Control computer 482 controls robotic arm 452 to retrieve the item(s) from the corresponding pickup zone(s) and places the item(s) in the receptacle (e.g., receptacle 472 or receptacle 470, as applicable) before moving on to perform coordinated retrieval and packing of any further items required to be included in that particular kit. In response to a determination that all items have been retrieved and packed (e.g., according to a plan for kitting one or more items), control computer 482 controls conveyor 468 to advance the receptacle (e.g., receptacle 472 or receptacle 470, as applicable) to a next stage of fulfillment, not shown in FIG. 4C (e.g., a station at which the box is sealed, labeled, and sent to be shipped).

In the example shown in FIG. 4C, kitting shelf system 454 comprises angled shelves or angled conveyors (e.g., shelves 456, 458, and 460) that are configured to be loaded, e.g., by human workers, robots, and/or other machines, or some combination thereof, from a back end (upper/left as shown in FIG. 4C). Items may be scanned, recognized by computer vision, etc. to determine and store on control computer 482 data associating the item and/or item type or other items attributes associated with each kitting shelf system. In various embodiments a mix of different types of kitting shelf systems may be included in a kitting system such as system 450. For example, the items shown in FIG. 4C as being supplied via kitting shelf system 454 may be supplied in some embodiments via a stationary ramp down which the items are rolled. In some embodiments, a kitting shelf system may comprise any one of a plurality of structures and mechanisms to supply items to an associated pick zone, including without limitation a gravity type conveyor having a plurality of adjacent rollers, a ramp, a conveyor belt, a set of revolving bins, etc.

In some embodiments, kitting shelf system 454 comprises one or more gating mechanisms that control conveyance of items to or within angled shelves or angled conveyors (e.g., shelves 456, 458, and 460). The one or more gating mechanisms may control the conveyance of one or more items to one or more presentation faces of the kitting shelf system in connection with the kitting of the one or more items (e.g., retrieval of the item(s) by a robotic arm and placement of the item(s) into a corresponding receptacle(s)). The one or more gating mechanisms may be controlled by control computer 482 or the one or more gating mechanisms may be configured to operate mechanically (e.g., without intervention by a control computer). In various embodiments, the one or more gating mechanisms control conveyance of the one or more items based at least in part on a plan (e.g., a predetermined plan for kitting an item based at least in part on an order).

In various embodiments, kitting system 450 is initialized by having control computer 482 determine through automated processing, manual configuration, and/or a combination thereof the placement, type, capabilities, etc. of each kitting shelf system (e.g., kitting shelf system 454) and the item(s) associated with each kitting shelf system. In addition, elements of kitting system 450 may register with the control computer 482. Registration may include admitting an element, such as each of the kitting shelf system, to a control network. In some embodiments, operational tests may be performed. For example, control computer 482 may test an ability to control a newly-registered element, such as by operating the conveyor belt of a kitting machine, such as kitting shelf system 454, in the forward and back directions, at various speeds, etc. Such registration of elements may be implemented for system 400 of FIG. 4A and/or system 425 of FIG. 4B.

In various embodiments, elements of kitting system 450 may be added, removed, swapped out, etc. In such an instance, control computer 482 initializes and registers the new element, performs operational tests, and begins/resumes kitting operations, incorporating the newly added element, for example.

Referring further to FIG. 4C, in the example shown kitting system 450 includes a camera 480 (e.g., a video camera) configured to capture images (e.g., video images) of the elements comprised in kitting system 450. Camera 480 may be one of a plurality of sensors that obtains information pertaining to the workspace (e.g., the workspace corresponding to kitting system 100). For example, camera 480 may be one of a plurality of sensors used by control computer 482 to control the elements comprising kitting system 450. For example, in the example shown, video generated by camera 480 and sent to control computer 482 may be used by control computer 482 to control the speed and/or direction of the conveyor belts comprised in the kitting shelf system 454 and/or a gating mechanism in the kitting shelf system 454 to ensure a sufficient and not excessive number of items are available in the pickup zone (e.g., a presentation face of kitting shelf system 454) and/or to position or reposition the items for retrieval by robotic arm 452. In addition, camera 480 and/or other cameras and/or other sensors may be used to facilitate robotic arm 452 picking up an item and/or placing the item in its receptacle (e.g., box). In various embodiments, a plurality of cameras may be deployed in a number of locations, including in the environment and on the respective elements comprising system 450, to facilitate automated (and, if needed, human assisted) kitting operations. In various embodiments, sensors other than cameras may be deployed, including without limitation contact or limit switches, pressure sensors, weight sensors, and the like.

In various embodiments, one or more sensors are disposed on a chassis of the robotic arm or a chassis of a robotic structure on which the robotic arm is disposed. System 450 may include one or more accelerometers operatively connected to or disposed within proximity of the one or more sensors (e.g., the one or more cameras). The control computer may obtain the image data pertaining to the workspace based at least in part on information obtained by the one or more accelerometers. In some embodiments, the one or more sensors may comprise a scanner that obtains data pertaining to a label or identifier on the object as the object is moved from the item to the predetermined structure.

In various embodiments, one or more sensors (e.g., camera 480) is used to capture information pertaining to items associated with kitting shelf system 102. For example, camera 480 may capture an image of one or more items on shelf 456, shelf 458, and/or shelf 460. As another example, if an item on a shelf 456, shelf 458, and/or shelf 460 is a tray or other receptacle, camera 480 may capture information pertaining to objects within the tray. Control computer 482 may use information pertaining to the workspace to determine a plan, and/or to control operation of robotic arm 452 to pick an item (or an object from within the item) from kitting shelf system 454. Control computer 482 may use the information pertaining to the workspace in connection with determining a location of an object within a tray on shelf 456, shelf 458, and/or shelf 460; a quantity of objects within the tray; a type of object within the tray; an orientation of one or more objects within the tray; etc.

In various embodiments, control computer 482 is programmed to determine a plan to fulfill a kitting requirement based at least in part on a model of the robotic arm 110 and other elements comprised in kitting system 450, e.g., kitting shelf system 454; conveyor 466 and/or conveyor 468; a receptacle source module (e.g., a box assembly machine)

(not shown); robotic arm 145210; and/or carriage 462. The respective models in various embodiments reflect capabilities and limitations of each respective element. For example, the shelves 456, 458, and 460 of kitting shelf system 454 are in fixed positions in this example, but each has a conveyor belt which may be capable of being moved in forward and back directions and/or at different speeds. In addition, the control computer 482 may use information stored in connection with initialization and/or configuration, e.g., which items are on which location(s) on which kitting shelf system (or on which shelf of which kitting shelf system), where each kitting shelf system and/or its associated pick up zone (e.g., presentation face(s)) is located, etc., to determine a plan to fulfill a requirement. In addition, control computer 482 may use data determine based at least in part on sensor data, such as video captured by camera 480, to make a plan to fulfill a requirement.

According to various embodiments, kitting of items from one or more kitting shelf systems is improved through use of a dynamic kitting method or system that determines a path or trajectory for kitting of an item using one or more of an attribute of the item to be singulated and an attribute of another item within the workspace (e.g., an item and/or receptacle on the conveyor). The dynamic kitting method or system may include an updating of the path or trajectory for kitting of an item in response detecting one or more of an attribute of the item to be kitted and an attribute of another item within the workspace (e.g., an item on the conveyor). The dynamic kitting method or system may include an updating of the conveyance of an item from a feeder portion of a kitting shelf system to a presentation face of the kitting shelf system in connection with kitting of an item (or object from an item on the kitting shelf system) in response to determining an attribute of the workspace. The attribute of the workspace used in connection with updating the plan for kitting the item/object may include an attribute of an item/object to be kitted, a quantity of objects within an item (e.g., a tray on a kitting shelf system), a speed of the conveyor, a characteristic associated with a receptacle on the conveyor, an orientation of the item on the kitting shelf system, an orientation of a presentation face of the kitting shelf system, etc. In some embodiments, the kitting system 450 (e.g., control computer 482) dynamically updates the plan for kitting the item during kitting based on a context of the workspace (e.g., a state or condition of the item, a property of the item, another item within the workspace, a speed of conveyor 118, an identifier of receptacle 472 or receptacle 470, etc.).

In various embodiments, control computer 482 is configured to formulate and/or update or reformulate a plan to fulfill a requirement, and to implement or attempt to implement the plan, by employing strategies to do a (next) task or subtask that have been programmed into and/or learned by control computer 482. Examples include, without limitation, strategies to use robotic arm 452 to pick up a given item (or an object from an item on a presentation face of a kitting shelf system) based on attributes of the item (rigidity, fragility, shape, orientation, etc.). In some embodiments, control computer 482 is programmed to use a first (e.g., preferred or best) strategy to attempt to perform a task (e.g., pick up an item with robotic arm 452), and if the first strategy fails then to determine and use an alternate strategy, if one is available (e.g., use the robotic arm 451 to nudge the item (or object) then try again, operate the conveyor or other instrumentality of the kitting shelf system 454 (or of a shelf of kitting shelf system), forward and/or backward a bit and try again, etc.). The preferred or best strategy can be determined based at least in part on a model associated with a likelihood of successful picking and placing the object, etc.

In the example shown in FIG. 4C, control computer 482 is connected to an on demand teleoperation device 484 operated by a human operator 486. While in FIG. 1 teleoperation device 484 is operated by a human operator 486, in some embodiments teleoperation device 484 may be operated by a non-human operator, such as a highly skilled robot. In various embodiments, control computer 124 is configured to invoke on demand teleoperation based at least in part on a determination by control computer 482 that control computer 482 does not have an available strategy to continue/complete a kitting operation and/or a component task thereof through fully automated operation. For example, an item is dropped in a location from which the robotic arm 110 cannot retrieve the item; or, an item has been attempted to be picked up a prescribed maximum number of attempts and has not successfully been retrieved; operation of and end effector deviates from a defined normal operation (e.g., if a suction cup is broken), etc. Based on such a determination, control computer 482 sends an alert or other communication to on demand teleoperation device 484, prompting human operator 486to use teleoperation device 484 to operate one or more elements of kitting system 100—e.g., one or more of kitting shelf system 454 (or shelf 456, 458, and/or 460); conveyor 466 and/or conveyor 468; a receptacle source module (e.g., a box assembly machine) (not shown); robotic arm 452; and/or carriage 462—to perform at least the task or subtask the kitting system 450 was not able to complete under fully automated control by control computer 482.

Examples of teleoperation device 484 include without limitation a tablet or other mobile device having a graphical user interface to control elements of system 450, a desktop or other computer having one or more input devices connected thereto to operate elements of system 450 remotely, etc.

While in some embodiments control computer 482 invokes on demand teleoperation, in some embodiments a human operator such as operator 486 may monitor automated operation of kitting system 450, e.g. via a video feed generated by camera 480, and may intervene to operate elements of system 450 by teleoperation if the human operator determines there is a need to intervene or assist.

In various embodiments, teleoperation device 484 and/or human operator 486 may be located remotely from a physical site at which kitting system 100 is located and operates (mostly) in a fully automated mode. Similarly, control computer 482 may be located remotely from the site at which other elements of system 450 are located and/or a portion of the work described herein as being performed by control computer 482 may be performed by a computer located remotely from that site.

In various embodiments, control computer 482 is configured to learn new or improved strategies to employ elements of kitting system 450 to perform kitting operations. For example, control computer 482 in some embodiments is programmed to record actions by a human operator (486) via teleoperation (484) and to update its model(s), strategies, etc., as appropriate to be able to repeat and/or emulate the actions of the human operator to perform the task or subtask for which teleoperation was required.

In various embodiments, control computer 482 is configured to continue to evaluate, during teleoperation, whether it has a viable plan and/or strategy to resume automated fulfillment of the current requirement. If so, control computer may be configured to resume automated operation, either proactively or by advising the human operator that control can be returned to control computer 482.

While in the example shown in FIG. 4C receptacles (e.g., receptacle 470 and/or receptacle 472) are moved by the corresponding conveyor (e.g., conveyor 466 or conveyor 468) into successive positions opposite kitting shelf systems or robotic arms, in other embodiments the receptacles may be place in a single, central position, by the corresponding conveyor or in some embodiments manually or by a machine other than the corresponding conveyor, and may be filled by moving the robotic arm 452 into one or more positions to access and pick up items from the kitting shelf systems (or shelves of the kitting shelf system, such as shelves 456, 458, and 460), and place the items in the corresponding receptacles (e.g., receptacle 470 and/or receptacle 472).

While a "kitting" operation is shown in FIG. 1 and described herein with reference to FIG. 4C and other Figures, in various embodiments kitting systems (and kitting shelf systems) and integrated systems as disclosed herein may be used to perform the reverse operation, e.g., by stocking shelves, bins, and/or kitting machines with items removed from an initially full or partly full box of items. For example, in the example shown in FIG. 4C, the corresponding receptacles (e.g., receptacle 470 and/or receptacle 472) may include a plurality of items associated with kitting shelf system 454, and robotic arm 452 may be used to remove items from the receptacle 116 and place the items on the kitting shelf system 454, e.g., from the back or supply end as shown. In some embodiments, a robotic arm provides items (e.g., stocks items) to a feeder portion of a shelf or a feeder portion of a kitting shelf system.

In some embodiments, items on a kitting shelf system, such as kitting shelf system 454, or on a shelf accessed by, or comprised in, a kitting system as disclosed herein, may be bins or trays that comprise objects that are to be "kitted". In some embodiments, the system (e.g., kitting system 450 of FIG. 4C) is configured to detect, e.g., based on computer vision or other sensors and/or techniques, that a bin is empty, and to clear the bin from the kitting system or shelf by using a robotic arm to pick up the bin and place it in a corresponding empty bin location, e.g., a nearby stack of empty bins, etc. In some embodiments, automated bin clearing makes room from a next bin that is not empty to move into position on the kitting machine or shelf to enable a robotic arm to access and pick up items from the bin. In some embodiments, in response to determining that a bin/tray is empty, a robotic arm (e.g., robotic arm 452) removes the bin/tray from the corresponding shelf of kitting shelf system 454 and uses the empty bin/tray as a subsequent receptacle for kitting other items/objects. For example, robotic arm 452 can pick up an empty bin/tray from a shelf and place the empty bin/tray on conveyor 466 and/or conveyor 468 for use as a receptacle.

In various embodiments, a robotic system as disclosed herein includes and/or does one or more of the following, e.g., by operation of a control computer such as control computer 482:

Computer vision information is generated by merging data from multiple sensors, including one or more of 2D cameras, 3D (e.g., RGBD) cameras, infrared, and other sensors to generate a three-dimensional view of a workspace that includes one or more kitting shelf systems (which may correspondingly include one or more shelves of the kitting shelf system). The robotic system determines characteristics of items and/or debris or other abnormalities in the tree-dimensional view of the workspace.

Robotic system coordinates operation of multiple robots to avoid collisions, getting in each other's way, and contending to pick up the same item and/or place an item in the same destination location (e.g., receptacle on the conveyor) as another robot. The robotic system coordinates operation of a plurality of robots operating within a same workspace to perform kitting with respect to a plurality of items/object (e.g., to kit items in different receptacles or within a same receptacle). As an example, in various embodiments, the plurality of robots operate independently to pick and place items. As another example, the plurality of robots operate to independently pick and place items for different orders (e.g., to place different sets of items in different receptacles). If a risk of collision is detected, responsive action is taken to ensure the plurality of robots do not collide with one another during singulation.

Robotic system coordinates operation of multiple robots to ensure all items are placed in corresponding receptacles. For example, if robot A drops an item system tasks robot B to pick it up; item placed but with improper orientation is picked up and adjusted or moved to another location by same or another robot; two or more items for different orders are placed in a single receptacle results in a downstream robot picking one of the two or more items from the receptacle and placing the item in a new receptacle; etc.

Robotic system continuously updates motion planning for each robot and all of the robots together to achieve a desired collective throughput (e.g., to maximize collective throughput, to attain a predefined threshold of collective throughput, etc.). In response to determining that two or more robots have collided or will collide if moving according to their respective plans for kitting items, the robotic system implements an active measure to ensure that the two or more robots avoid collision or otherwise reset independent operation of the two or more robots.

In response to a determination that two robots independently are tasked to acquire the same item, the system picks one at random to get that item and the other moves on to the next item (e.g., identify, select, determine grasp strategy, pick, move according to plan, and place).

The robotic system can manage the independent operation of a plurality of robots to ensure that the robots select items at different times to avoid the same item being selected for singulation by two different robots.

Conveyor movement and/or speed controlled as needed to achieve a desired robot productivity (throughput) and to permit sufficient time for the robot to place an object into the desired receptacle.

In response to a determination that an item is misplaced or dropped, the system assigns a robot or, if needed, a human worker to pick the misplaced item up and place the item back in the applicable kitting shelf system (e.g., on a shelf such as via the feeder portion) or, if available or more optimal, on a receptacle on the conveyor.

Upstream robots controlled to intentionally leave some receptacles open for downstream robots to place items on the conveyor (e.g., in the corresponding receptacles).

Downstream robots controlled to correct errors from an upstream placing an item in a receptacle on the conveyor (e.g., to correct the placement of an item that rests in more than one receptacle such as a tray, or that rests on the conveyor rather than the applicable receptacle, to update a data structure with an association between an identifier for the item or kit/order with the receptacle in which the upstream robot placed the item, etc.).

Failure that cannot be corrected by same or another robot results in an alert being communicated to obtain human (or other robotic) intervention to resolve.

In response to a determination that a grip strength (e.g., a pressure attained by the end effector) is abnormal (e.g., less than is expected during normal operation), perform a diagnostic process that includes testing the grip strength on a predefined surface and in connection with determining whether remedial action is necessary with respect to the end effector.

Move/remove the debris within the workspace, or to reconfigure an item to be kitted (e.g., to improve the likelihood that the item is successfully picked from the shelf, or the presentation face of the shelf, and placed on the conveyor such as in a receptacle on the conveyor).

Use sensor data from the workspace environment state system to detect one or more characteristics (e.g., attributes) of the item selected for kitting, determine that grasping or releasing of the item is expected to improve in response to implementation of an active measure, and implement the active measure to improve the grasping or releasing of the item.

Use sensor data to determine that the robotic arm has grasped a plurality of items in connection with kitting of one of the items, determine a plan for releasing the plurality of items in order to place each item singly in a corresponding location in one or more receptacles on the conveyor or to place one of the items back on the shelf/presentation face of the kitting shelf system (e.g., determine a strategy for operating the end effector to release a first subset of the plurality of items at a different time from a second subset of the plurality of items).

Select a path for kitting an item to a receptacle on the conveyor based on an attribute of the item (e.g., a size of the selected item, a weight of the item, etc.) and/or one or more attributes (e.g., characteristics) of an item within a receptacle on the conveyor.

Determine a movement and speed of the robotic arm that picks an item from the kitting shelf system and places the item in the applicable receptacle based at least in part on a speed of a conveyor belt.

Determine a trajectory of the item to be kitted based at least in part on one or more of a characteristic of the item, a characteristic of the workspace environment, and/or a characteristic of the conveyor (e.g., a speed of the conveyor belt).

Determine a probability of successful kitting corresponding to one or more paths/trajectories of an item to be kitted, and select a path/trajectory along which the item is to be kitted based on the corresponding probability of success.

Determine a positioning of a robot arm and/or an end effector of the robot arm to obtain a successful grasp (e.g., as determined based on a probability of grasp success, a type of packaging of the item, a dimension of the item, an expected grip strength in relation to a threshold value, etc.). The positioning of the end effector can include controlling the robot arm or a wrist of the robot arm to move in order for the end effector be orthogonal to a surface of the item.

Update the ability of the robotic system to detect an empty receptacle. For example, the definition of an empty receptacle used by the robotic system to identify an empty receptacle is updated over time.

Figure 5A:
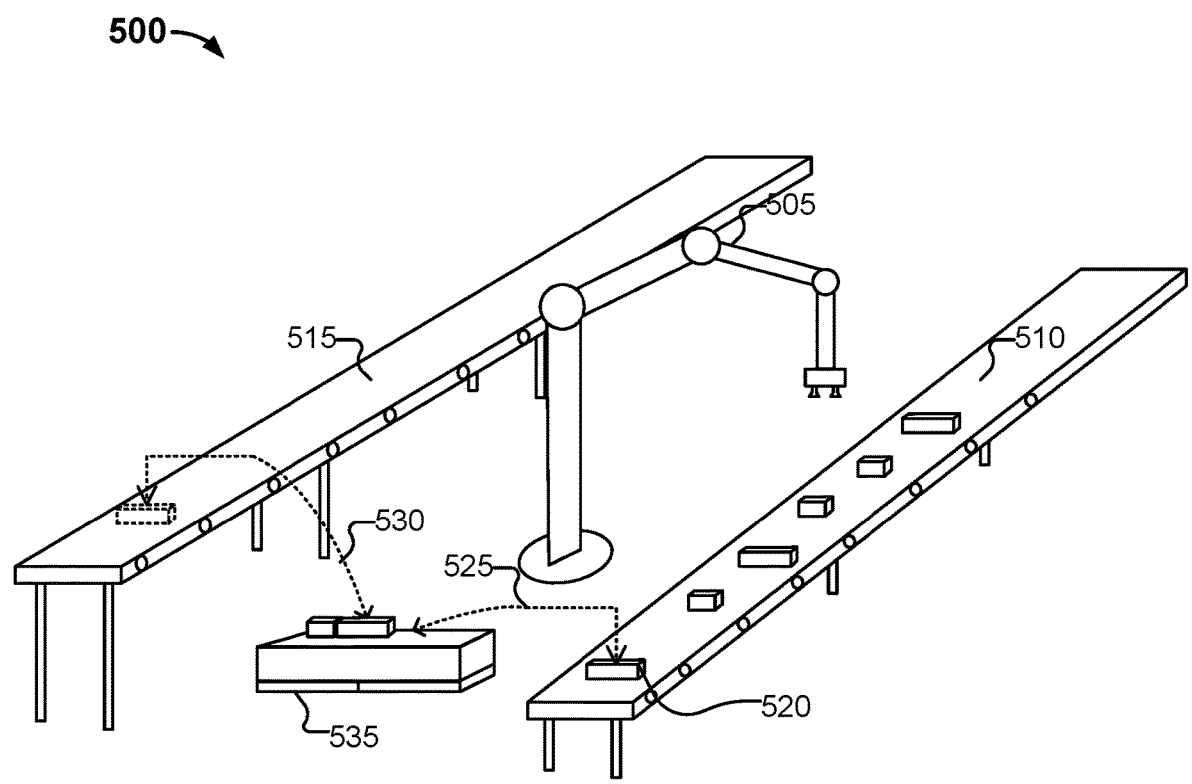
FIG. 5A is a diagram illustrating an example of robotic system to palletize and/or depalletize items according to various embodiments.

FIG. 5A is a diagram illustrating an example of robotic system to palletize and/or depalletize items according to various embodiments. In the example illustrated in FIG. 5A, system 500 comprises a robotic arm 505 that palletizes/depalletizes one or more items from one or more conveyors such as conveyor 510 and/or conveyor 515.

According to various embodiments, system 500 comprises a plurality of conveyors or other locations with respect to which items can be moved in connection with palletization/depalletization. In the example illustrated in FIG. 5A, system 500 comprises conveyor 510 and conveyor 515. Conveyor and 510 and conveyor 515 have different corresponding heights — for example, conveyor 510 is has a smaller height than conveyor 515. In connection with palletization/depalletization of items with respect to pallet 535, robotic arm 505 moves items to/from conveyors. In some embodiments, the conveyor used in connection with the palletization/depalletization is determined based at least in part on an attribute of the conveyor. Examples of attributes of the conveyor include height of the conveyor, relative height of the conveyor, a stack height threshold, etc. Various other attributes pertaining to the conveyor may be used in connection with determining a plan/strategy for palletization/depalletization of items with respect to pallet 535. A control computer of system 500 (not shown) may determine the conveyor to use in connection palletization/depalletization of an item (or a set of items) based at least in part on a determined cost associated with moving an item to/from the corresponding conveyor. In the example illustrated in FIG. 5A, robotic arm 505 is moving items from a conveyor (e.g., conveyor 510) to a pallet 525. System 500 may determine that a cost associated with moving item 520 from conveyor 510 to pallet 535 (e.g., along path 525) is less than a cost associated with moving an item from conveyor 515 to pallet 535 (e.g., along path 530).

In some embodiments, before sending an item along a conveyor for palletization by robotic arm 505, system 500 determines a costs associated with moving item 520 from conveyor 510 to pallet 535, and a cost associated with moving an item from conveyor 515 to pallet 535. The respective costs of moving the item from the conveyors 510 and 515 may be determined based on a current state of the stack of items on pallet 535 and/or an expected state of the stack of items by the time the item is expected to be carried within range of robotic arm 505 and/or an expected time at which robotic arm 505 is to move the item from the conveyor to the pallet 535. In response to determining the costs associated with moving the item from the conveyors to the pallet, system may determine the conveyor along which the item is to be carried (e.g., the source location) based on such conveyor corresponding to a lower cost of moving the item to the pallet 535. In response to determining the source location, system 500 provides the item on the corresponding conveyor (conveyor 510). In some embodiments, the cost of moving an item from a conveyor to a pallet is a distance between the source location (e.g., the conveyor) and the destination location (e.g., a location on pallet 535 or stack on the pallet 535). The distance can be determined as the Euclidean distance between the source location and the destination location.

In some embodiments, the conveyor along which the item is to be carried to robotic arm 505 is determined based on a state of the stack of the pallet in comparison to a stack height threshold. As an example, the stack height threshold may be preset as mid-point of a maximum pallet height. Using the example illustrated in FIG. 5A, in the case that a height of a stack (or an expected destination location of the item on the stack) is below the stack height threshold, in response to system 500 determining that height of a stack (or an expected destination location of the item on the stack) is below the stack height threshold, system 500 determines to provide the item along conveyor 510 (e.g., that conveyor 510 corresponds to the source location with respect to such item) for palletization. Conversely, in some examples, in the case that a height of a stack (or an expected destination location of the item on the stack) is above the stack height threshold, system may determine to provide the item along conveyor 515 for palletization. In examples of depalletization, if the height of a stack is above the stack height threshold, system 500 may determine conveyor 515 to be the destination location; and if the height of a stack is below the stack height threshold, system 500 may determine conveyor 510 to be the destination location. In some implementations, the stack height threshold used in connection with palletization may be the same as the stack height threshold used in connection with depalletization. In some embodiments, the stack height threshold for palletization is different from the stack height threshold for depalletization.

Figure 5B:
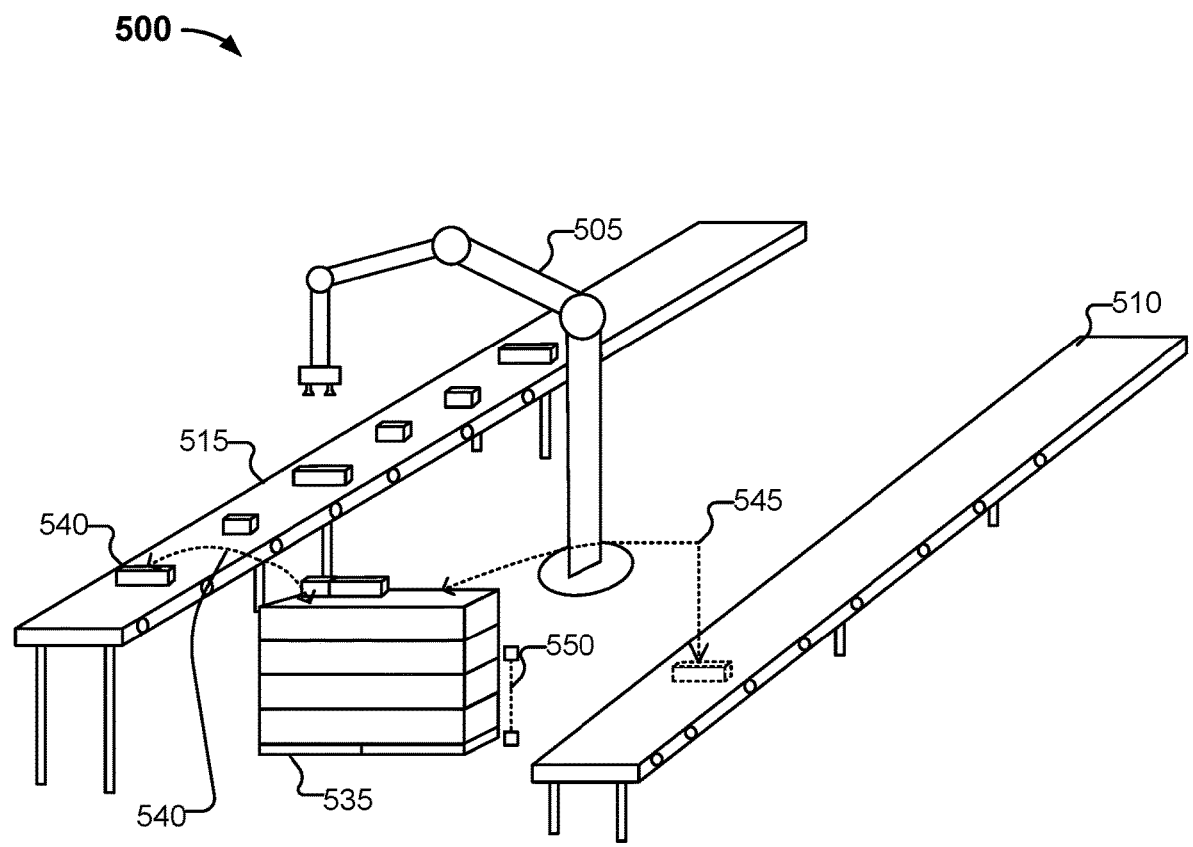
FIG. 5B is a diagram illustrating an example of robotic system to palletize and/or depalletize items according to various embodiments.

FIG. 5B is a diagram illustrating an example of robotic system to palletize and/or depalletize items according to various embodiments. In the example illustrated in FIG. 5B, system 500 comprises a stack on pallet 535 that is relatively higher than the stack on pallet 535 illustrated in FIG. 5A.

In connection with palletization/depalletization of item 540, system 500 may determine the conveyor to/from which item 540 is to be moved. The determination of the conveyor to use in connection with the palletization/depalletization may be based at least in part on an attribute of the conveyor, such as a height of the conveyor (or the height of the conveyor in relation to a stack height threshold 550).

In some embodiments, system 500 may determine that the cost of moving item 540 to/from conveyor 515 (e.g., along path 540) than the cost of moving item 540 to/from conveyor 510 (e.g., along path 545). In response to determining the cost of moving item 540 to/from conveyor 515 being the minimum cost (or at least less than the cost of moving the item to/from conveyor 510), system 500 uses conveyor 515 in connection with the palletization/depalletization of item 540.

In some embodiments, system 500 may use a distance (e.g., a Euclidean distance) between the conveyor and the stack on pallet 535 as a basis for determining the conveyor to use in connection with the palletization/depalletization of item 540. For example, the distance between the item on conveyor 515 and the location on the stack on pallet 535 is less than the distance between a location on conveyor 510 and the location on the stack on pallet 535. Accordingly, system 500 may determine to use conveyor 515 in connection with the palletization/depalletization of item 540.

In some embodiments, system 500 may determine the conveyor to use in the palletization/depalletization of item 540 based at least in part on a current state of a stack of the pallet (or expected state of the stack when the item will be moved), a stack height threshold 550, and an attribute of the conveyor (e.g., a height of the conveyor, a relative height of the conveyor, etc.). In the example illustrated in FIG. 5B, the height of the stack of items on pallet 535 larger than the stack height threshold 550. Accordingly, system 500 may determine to move the item to/from conveyor 515. Conversely, if the height of the stack of items on pallet 535 was lower than stack height threshold 550, system 500 may determine to move the item to/from conveyor 510 (e.g., based on conveyor 510 having a lower height than conveyor 515, etc.).

According to various embodiments, the robotic system stores a predefined maximum pallet height. In some implementations, the predefined maximum pallet height is between 1.5 m and 2.1 m. In some implementations, the predefined maximum pallet height is 1.5 m. In some implementations, the predefined maximum pallet height is 2.1 m. The maximum pallet height may be configured by a user/administrator or may be determined based on at least in part on length of the robotic arm or a height at which the robotic arm can accurately and/or stably position an item on a stack (e.g., a maximum height at which the robotic arm can articulate/orientate a wrist of the robot such that the end effector (e.g., in the case of a suction cup based end effector, etc.) is orthogonal to the ground. One or more height thresholds may be set based at least in part on the predefined maximum pallet height, and the one or more height thresholds may be used in connection with determining the conveyor to be used to pick and/or place items. For example, a first height threshold may be set to be a height that is two-thirds (2/3) the predefined maximum pallet height. In response to determining that the height of the stack on the pallet (e.g., pallet 535) exceeds the first height threshold, the system may use the conveyor having a larger height (e.g., conveyor 515) in connection with picking and/or placing an item. As another example, a second height threshold may be set to be a height that is one-third (1/3) the predefined maximum pallet height. In response to determining that the height of the stack on the pallet (e.g., pallet 535) is below the second height threshold, the system may use the conveyor having a smaller height (e.g., conveyor 510) in connection with picking and/or placing an item. In some embodiments, in response to determining that a height of the stack is between the first height threshold and the second height threshold, the system may use either conveyor 510 or conveyor 515 in connection with picking and/or placing an item (e.g., the system may use other variables in a cost function to determine the height, such as a distance to the destination location, etc.). Other relative heights may be used to set the first height threshold and/or second height threshold. In some implementations, the first height threshold is set to be three quarters (3/4) the predefined maximum pallet height and/or the second height threshold is set to be one quarter (1/4) the predefined maximum pallet height. In some embodiments, the first height threshold and the second threshold may be preset based at least in part on a distance (e.g., a travel distance) with respect to the various conveyors and the corresponding conveyor heights.

Figure 6A:
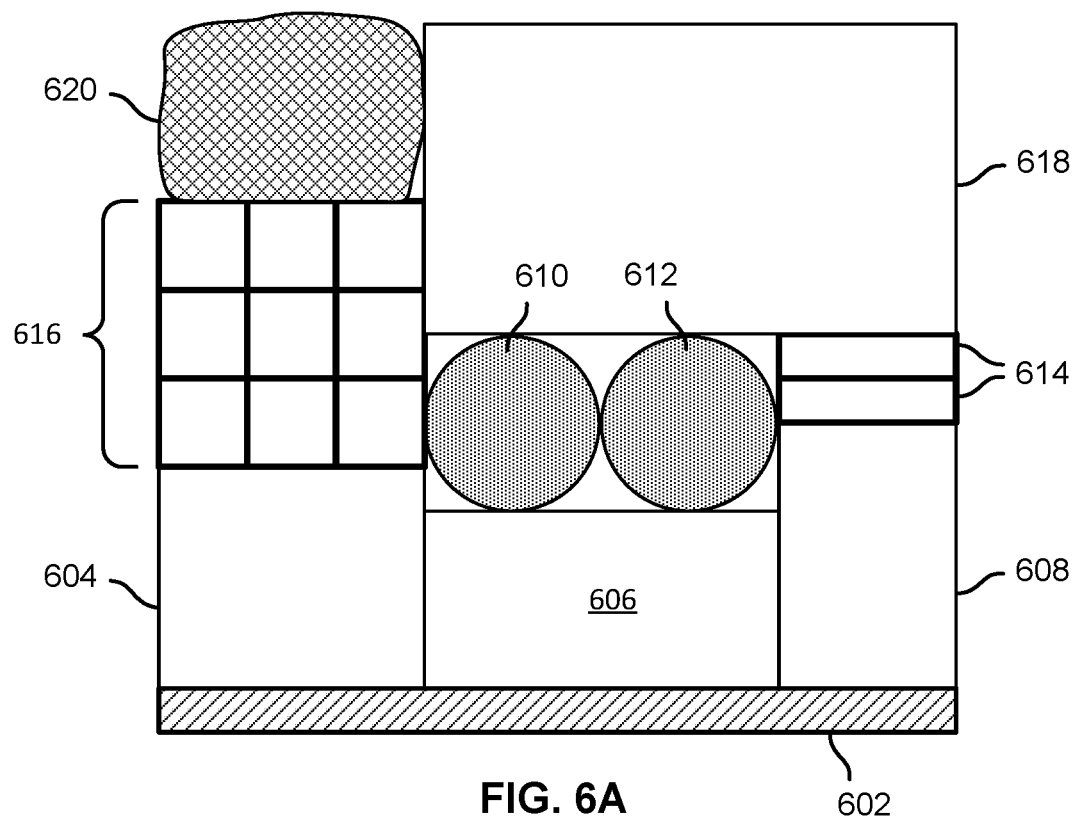
FIG. 6A is a diagram illustrating an example of a pallet as assembled in an embodiment of a robotic system to palletize and/or depalletize heterogeneous items.

FIG. 6A is a diagram illustrating an example of a pallet as assembled in an embodiment of a robotic system to palletize and/or depalletize heterogeneous items. In various embodiments, the items shown in FIG. 6A as stacked on pallet 602 may have been stacked by a robotic system, such as system 100 of FIG. 1 and/or system 400 of FIG. 4A, according to a computer-determined (and/or updated) plan, as in the process 200 of FIG. 2A.

In the example shown, items 604, 606, and 608 are stacked in a first (bottom-most) layer, with items 610, 612,

614, and 616 stacked in a layer on top of items 604, 606, and 608. Items 618 and 620 have been stacked on top.

In various embodiments, the items as shown may have been selected and designated to be placed as shown in FIG. 6A based on item identification and/or attributes, e.g., as determined and/or measured based on image, weight, and/or other sensor data. For example, items 604, 606, and 608 may have been placed in the bottom layer, as shown, based on their (relative) size, weight, rigidity, strength, and/or other indication of ability (of item and/or packaging) to support weight stacked on top.

The placement, orientation, etc., of each item is determined in various embodiments by applying one or more heuristics, algorithms, or other tools and/or techniques. For example, each item is added at least in part by determining a location within the entire pallet and/or in a layer currently being stacked and/or arranged so as to provide a relatively (more) flat top surface to form the basis for a next layer, to minimize stack surface area, to minimize current layer perimeter, etc. In various embodiments, one or more of the following heuristics may be used: place next item to maintain center of mass close to the center of the pallet; maintain a clear motion path for the robotic arm for subsequent items; maintain visibility of the cameras to all top layer boxes or unboxed items; etc. In some embodiments, one or more of the aforementioned heuristics may be used in connection with determining a value pertaining to stability of a stack of items, etc.

In the example shown, items 610 and 612 are round (at least in cross-section), and in some embodiments their shape would be taken into consideration in selecting a location to place them. For example, an interior location in which items 610 and 612 are constrained by other adjacent items, as shown in FIG. 6A, may be selected over a location on the edge or end of a layer.

Items 618 and 620 may have been selected to be placed on top, in various embodiments, based on one or more attributes, such as their weight (or density), ability to support weight stacked on top of them, etc.

Figure 6B:
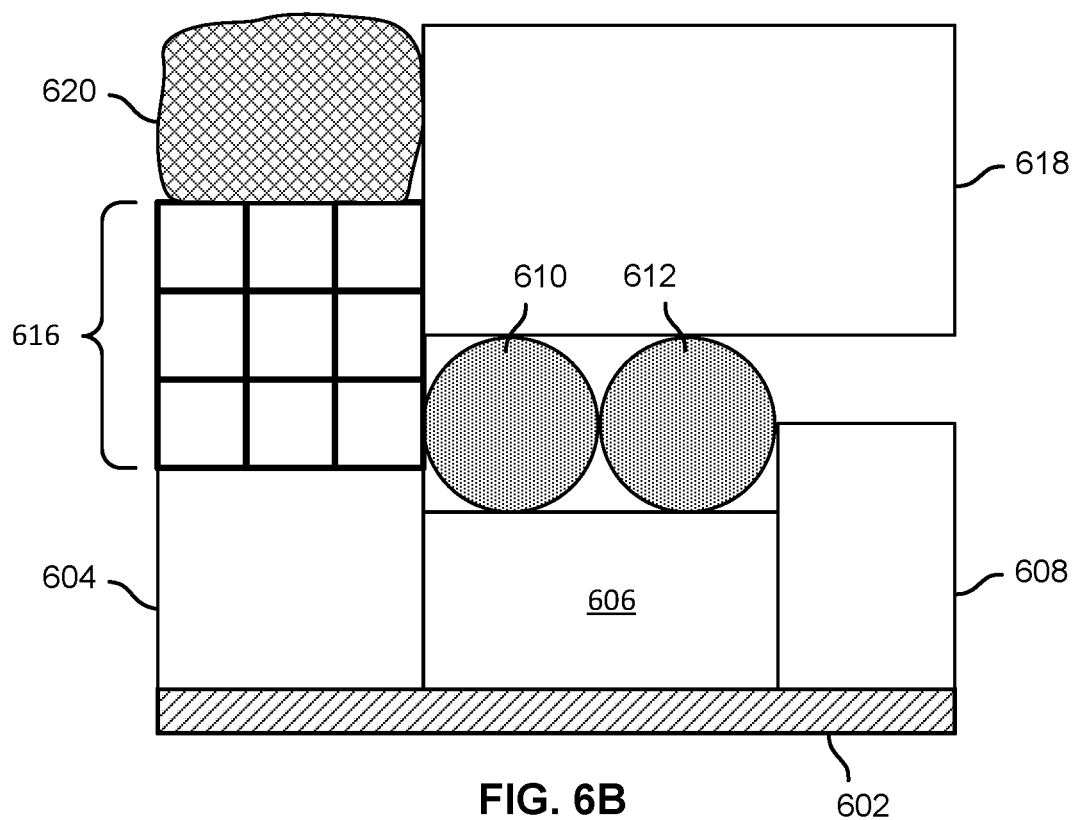
FIG. 6B is a diagram illustrating an example of a pallet as assembled in an embodiment of a robotic system to palletize and/or depalletize heterogeneous items.

FIG. 6B is a diagram illustrating an example of a pallet as assembled in an embodiment of a robotic system to palletize and/or depalletize heterogeneous items. In this example, the items 614 included in the example as shown in FIG. 6A are omitted. In various embodiments, a plan to stack items as shown in FIG. 6B may be generated by a control computer, such as control computer 118 of FIG. 1 or a control computer comprised in system 400 of FIG. 4A. In the example shown, an algorithmically generated plan may consider the item 618 stacked on items 610, 612 to be in a stable position. For example, there may be no computed net moment about any point or axis that would lead a control computer to determine the position as shown is not stable. In practice, however, slight deviation from plan in the placement of items on pallet 602 could result in the item 618 not being in a stable position once stacked on items 610, 612, for example. In some embodiments, a robotic arm and end effector (e.g., suction, gripper) used to place item 618 includes sensors and logic to detect instability. For example, image data may be processed and may indicate the items is leaning to the right, as shown. Or, prior to releasing the item 618 force sensors in the end effector may be used to detect the item would not be stable if released. For example, if the item gives way (or provides resistance unevenly) when pressed down but not yet released, in various embodiments the system determines the item is not stable. In some embodiments, the robotic system dynamically updates the model of the stack such as in response to obtaining information pertaining to stability/instability of the stack or item placed on the stack, or in response to placing the item, etc.

In various embodiments, detection of unexpected instability triggers responsive action. For example, other items (e.g., items 614 as in FIG. 6A) may be placed in position to further support the item that was not stable. Or, the item may be shifted to a different nearby position (e.g., snugged left in the example shown), to see if the item would be stable in the new position. Or, the item may be removed from the stack and moved to a buffer or staging area in which the item is temporarily stored until the robotic system determines a more ideal destination location (e.g., as additional items are stacked on the pallet and a space in which the item would better fit or result in better stability is formed). In various embodiments, if automated processing fails to determine a resolution, human intervention (e.g., via teleoperation, manually, etc.) may be triggered.

Figure 7A:
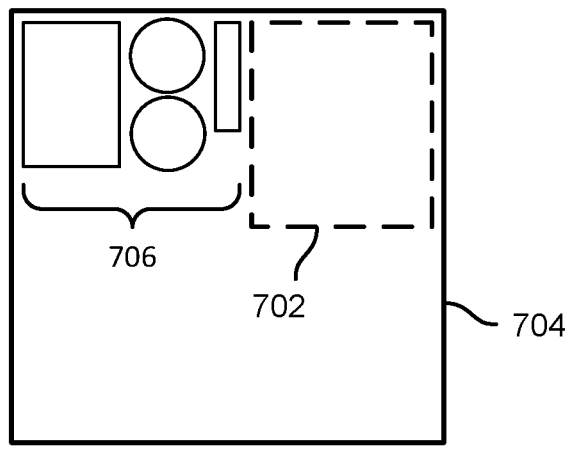
FIG. 7A is a diagram illustrating an example of item placement on a pallet in an embodiment of a robotic system to palletize and/or depalletize heterogeneous items.

FIG. 7A is a diagram illustrating an example of item placement on a pallet in an embodiment of a robotic system to palletize and/or depalletize heterogeneous items. In the example shown, a location 702 has been determined to place an item (not shown in FIG. 6A) on a pallet 704 in a position adjacent to previously-placed items 706. For example, the location 702 may have been determined based on item attributes (size, weight, dimensions, etc.), as in 210 of FIG. 2.

Figure 7B:
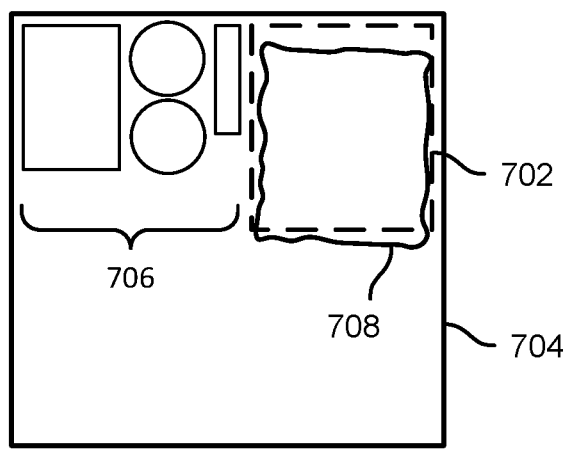
FIG. 7B is a diagram illustrating an example of item placement on a pallet in an embodiment of a robotic system to palletize and/or depalletize heterogeneous items.

FIG. 7B is a diagram illustrating an example of item placement on a pallet in an embodiment of a robotic system to palletize and/or depalletize heterogeneous items. In the example shown, the item 708 has been moved to a first order of accuracy to a position at or near the intended location 702. In this example, the item 708 has a slightly irregular outer texture, which may have resulted in imperfect picking and/or placement of the item at or near location 702. In some embodiments, variations and/or inconsistencies in the image data and/or other sensor data received concerning one or more of location 702, pallet 704, items 706, and item 708 may have resulted in the imperfect placement of item 708 as shown in FIG. 7B.

Figure 7C:
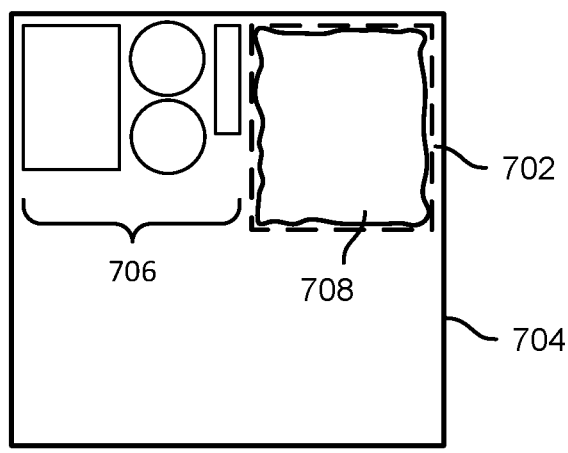
FIG. 7C is a diagram illustrating an example of item placement on a pallet in an embodiment of a robotic system to palletize and/or depalletize heterogeneous items.

FIG. 7C is a diagram illustrating an example of item placement on a pallet in an embodiment of a robotic system to palletize and/or depalletize heterogeneous items. In the example shown, the item 708 has been snugged into a location at or near planned location 702 to a second order of accuracy. In various embodiments, second order sensors, such as force sensors embodied in/on a robotic arm and/or end effector, are used to snug an item into a more tightly-fitted position in a stack. For example, the robotic arm may be used to snug an item, such as item 708, to a position more close and in (more complete) contact with adjacent items (e.g., items 706) and/or other structures, such as side walls (in the case of a pallet or trolley that has one or more side walls, for example). According to various embodiments, a machine learning process is implemented to update the strategies and/or plans for performing active measures such as applying pressure to snug the item into position. The machine learning process may be updated/improved dynamically in response to the strategy and/or plan being implemented by one or more robotic systems.

In some embodiments, an item such as item 708 may be snugged more closely to adjacent items, sidewalls, etc. and may result in the item ending up in a location not entirely consistent with the original plan. In some embodiments, snug placement is desired and preferred within layers to maximize the use of available space and to maximize stability by couple adjacent items to one another and (as applicable) to adjacent structures, such as sidewalls.

Figure 8A:
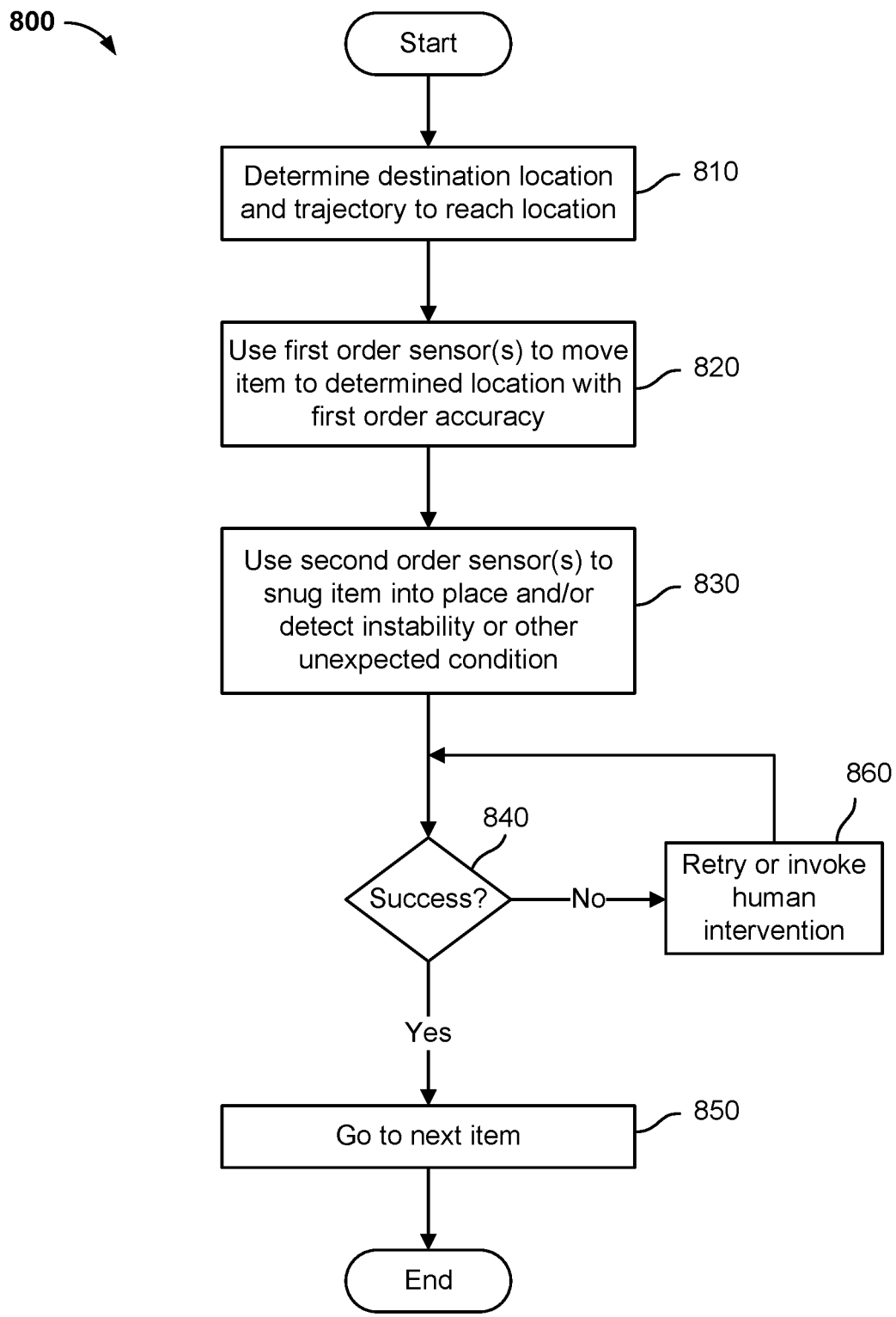
FIG. 8A is a flow chart illustrating an embodiment of a process to place an item on a pallet.

FIG. 8A is a flow chart illustrating an embodiment of a process to place an item on a pallet. In various embodiments, the process 800 is performed by a control computer, such as control computer 118 of FIG. 1 and/or a control computer of system 400 of FIG. 4A, e.g., to pick and place successive items according to a plan.

In the example shown, at 810 a destination location and trajectory to reach the location are determined for a next item to be picked and placed. For example, a predetermined (e.g., according to a plan) and/or a dynamically-determined (e.g., based on item identification, sensor data, locations of previously-placed items, etc.) location and a trajectory or path along which the item is to be moved to that location may be determined. At 820, one or more first order sensors (e.g., image data) are used to move the item to the destination location with first order accuracy (e.g., as in the example shown in FIG. 7B). At 830, one or more second order sensors (e.g., force sensors) are used to snug the item into place (as in FIG. 7C) and/or to detect instability (as in FIG. 5B) or other unexpected conditions. If the item is determined at 840 to have been placed successfully, at 810 processing continues with a next item, with respect to which a next iteration of the process 800 is performed. If the item is determined at 840 not to have been placed successfully (e.g., item not in expected location as determined by image data, item not stable, stack not stable, etc.), then at 860 the system tries again via automated processing to securely place the item, e.g., if a further strategy to attempt to do so is available, and/or human intervention is invoked (e.g., via on demand teleoperation) until the item is determined at 840 to have been placed successfully.

In various embodiments, a robotic system to palletize/depalletize as disclosed herein is configured to make and/or update dynamically a plan to place and stack items. For example, the next item(s) to be placed may not be known ahead of time, and adjustments to the plan may be required. For example, if soft and/or fragile items have been placed or planned to be placed in a lower layer and heavier items are detected to be arriving (next), the plan may be adjusted dynamically to buffer (set aside in a staging area) the soft and/or fragile items, allowing the heavier items to be placed in the lower level first. In some embodiments, if the soft and/or fragile items have already been placed (e.g. on the pallet), the items may be removed to the buffer (staging) area to allow the heavier items to be placed in the lower level in their place.

According to various embodiments, a machine learning process may be used in connection with updating the process or model for determining the destination location and trajectory and/or strategies for placing the item at the destination location. For example, the model for determining the destination location and trajectory and/or strategies for placing the item at the destination location to better reflect strategies that were successful and/or strategies that were not successful, including an association of the strategies and/or historical information with the item subject to such strategy or one or more attributes of such an item.

Figure 8B:
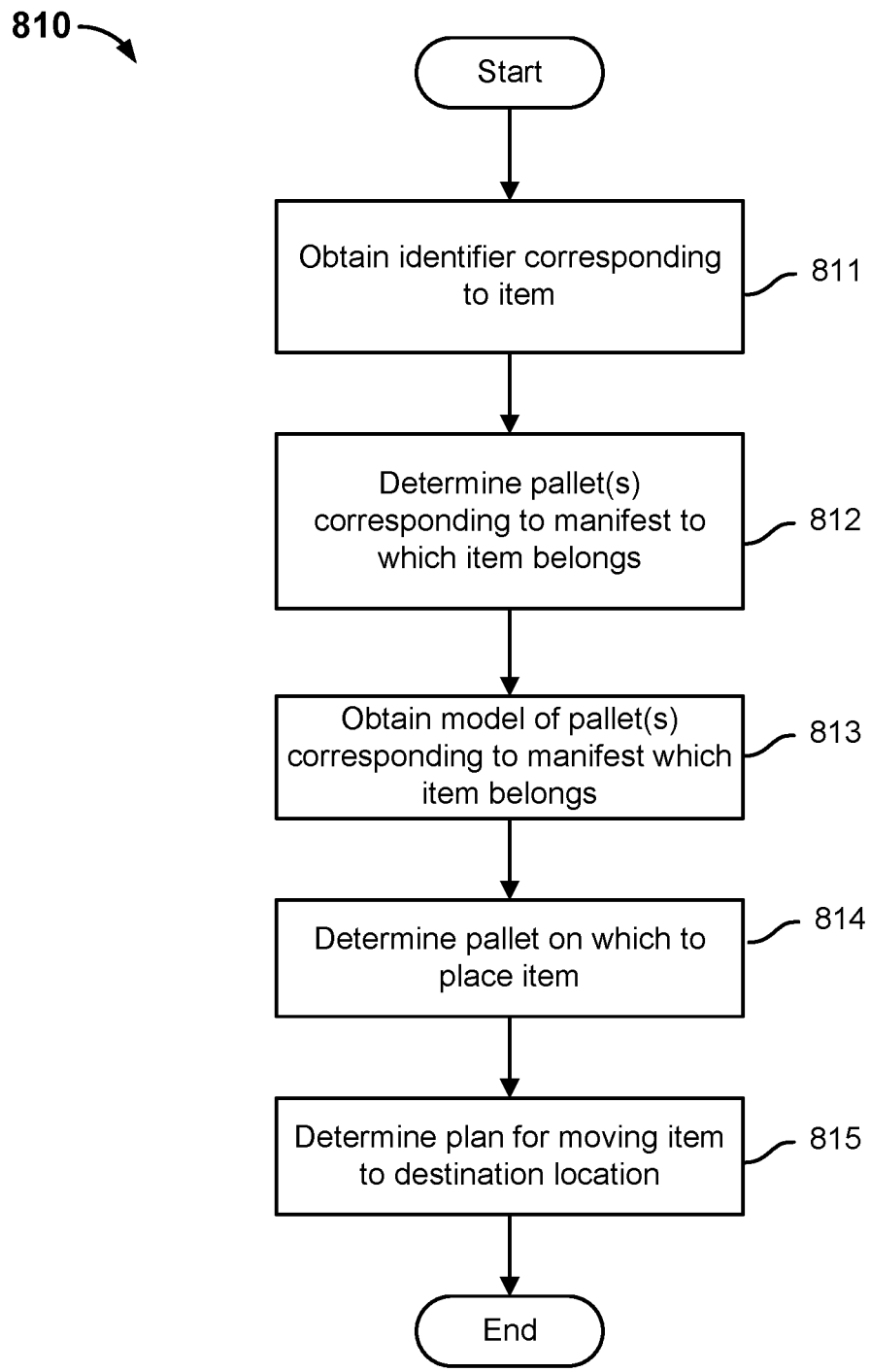
FIG. 8B is a flow chart illustrating an embodiment of a process to determine a plan for moving an item on a pallet.

FIG. 8B is a flow chart illustrating an embodiment of a process to determine a plan for moving an item on a pallet. In some embodiments, process 810 of FIG. 8B corresponds to, or is implemented in connection with, 810 of process 800 of FIG. 8A. Process 810 is performed by a control computer, such as control computer 118 of FIG. 1 and/or a control computer of system 400 of FIG. 4A, e.g., to determine a plan for picking/placing an item.

At 811, an identifier corresponding to an item is obtained. In some embodiments, the system obtains the identifier based at least in part on information obtained by one or more sensors. For example, the identifier may be a barcode, a QR code, a near field communication label, etc., one or more sensors in the workspace such as a sensor (e.g., scanner) at an input to the system may obtain the information pertaining to the identifier. The sensor at the input to the system may be a sensor located within proximity of a conveyor that carries the items to the system. In some embodiments, the identifier corresponding to the item is obtained from a data structure such as a mapping of trays or conveyor slot to items and/or item identifiers. The data structure may have been set by an upstream system that retrieved the items and provided the items for palletization.

At 812, one or more pallets corresponding to a manifest to which the item belongs is determined. In some embodiments, the system may use the identifier corresponding to the item in connection with determining the manifest to which the item belongs. For example, the system may perform a lookup with respect to a mapping of item identifiers to manifests, etc. In response to determining the manifest to which the item belongs, the system may determine the one or more pallets corresponding to the manifest. As an example, if a manifest of items comprises a sufficiently large number of items so that all items on the manifest do not fit on a single pallet, the system may determine a plurality of pallets on which the item may be placed (and still satisfy fulfillment of the manifest with respect to the item). As another example, if the system simultaneously stacks items on a plurality of pallets, the system may determine which one or more pallets of the plurality of pallets correspond to the manifest.

At 813, a model of at least one of the one or more pallets corresponding to the manifest to which the item belongs are determined. According to various embodiments, the system obtains a model for each of the pallets corresponding to the manifest. The system may obtain the model for pallets that correspond to the manifest and for which the system is actively palletizing items on the pallets (e.g., predefined zone in which the pallet is located is not paused or set to inactive).

In some embodiments, the system may obtain a cached model pertaining to a pallet (e.g., a model of the stack of items on the pallet). As an example, cached model may comprise a current model of the stack of items on the pallet. As another example, the cached model may comprises a model according to a previous state of the stack of items on the pallet. In response to a determination that the cached model corresponds to a previous state of the stack of items on the pallet, the system may generate a new model corresponding to a current state of the stack of items on the pallet, or update the cached model to correspond to the current state.

In some embodiments, the system generates the model for the at least one of the one or more pallets corresponding to the manifest to which the item belongs. The system may generate a model of a stack of items on a pallet based at least in part on the information obtained by one or more sensors in the workspace such as a sensor that obtains information pertaining to the predefined zone in which the pallet is located.

At 814, a pallet on which to place the item is determined. In some embodiments, the pallet on which to place the item is determined based at least in part on the corresponding model pertaining to the pallet. The pallet may be determined based at least in part on an updated model or simulation in connection with assessing an expected stack of items if the item were to be placed on the pallet. In the case of a plurality of pallets corresponding to the manifest to which the item belongs, the system may select a pallet on which to place the item based on a determination that the item fits best on the pallet (e.g., on the stack of items), etc.

According to various embodiments, the system may determine the pallet on which to place the item based at least in part on a state of the pallet and/or a state of the plurality of pallets. The system may determine a state of a stack on one or more of the plurality of pallets, and determine the pallet on which to place the item based at least in part on a determination of a stack for which the item has a best fit. The determination that the stack for which the item has a best fit may be based at least in part on a stability of the stack, a model of the stack and/or a model of the stack comprising the item (e.g., after the item is placed on the stack), an expected one or more items that remain to be stacked (e.g., based at least in part on an order and/or manifest), etc. One or more attributes or characteristics pertaining to the item may be used in connection with determining the pallet on which to place the item (e.g., a size, shape, type of packaging, type of item, etc. may be used in connection with modelling the stack and/or determining where to place the item on a stack).

The system may generate the model of the state of the pallet in connection with determining whether to place an item on the pallet (e.g., on the stack), and selecting a plan for placing the item on the pallet, including a destination location at which the item is to be placed, a trajectory along which the item is to be moved from a source location (e.g., a current destination such as a conveyor) to the destination location. The system may also use the model in connection with determining a strategy for releasing the item, or otherwise placing the item on the pallet (e.g., applying a force to the item to snug the item on the stack). The modelling of the state of the pallet may include simulating placement of the item at different destination locations on the pallet (e.g., on the stack) and determining corresponding different expected fits and/or expected stability (e.g., a stability metric) that is expected to result from placement of the item at the different locations. The system may select a destination location for which the expected fit and/or expected stability satisfies (e.g., exceeds) a corresponding threshold value. Additionally, or alternatively, system may select a destination location that optimizes the expected fit (e.g., of the item on the stack) and/or expected stability (e.g., of the stack).

At 815, a plan for moving the item to a destination location is determined. In some embodiments, in response to determining the pallet on which to place the item, the system determines a destination location on the pallet at which to place the item. The system may also determine a plan for moving the item such as picking the item from the input (e.g., the conveyor) and placing the item at the destination location (e.g., on the pallet). The system may determine the plan for moving the item based at least in part on one or more attributes of the item and/or the model of the pallet (e.g., a current state/properties of the pallet such as a state of the stack of items on the pallet). The plan for moving the item may be determined based at least in part on an expected cost of moving the item from the source location to the destination location (e.g., the cost of moving the item along the path/trajectory), etc. In some embodiments, the plan for moving the item is based at least in part on a state of the stack of items on the pallet and an attribute of the source location (e.g., a height of the conveyor).

Figure 8C:
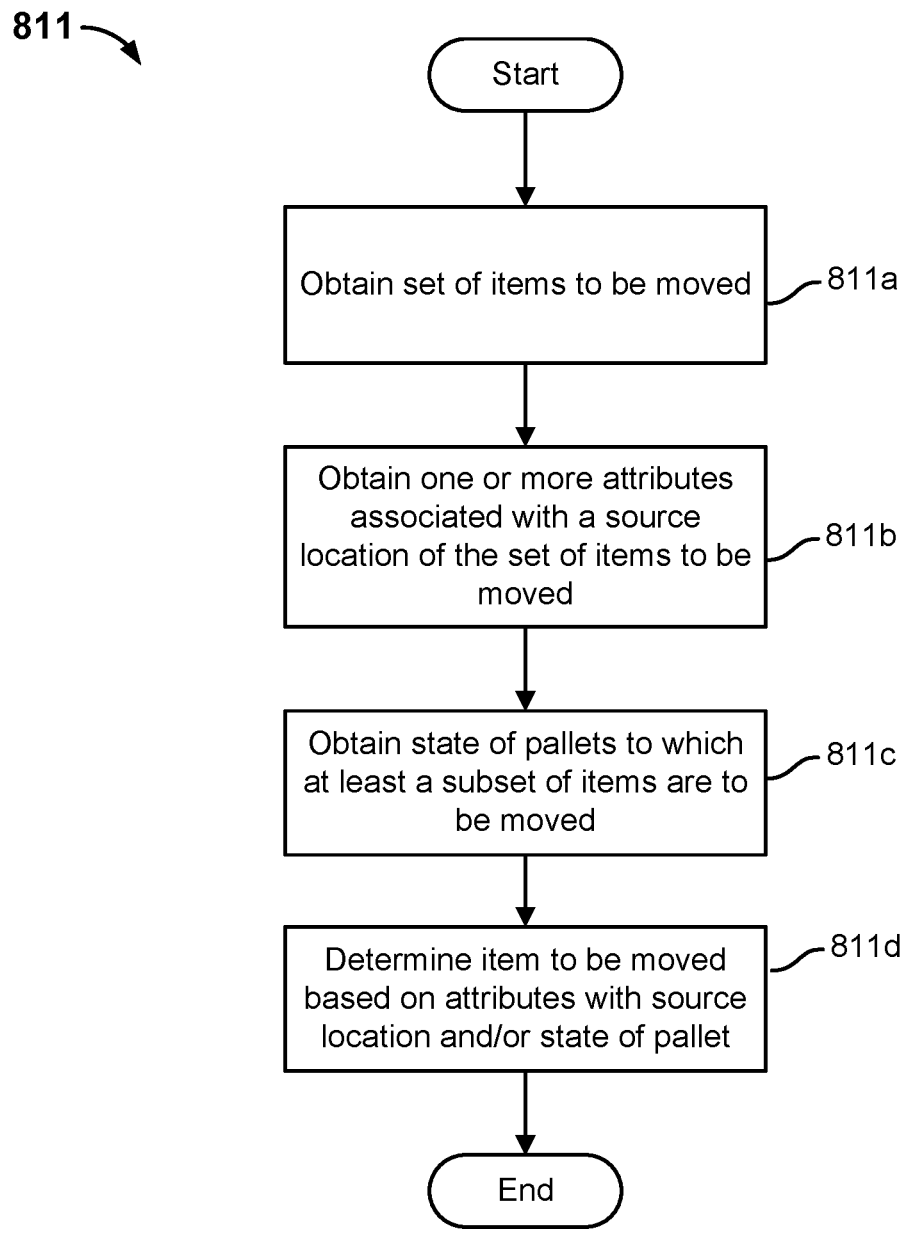
FIG. 8C is a flow chart illustrating an embodiment of a process to determine to an item to move to a pallet.

FIG. 8C is a flow chart illustrating an embodiment of a process to determine to an item to move to a pallet. In some embodiments, process 811 of FIG. 8C corresponds to, or is implemented in connection with, 811 of process 810 of FIG. 8B. Process 811 is performed by a control computer, such as control computer 118 of FIG. 1 and/or a control computer of system 400 of FIG. 4A, e.g., to determine a plan for picking/placing an item.

At 811a, a set of items to be moved is obtained. For example, the system may obtain a manifest for the set of items to be moved. The manifest may correspond to an order or shipment to be provided to a customer, etc. The manifest may include identifiers corresponding to the various items to be moved.

At 811b, one or more attributes associated with a source location (or possible source location) from which the items are to be moved to a pallet are obtained. The attributes may include a position, a height, a relative height (e.g., relative to a stack height threshold, to a current or expected state of the pallet, etc.), etc. Various other attributes of the source location may be obtained.

At 811c, one or more states of a set of pallets to which at least a subset of the items are to be moved are obtained. In some embodiments, the items on the manifest may be simultaneously (e.g., concurrently or contemporaneously) palletized. A state of the possible pallets to which items for the manifest may be moved is obtained. The state of a pallet may be a current state of the pallet, or an expected state of the pallet such as a state of the pallet at a particular time. The particular time for determining the expected state of the pallet may be the time at which the item is expected to be moved to the pallet, a time when the item is expected to reach the robotic arm for palletization, etc. The state of the pallet may correspond to a height of the pallet, a model or simulation of the stack on the pallet, a stability of the pallet, etc.

At 811d, an item to be moved is determined based at least in part on an attribute of the source location and a state of the pallet. In some embodiments, the system determines an order in which a subset or set of items from the manifest are to be palletized based at least in part on an attribute of the source location and a state of the pallet. The item to be moved may be further determined based at least in part on an attribute of the item (e.g., height). The attribute of various items may be used in connection with determining to move the item in order to take into account the corresponding costs of moving the items, and an expected stability of the stack (e.g., the order in which the items are palletized may impact characteristics of the stack such as stability, density, etc.).

Figure 9A:
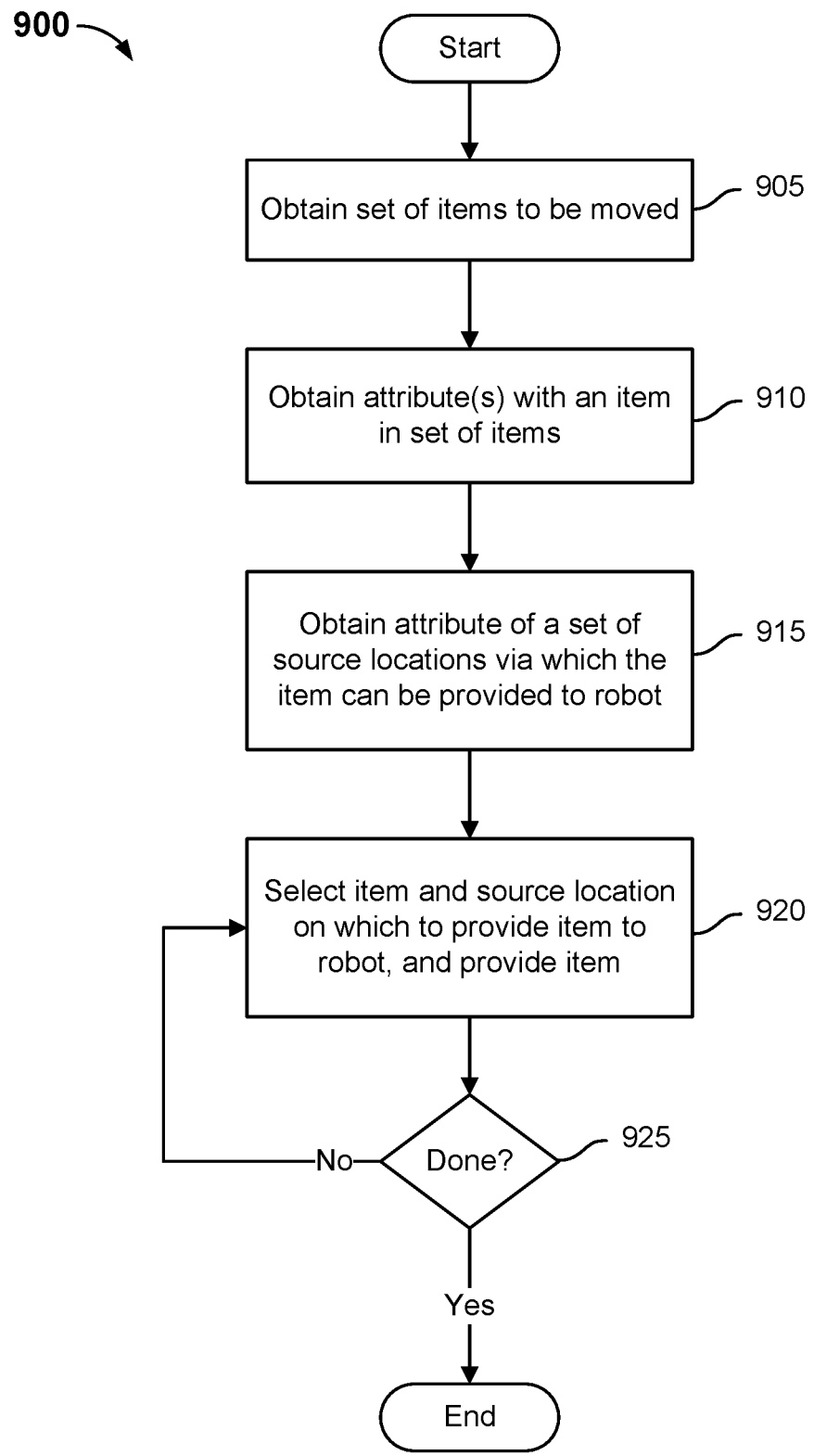
FIG. 9A is a flowchart illustrating an embodiment of a process of providing an item to a robot for the robot in connection with palletization.

FIG. 9A is a flowchart illustrating an embodiment of a process of providing an item to a robot for the robot in connection with palletization. Process 900 may be implemented by system 400 of FIG. 4.

At 905, a set of items to be moved is obtained. For example, the system may obtain a manifest for the set of items to be moved. The manifest may correspond to an order or shipment to be provided to a customer, etc. The manifest may include identifiers corresponding to the various items to be moved.

At 910, one or more attributes associated with an item in the set of items is obtained. As an example, the one or more attributes may be obtained from a mapping of attributes to items (e.g., a mapping of attributes to identifiers of items). As another example, the one or more attributes may be obtained based at least in part on sensor data. The sensor data may be obtained using one or more sensors within a workspace of the robotic system.

The attribute of various items may be used in connection with determining an order in which to provide the items, and/or in determining a source location to which the item is to be provided for palletization. The attribute of the various items may be used to compute the costs of moving the various items from different source locations to a destination location (e.g., a location on the stack on the pallet). In some embodiments, the attributes of the various items are used to model or simulate palletization of a stack of item and/or determining one or more expected attributes of the stack associated with moving the item to the stack. The expected attributes of the stack may include a density, a stability, a height, a shape or profile, a center of gravity, a rigidity, etc.

At 915, an attribute of a set of source locations via which the item can be provided to a robot are obtained. For example, as illustrated in system 400 of FIG. 4A, a plurality of conveyors may be used to provide items to robotic arm 401. The various source locations (e.g., conveyors) in the system may have different attributes, and an attribute of a particular location may be used in connection with determining a source location. The attribute of a source location may include a location (e.g., a relative location to the robotic, an absolute location), a height, a speed at which the conveyor carries items, a relative height (e.g., a height relative to stack height threshold, a height relative to a current height of the stack on a pallet), an indication of whether the location is to be used if the current/expected height of the stack is less than the stack height threshold, etc.

At 920, an item and source location on which the item is to be provided to the robot is selected, and the item is provided. In some embodiments, the system models or simulates the stack or palletization of the set of items on one or more pallets. The system may provide the items based on an expected stack of the pallet (e.g., items to form the base or towards the bottom of the stack may be provided before items that are to be stacked towards the top of the stack). In some embodiments, the order in which the items are palletized or provided to the robot, and the source location from which the item is provided to the robot is determined based at least in part on the cost of moving the item from the selected source location to the destination location on the corresponding pallet. For example, the system may determine the source location based on a minimization/optimization of the costs of moving the item to the destination location. As an illustrative example, in the case that the stack of items is below a certain height such as a stack height threshold or that the location of the item in the stack is to be below the certain height, the system may determine to provide the items to the source location having a relatively lower height so as to reduce the distance/cost associated with moving the item from the source location to the destination location. As another illustrative example, in the case that the stack of items is above a certain height such as a stack height threshold or that the location of the item in the stack is to be above the certain height, the system may determine to provide the items to the source location having a relatively larger height so as to reduce the distance/cost associated with moving the item from the source location to the destination location.

In the example shown, the selecting of the item and source location and the providing of the item continue until all the items in the set of items (or items to be palletized) is completed (925), at which the process 900 ends.

Figure 9B:
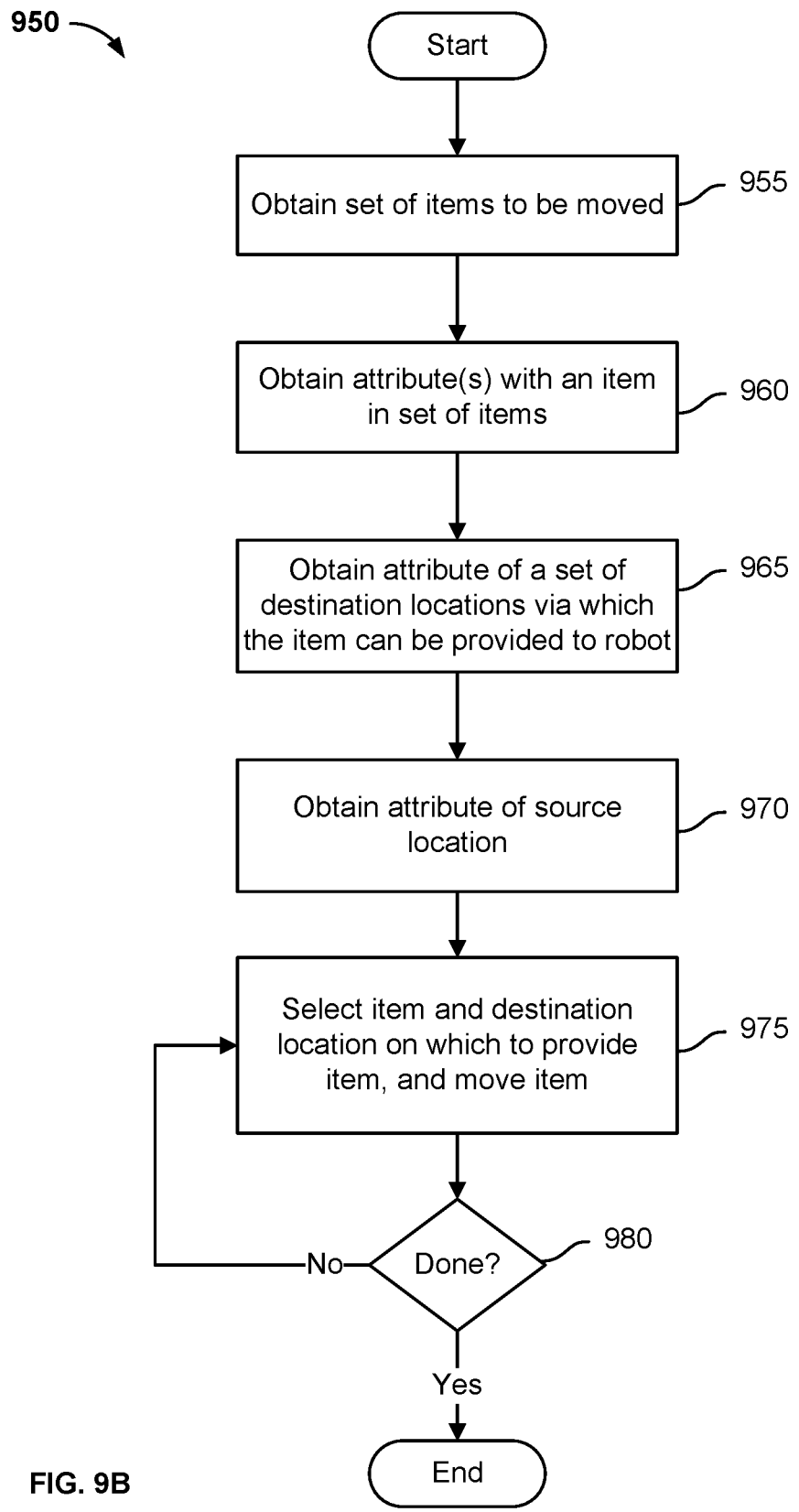
FIG. 9B is a flowchart illustrating an embodiment of a process of depalletizing an item.

FIG. 9B is a flowchart illustrating an embodiment of a process of depalletizing an item. Process 950 may be implemented by system 400 of FIG. 4.

At 955, a set of items to be moved is obtained. For example, the system may obtain a manifest for the set of items to be moved. The manifest may correspond to an order or shipment to be provided to a customer, etc. The manifest may include identifiers corresponding to the various items to be moved.

At 960, one or more attributes associated with an item in the set of items is obtained. As an example, the one or more attributes may be obtained from a mapping of attributes to items (e.g., a mapping of attributes to identifiers of items). As another example, the one or more attributes may be obtained based at least in part on sensor data. The sensor data may be obtained using one or more sensors within a workspace of the robotic system.

The attribute of various items may be used in connection with determining an order in which to provide the items, and/or in determining a source location to which the item is to be provided for palletization. The attribute of the various items may be used to compute the costs of moving the various items from different source locations to a destination location (e.g., a location on the stack on the pallet). In some embodiments, the attributes of the various items are used to model or simulate palletization of a stack of item and/or determining one or more expected attributes of the stack associated with moving the item to the stack. The expected attributes of the stack may include a density, a stability, a height, a shape or profile, a center of gravity, a rigidity, etc.

At 965, an attribute of a set of destination locations via which the item can be provided to a robot are obtained. For example, as illustrated in system 400 of FIG. 4A, a plurality of conveyors may be used to provide items to robotic arm 401. The various destination locations (e.g., conveyors) in the system may have different attributes, and an attribute of a particular location may be used in connection with determining a destination location. The attribute of a destination location may include a location (e.g., a relative location to the robotic, an absolute location), a height, a speed at which the conveyor carries items, a relative height (e.g., a height relative to stack height threshold, a height relative to a current height of the stack on a pallet), an indication of whether the location is to be used if the current/expected height of the stack is less than the stack height threshold, etc.

At 970, an attribute of the source location is obtained. In some embodiments, the system obtains a state of the stack of items on the pallet. For example, the attribute of the source location may include a height of stack of items and/or an indication of whether the stack of items is higher than a stack height threshold. The obtaining the attribute of the source location may include generating a model/simulation of the stack using sensor data.

At 975, an item and destination location on which the item is to be provided to the robot is selected, and the item is moved. In some embodiments, the system models or simulates the stack or palletization of the set of items on one or more pallets. The system may move the items based at least in part on a model of the stack of items. For example, the system may determine the item to move based on a current stability of the stack, an expected stability of the stack after the item is removed from the stack, etc. In some embodiments, the order in which the items are depalletized, and/or the destination location to which the item is moved, are determined based at least in part on the cost of moving the item from the selected source location to the destination location (e.g., the selected conveyor). For example, the system may determine the source location based on a minimization/optimization of the costs of moving the item to the destination location. As an illustrative example, in the case that the stack of items is below a certain height such as a stack height threshold, the system may determine to move the items to the source location having a relatively lower height (e.g., a lower conveyor) so as to reduce the distance/cost associated with moving the item from the source location to the destination location. As another illustrative example, in the case that the stack of items is above a certain height such as a stack height threshold, the system may determine to move the items to the destination location having a relatively larger height so as to reduce the distance/cost associated with moving the item from the source location to the destination location.

In the example shown, the selecting of the item and source location and the providing of the item continue until all the items in the set of items (or items to be palletized) is completed (980), at which the process 950 ends.

Figure 10:
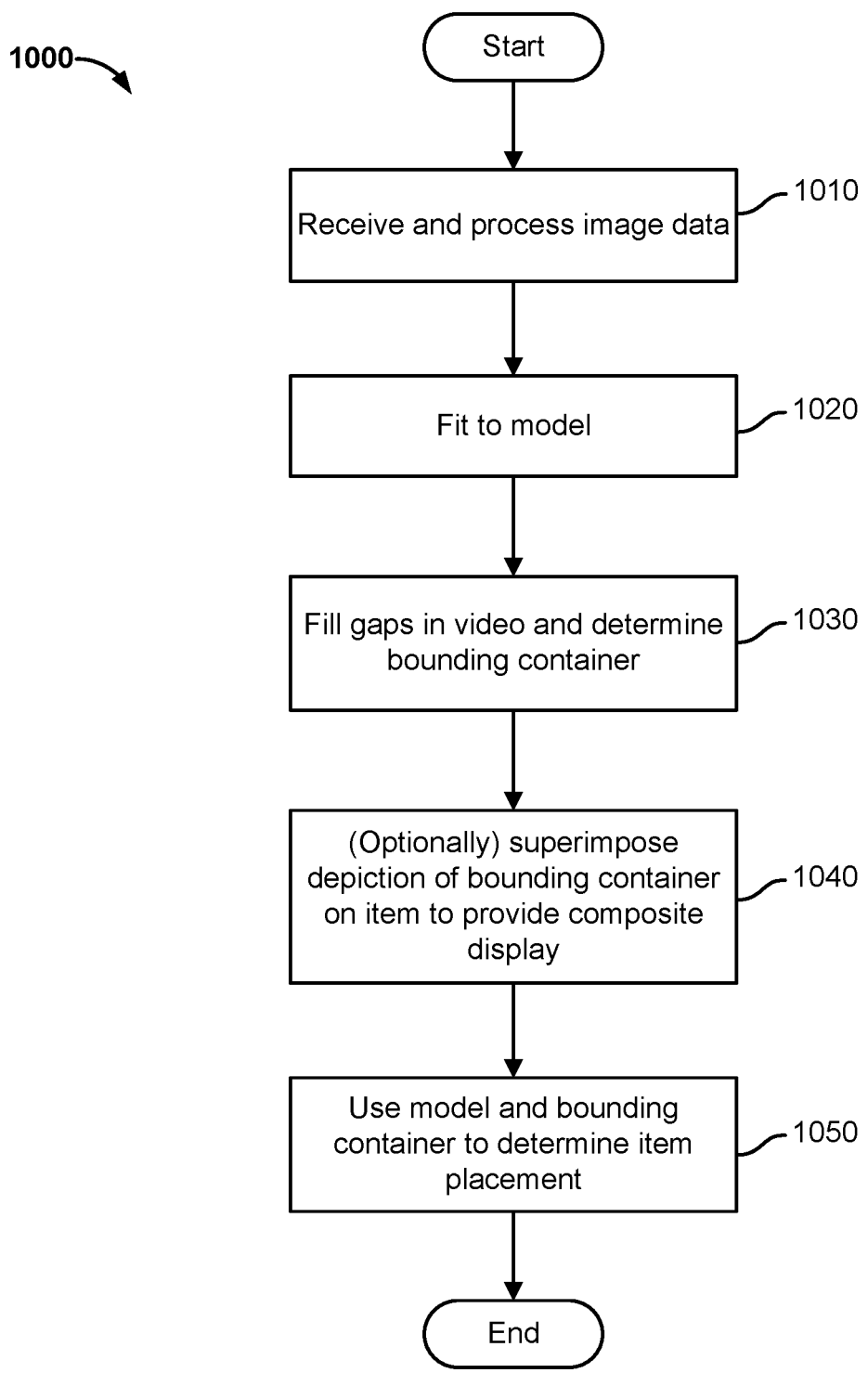
FIG. 10 is a flow chart illustrating an embodiment of a process to place items on a pallet.

FIG. 10 is a flow chart illustrating an embodiment of a process to place items on a pallet. In various embodiments, the process 1000 is performed by a control computer, such as control computer 118 of FIG. 1 and/or control computer of system 400 of FIG. 4A, based on sensor data, such as image data generated by sensors in the workspace such as cameras 112, 114, and 116. In various embodiments, the process 1000 is used to determine item attributes and placement dynamically, e.g., based on item size and shape as determined based at least in part on image data.

In the example shown, at 1010 image data is received and processed. For example, image data from two or more cameras may be received and merged to generate a composite set of points in three dimensional space.

At 1020, image data received and processed at 1010 is fitted to a model. For example, the composite set of points may be compared to corresponding data comprising a library of item models and a "best fit" or "best match" model may be determined. In some embodiments, the library of item models is dynamically updated based at least in part on a machine learning process that uses information from historical models and results of implementation of such models to improve or update.

At 1030, gaps in the image data are filled, e.g., using data from the best fit model, and a bounding container (e.g., a bounding "box" for an item that is rectangular or nearly so in all dimensions) is determined for the item.

Optionally, at 1040, a graphical depiction of the bounding container is superimposed on the composite and/or raw image of the item (e.g., raw video) to provide a composite display, e.g., to a human user monitoring the operation.

At 1050, the model determined at 1020 and the bounding container determined at 830 are used to determine a destination location at which to place the item (e.g., on a pallet). In some embodiments, the bounding container may be displayed in the determined placement location, e.g., in a visual display and/or representation of the operation to pick and place the item.

Figure 11:
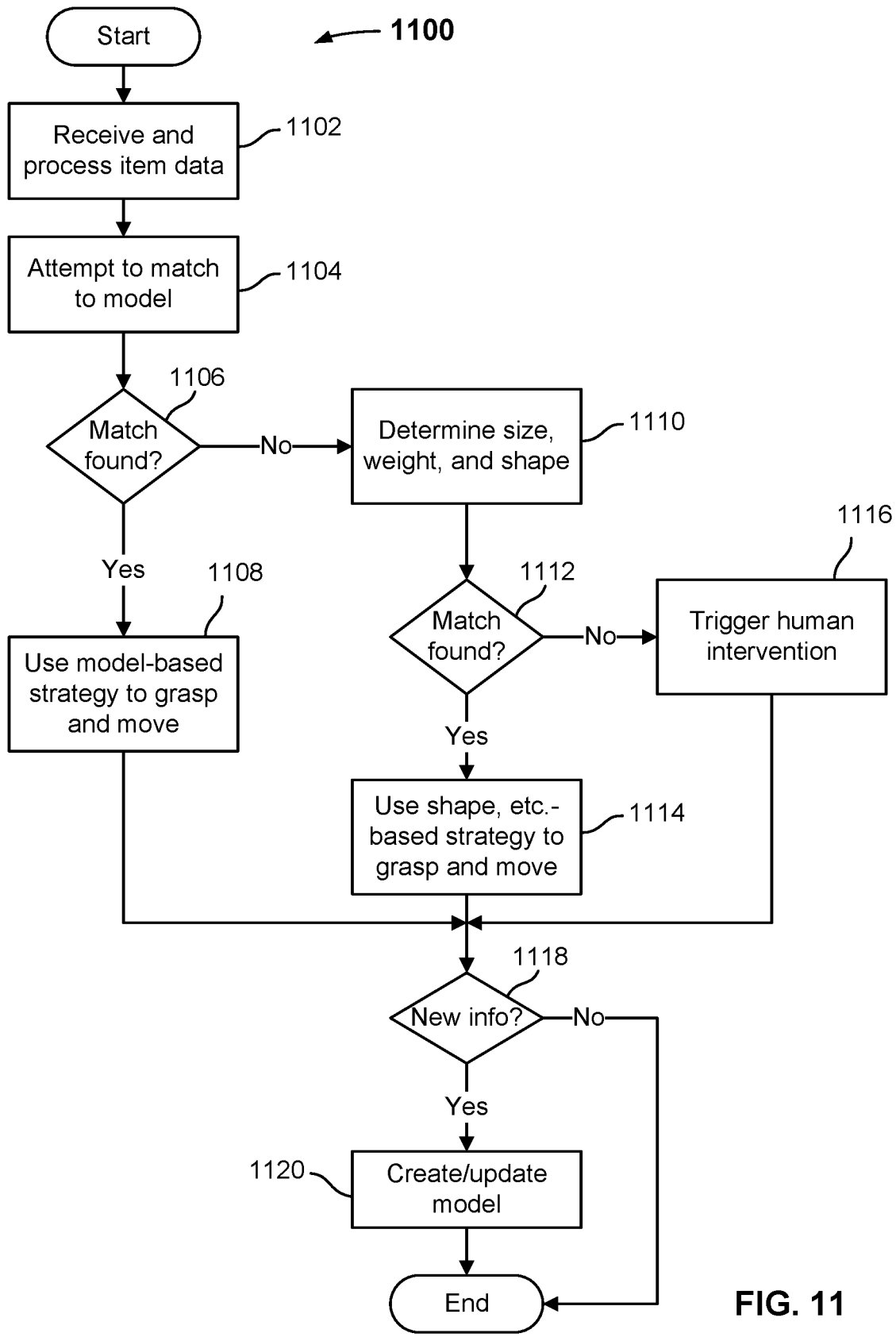
FIG. 11 is a flow chart illustrating an embodiment of a process to place an item on a pallet.

FIG. 11 is a flow chart illustrating an embodiment of a process to place an item on a pallet. In various embodiments, the process 1100 is performed by a control computer, such as control computer 118 of FIG. 1 and/or control computer of system 400 of FIG. 4A. In the example shown, at 1102 item data is received and processed. Example of item data include without limitation image data, optical or other scanner output, item weight, item identifier, item size, etc.

At 1104, an attempt is made to match the item data to a model, e.g., a model comprising a library of item models. The library of item models may be dynamically updated such as via a machine learning process. For example, markings on the item or its packaging may be read to identify the item and look up an item-specific model. In some embodiments, sensor readings may point in different directions. In some embodiments, outlier (e.g., an item that is not statistically relevant) and/or randomly selected sensor data may be removed from consideration to determine whether the remaining data can be match (e.g., with a prescribed degree of confidence) to an item model. If so, the sensor data from that sensor is discarded and a match is determined at 1106 to have been found.

If a match to an item-specific model is determined at 1106 to have been found, based on the data received at 1102, a strategy based on that model is used at 1108 to determine a strategy to grasp, pick up, move, and/or place the item.

If it is determined at 1106 that a match to an item-specific model cannot be found, at 910 the size, weight, shape, type of packaging, center of gravity, and/or other attributes of the item are determined and attempted to be matched to a model associated with items of that size, weight, shape, etc. If at 1112 it is determine that a match to such a model has been found, at 1114 the determined model is used to determine a strategy to grasp, pick up, move, and/or place the item. Otherwise, at 1116 human intervention is triggered, e.g., to manually input a strategy and/or an item identification to be mapped to a strategy, and/or to complete all or part of the operation with respect to the item by teleoperation, manually, etc.

At 1118 it is determined whether processing the item has generated additional or new information about the item and/or item type. If so, at 1120 the new information is used to generate and/or update a model for the item and/or item type. New information may include a measured weight, a center of gravity, a type of packaging, etc. If no new information has been developed and/or once such information has been reflected in any applicable model(s), the process ends.

In some embodiments, detection of a new item or item type triggers a discovery process in which attributes of the item may be determined and determined more fully or precisely. For example, the system may use the robotic arm to pick up the item and hold it in different locations and/or at different orientations to generate (additional) images or views of the item to be used to model or more completely model the item.

In various embodiments, a robotic system to palletize and/or depalletize heterogeneous items as disclosed herein includes a robotic arm with a suction-based, gripper-type, or other end effector at the operative end. The end effector in various embodiments may include on or more sensors used to palletize and/or depalletize heterogeneous items as disclosed herein. For example, the end effector may include image sensors used to facilitate first order picking and placing of an item and one or more force sensors to facilitate snugging items into place, e.g., adjacent to other items, sidewalls, and/or other structures. In another example, in some embodiments a suction-based end effector may include air pressure sensors to detect when a secure grasp has been made with the object surface and/or to detect when the object is losing contact or shearing off.

According to various embodiments, process 1100 may be implemented in connection with determining a strategy for grasping the item, etc. The model corresponding to the item may be comprised in the plan for moving the item from the source location (e.g., the conveyor) to the destination location.

Figure 12:
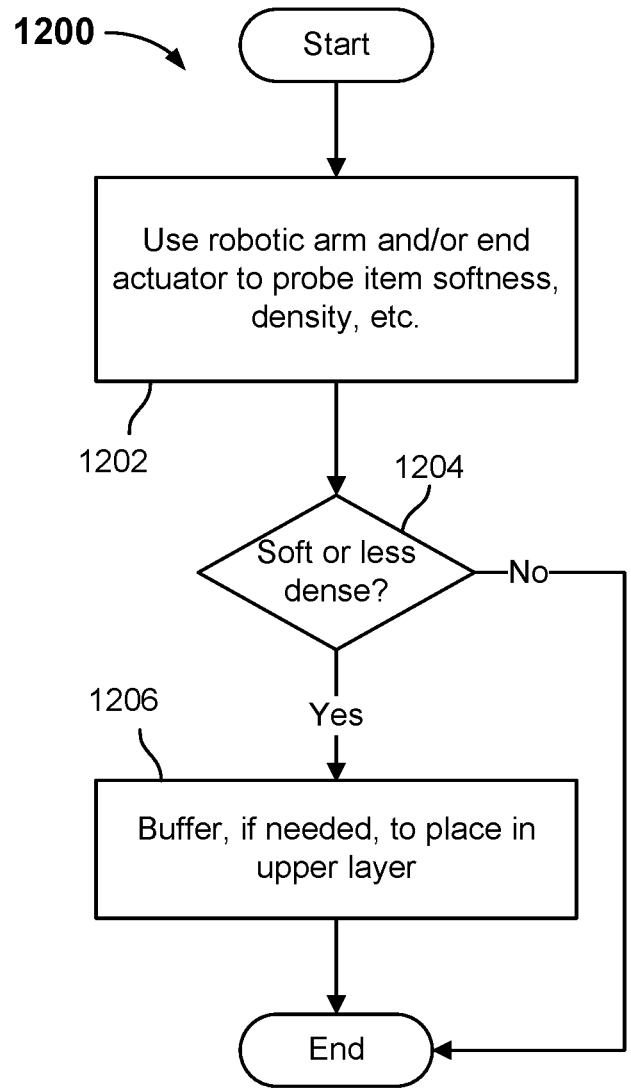
FIG. 12 is a flow chart illustrating an embodiment of a process to use a robotic arm to determine an attribute of an item to be stacked on a pallet.

FIG. 12 is a flow chart illustrating an embodiment of a process to use a robotic arm to determine an attribute of an item to be stacked on a pallet. In various embodiments, the process 1200 of FIG. 12 may be implemented by a control computer, such as control computer 118 of FIG. 1 and/or a control computer of system 400 of FIG. 4A. In the example shown, at 1202 a robotic arm and/or end effector is used to probe an item to determine one or more attributes of the item, for example how soft, heavy, dense, etc., the item is. For example, if the item gives to light pressure it is determined to be soft. If the item is light for its size, as determined based on image data, the item is determined to be less dense. If at 1204 the item has been determined to be soft and/or less dense, the item is buffered at 1206, if needed, to be placed in an upper layer of the stack. Buffering the item may include moving and placing the item in the buffer or staging area at least temporarily until the system determines that a new space at which the item may be placed (e.g., based at least in part on attributes of the item such as size, type of packing, rigidity, softness, etc.). If the item is not determined at 1204 to be soft or less dense, the item is added to the stack without buffering at 1206.

Figure 13:
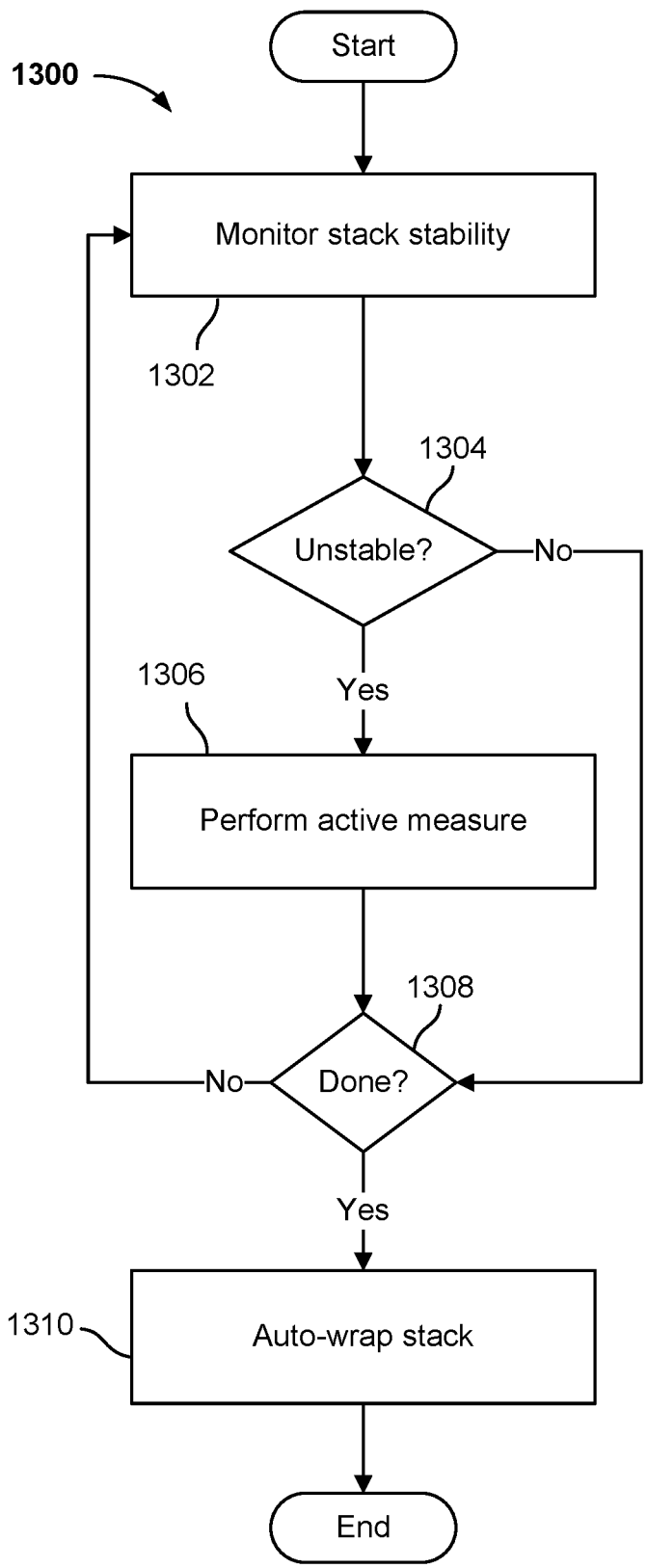
FIG. 13 is a flow chart illustrating an embodiment of a process to use a robotic arm to detect and respond to instability in a set of items as stacked on a pallet.

FIG. 13 is a flow chart illustrating an embodiment of a process to use a robotic arm to detect and respond to instability in a set of items as stacked on a pallet. In various embodiments, the process 1300 of FIG. 13 may be implemented by a control computer, such as control computer 118 of FIG. 1 and/or a control computer of system 400 of FIG. 4A. In various embodiments, the process 100 is used to detect stack instability, e.g., based on internal (e.g., force) and/or external (e.g., image) sensor data.

In the example shown, stack stability is monitored at 1302. For example, cameras in the workspace/environment may be used to detect that the stack has started to lean, crumble, slide, etc. Or, force sensors on the robotic arm and/or end effector may be used to detect that the stack or a portion thereof has become unstable such as when the robotic arm is placing an item on the stack. If at 1304 it is determined the stack has become unstable, at 1306 an active measure is performed.

The active measure may improve the stability of the stack or otherwise remove an abnormality of the stack. An example of the active measure includes automatically wrapping the partial stack, e.g. in plastic, to prevent slippage and reinforce the stability and structure of the stack. Another example of the active measure includes controlling the robotic arm to remove an item that has slipped/fallen from the stack and placing the item back on the stack (in the former location that the item occupied, or a new location in which the item is determined to better fit or to correspond to improved stability of the stack), or alternatively, the robotic arm moves/places the item to a buffer or staging area until such time that the system determines that a new location at which the item is to be placed is formed (e.g., that satisfies various criteria such as satisfying one or more thresholds pertaining to fit, density, stability, etc.). Another example of the active measure includes communicating a notification to a human operator such as via sending a notification to a terminal of the human operator and displaying a notification on a user interface of the terminal to alert the human operator of the instability or abnormality.

According to various embodiments, the active measure is determined/selected based at least in part on a model of the stack. For example, the system may generate an updated model of the stack based at least in part on information obtained by a sensor in the workspace/environment. The system may determine a cause of the instability and determine a plan to remediate the instability. For example, if the system determines that the instability is caused by a particular item, the system may control the robotic arm to remove the particular item (or a set of items that includes the particular items), and restack the particular item (or at least a subset of the set of items that were removed). The system may update the models for moving/placing items based on the detected instability, etc.

If the stack is not determined (again) at 1304 to have become unstable, and in any event once the entire stack (e.g., pallet or other receptacle) has been completed (1308), the stack and/or remaining unwrapped portion thereof is wrapped automatically at 1310 and the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A robotic system, comprising:
a communication interface; and
one or more processors coupled to the communication interface and configured to:
receive, via the communication interface, data associated with a plurality of items to be stacked on or in a destination location;
generate based at least in part on the received data a plan to stack the items on or in the destination location, including by for each item:
determining a source location from which to pick the item based at least in part on (i) an attribute of the source location, and (ii) a state of a platform or receptacle on which one or more items are to be stacked, wherein the source location is determined from among a plurality of input conveyance structures that respectively carry a subset of the plurality of items to within range of a robotic arm; and
implement the plan at least in part by controlling the robotic arm to pick up to the items and stack the items on or in the destination location according to the plan.

2. The robotic system of claim 1, wherein the state of the platform or receptacle comprises a state of a stack on the platform or receptacle.

3. The robotic system of claim 2, wherein the state of the stack on the platform or receptacle comprises a height of the stack.

4. The robotic system of claim 1, wherein the attribute of the source location includes a height of the source location, and at least two of the plurality of input conveyance structures have different heights such that a first height from which the robotic arm picks an item from a first input conveyance structure is different from a second height from which the robotic arm picks an item from a second input conveyance structure.

5. The robotic system of claim 1, wherein the source location is determined based at least in part on (i) a height of at least one of the plurality of input conveyance structures, and (ii) a height of a stack on the platform or receptacle on which one or more items are to be stacked.

6. The robotic system of claim 5, wherein the attribute of the source location includes a height of the source location, in response to a determination that the height of the stack on the platform or receptacle is less than a height threshold, the plan is generated to pick the item from an input conveyance structure having a height that is less than a height of another input conveyance structure.

7. The robotic system of claim 5, wherein the attribute of the source location includes a height of the source location, in response to a determination that the height of the stack on the platform or receptacle is greater than a height threshold, the plan is generated to pick the item from an input conveyance structure having a height that is greater than a height of another input conveyance structure.

8. The robotic system of claim 1, wherein to generate, for each item, the plan to stack the items on or in the destination location further comprises:
determining the destination location based at least in part on a characteristic associated with the item, and at least one of (i) a characteristic of a platform or receptacle on which one or more items are to be stacked, and (ii) an existing stack of one or more items on the platform or receptacle,
wherein:
the destination location is determined from among a plurality of zones in which platforms or receptacles are disposed; and
each of the plurality of zones are within a range of a robotic arm.

9. The robotic system of claim 1, wherein to implement the plan includes for each item:
using one or more first order sensors to move the item to a first approximation of a destination position for that item at the destination location; and
using one or more second order sensors to snug the item into a final position.

10. The robotic system of claim 1, wherein the plan is generated based at least in part on a result of computing a cost function pertaining to moving the item from the source location to the destination location.

11. The robotic system of claim 10, wherein to generate the plan to stack the items, comprises:
determining a set of trajectories of moving items from one or more source locations to one or more destination locations;
determining the result of the cost function for each of the set of trajectories, wherein the cost function is based at least in part on a Euclidean distance from a corresponding source location to a corresponding destination location; and
selecting, from the set of trajectories, a selected trajectory based at least in part on a determination that the selected trajectory has a shortest Euclidean distance among the set of trajectories.

12. The robotic system of claim 10, wherein the plan is generated further based at least in part on an order or a manifest associated with the platform or receptacle on which the one or more items are to be stacked.

13. The robotic system of claim 1, wherein:
the plurality of items are moved to within range of the robotic arm via one or more input conveyors; and
the robotic arm respectively picks the plurality of items from the one or more input conveyors and respectively stacks the plurality of items in corresponding destination locations.

14. The robotic system of claim 13, wherein:
the robotic arm stacks a first subset of the plurality of items on a first platform or receptacle; and
the robotic arm stacks a second subset of the plurality of items on a second platform or receptacle.

15. The robotic system of claim 14, wherein the first platform or receptacle and the second platform or receptacle respectively comprise stacks of one or more items.

16. The robotic system of claim 15, wherein the robotic arm contemporaneously or concurrently places a subset of the plurality of items on the first platform or receptacle and the second platform or receptacle.

17. A method to control a robot, comprising:
receiving, via the communication interface, data associated with a plurality of items to be stacked on or in a destination location;
generating, by one or more processors, a plan to stack the items on or in the destination location, the plan being generated based at least in part on the received data, and the generation of the plan for each item comprising:
determining a source location from which to pick the item based at least in part on (i) an attribute of the source location, and (ii) a state of a platform or receptacle on which one or more items are to be stacked, wherein the source location is determined from among a plurality of input conveyance structures that respectively carry a subset of the plurality of items to within range of a robotic arm; and
implementing the plan at least in part by controlling the robotic arm to pick up to the items and stack the items on or in the destination location according to the plan.

18. The method of claim 17, wherein the state of the platform or receptacle comprises a state of a stack on the platform or receptacle.

19. The method of claim 18, wherein the state of the stack on the platform or receptacle comprises a height of the stack.

20. The method of claim 17, wherein the attribute of the source location includes a height of the source location, and at least two of the plurality of input conveyance structures have different heights such that a first height from which the robotic arm picks an item from a first input conveyance structure is different from a second height from which the robotic arm picks an item from a second input conveyance structure.

21. The method of claim 17, wherein the source location is determined based at least in part on (i) a height of at least one of the plurality of input conveyance structures, and (ii) a height of a stack on the platform or receptacle on which one or more items are to be stacked.

22. The method of claim 21, wherein in response to a determination that the height of the stack on the platform or receptacle is less than a threshold height, the plan is generated to pick the item from an input conveyance structure having a height that is less than a height of another input conveyance structure.

23. The method of claim 21, wherein the attribute of the source location includes a height of the source location, and in response to a determination that the height of the stack on the platform or receptacle is greater than a height threshold, the plan is generated to pick the item from an input conveyance structure having a height that is greater than a height of another input conveyance structure.

24. The method of claim 17, wherein generating, for each item, the plan to stack the items on or in the destination location further comprises:
determining the destination location based at least in part on a characteristic associated with the item, and at least one of (i) a characteristic of a platform or receptacle on which one or more items are to be stacked, and (ii) an existing stack of one or more items on the platform or receptacle,
wherein:
the destination location is determined from among a plurality of zones in which platforms or receptacles are disposed; and
each of the plurality of zones are within a range of a robotic arm.

25. The method of claim 17, wherein to implement the plan includes for each item:
using one or more first order sensors to move the item to a first approximation of a destination position for that item at the destination location; and
using one or more second order sensors to snug the item into a final position.

26. The method of claim 17, wherein the plan is generated based at least in part on a result of computing a cost function pertaining to moving the item from the source location to the destination location.

27. The method of claim 26, wherein to generate the plan to stack the items, comprises:
determining a set of trajectories of moving items from one or more source locations to one or more destination locations;
determining the result of the cost function for each of the set of trajectories, wherein the cost function is based at least in part on a Euclidean distance from a corresponding source location to a corresponding destination location; and
selecting, from the set of trajectories, a selected trajectory based at least in part on a determination that the selected trajectory has a shortest Euclidean distance among the set of trajectories.

28. The method of claim 26, wherein the plan is generated further based at least in part on an order or a manifest associated with the platform or receptacle on which the one or more items are to be stacked.

29. A computer program product to control a robot, the computer program product being embodied in a non-transitory computer readable medium and comprising computer instructions for:
receiving, via the communication interface, data associated with a plurality of items to be stacked on or in a destination location;
generating, by one or more processors, a plan to stack the items on or in the destination location, the plan being generated based at least in part on the received data, and the generation of the plan for each item comprising:
determining a source location from which to pick the item based at least in part on (i) an attribute of the source location, and (ii) a state of a platform or receptacle on which one or more items are to be stacked, wherein the source location is determined from among a plurality of input conveyance structures that respectively carry a subset of the plurality of items to within range of a robotic arm; and
implementing the plan at least in part by controlling the robotic arm to pick up to the items and stack the items on or in the destination location according to the plan.

30. A robotic system, comprising:
a communication interface; and
one or more processors coupled to the communication interface and configured to:
receive, via the communication interface, data associated with a plurality of items to be stacked on or in a destination location;
generate based at least in part on the received data a plan to stack the items on or in the destination location, including by for each item:
determining a source location from which to pick the item based at least in part on (i) an attribute of the source location, and (ii) a state of a platform or receptacle on which one or more items are to be stacked; and
implement the plan at least in part by controlling a robotic arm to pick up to the items and stack the items on or in the destination location according to the plan, wherein implementing the plan includes for each item:
using one or more first order sensors to move the item to a first approximation of a destination position for that item at the destination location; and
using one or more second order sensors to snug the item into a final position.

31. A method to control a robot, comprising:
receiving, via the communication interface, data associated with a plurality of items to be stacked on or in a destination location;
generating, by one or more processors, a plan to stack the items on or in the destination location, the plan being generated based at least in part on the received data, and the generation of the plan for each item comprising:
determining a source location from which to pick the item based at least in part on (i) an attribute of the source location, and (ii) a state of a platform or receptacle on which one or more items are to be stacked; and
implementing the plan at least in part by controlling a robotic arm to pick up to the items and stack the items on or in the destination location according to the plan, wherein implementing the plan includes for each item:
using one or more first order sensors to move the item to a first approximation of a destination position for that item at the destination location; and
using one or more second order sensors to snug the item into a final position.

32. A robotic system, comprising:
a communication interface; and
one or more processors coupled to the communication interface and configured to:
receive, via the communication interface, data associated with a plurality of items to be stacked on or in a destination location;
generate based at least in part on the received data a plan to stack the items on or in the destination location, including by for each item:
determining a source location from which to pick the item based at least in part on (i) an attribute of the source location, and (ii) a state of a platform or receptacle on which one or more items are to be stacked; and
implement the plan at least in part by controlling a robotic arm to pick up to the items and stack the items on or in the destination location according to the plan,
wherein the plan is generated based at least in part on a result of computing a cost function pertaining to moving the item from the source location to the destination location.

33. A method to control a robot, comprising:
receiving, via the communication interface, data associated with a plurality of items to be stacked on or in a destination location;
generating, by one or more processors, a plan to stack the items on or in the destination location, the plan being generated based at least in part on the received data, and the generation of the plan for each item comprising:

determining a source location from which to pick the item based at least in part on (i) an attribute of the source location, and (ii) a state of a platform or receptacle on which one or more items are to be stacked; and implementing the plan at least in part by controlling a robotic arm to pick up to the items and stack the items on or in the destination location according to the plan, wherein the plan is generated based at least in part on a result of computing a cost function pertaining to moving the item from the source location to the destination location.

\* \* \* \* \*